US011724804B2

(12) United States Patent
Mills et al.

(10) Patent No.: US 11,724,804 B2
(45) Date of Patent: Aug. 15, 2023

(54) AIRCRAFT COUPLING MECHANISM

(71) Applicant: BELL TEXTRON INC., Fort Worth, TX (US)

(72) Inventors: Nathan Alexander Mills, Pleasanton, CA (US); Nitin Susendran, Pleasanton, CA (US); Monty Don Bruckman, II, Edgewood, NM (US); Adam Bergamini, Seattle, WA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 706 days.

(21) Appl. No.: 16/381,759

(22) Filed: Apr. 11, 2019

(65) Prior Publication Data
US 2020/0324893 A1 Oct. 15, 2020

(51) Int. Cl.
  *B64C 37/02* (2006.01)
  *B64C 39/02* (2023.01)
  *B64U 10/13* (2023.01)
  *B64U 30/20* (2023.01)

(52) U.S. Cl.
  CPC ............ *B64C 37/02* (2013.01); *B64C 39/024* (2013.01); *B64C 2211/00* (2013.01); *B64U 10/13* (2023.01); *B64U 30/20* (2023.01)

(58) Field of Classification Search
  CPC . B64C 37/02; B64C 39/024; B64C 2201/027; B64C 2201/108; B64C 2211/00; B64C 2201/128; F16B 33/06; F16B 35/04; F16B 33/02; F16B 39/30; F16B 35/041; B64D 1/22; B64U 10/13; B64U 30/20; B64U 2101/60
  See application file for complete search history.

(56) References Cited

U.S. PATENT DOCUMENTS

| | | | | |
|---|---|---|---|---|
| 2,496,087 | A * | 1/1950 | Fleming | B64C 37/02 292/241 |
| 2,721,044 | A * | 10/1955 | Young | B66C 1/10 294/82.26 |
| 2,863,618 | A * | 12/1958 | Doyle | B64D 5/00 244/2 |
| 3,008,665 | A * | 11/1961 | Piasecki | B64B 1/00 244/2 |
| 3,093,028 | A * | 6/1963 | Mathie | F16B 25/103 411/387.4 |

(Continued)

*Primary Examiner* — Medhat Badawi
(74) *Attorney, Agent, or Firm* — Akona IP

(57) ABSTRACT

A male part and a female part can reversibly couple aircraft to one another using an attachment mechanism. The male part includes a wall forming a shaft and is operable to attach to a first aircraft. The female part includes a wall forming a cavity and is operable to attach to a second aircraft. The attachment mechanism can regulate a mechanical engagement between the shaft on the male part and the cavity on the female part while the first aircraft and the second aircraft are airborne or on land. The attachment mechanism is operable to switch between an engaged position and a disengaged position. In the engaged position, the attachment mechanism initiates the mechanical engagement to rigidly attach the first and the second aircraft to one another. In the disengaged position, the attachment mechanism discontinues the mechanical engagement to detach the first and the second aircraft from one another.

16 Claims, 42 Drawing Sheets

(56) References Cited

U.S. PATENT DOCUMENTS

| | | | | |
|---|---|---|---|---|
| 3,161,373 A * | 12/1964 | Vogt | B64D 5/00 | 244/2 |
| 3,207,023 A * | 9/1965 | Knohl | F16B 25/0031 | 411/387.3 |
| 3,248,747 A * | 5/1966 | Scott | B23G 7/02 | 470/204 |
| 3,351,115 A * | 11/1967 | Boehlow | F16B 25/0057 | 411/168 |
| 3,656,723 A * | 4/1972 | Piasecki | B64D 1/22 | 244/2 |
| 3,933,075 A * | 1/1976 | Peterson | F16B 25/0084 | 408/230 |
| 3,965,793 A * | 6/1976 | Roser | F16B 25/0084 | 411/386 |
| 4,323,326 A * | 4/1982 | Okada | F16B 25/0047 | 411/311 |
| 4,477,217 A * | 10/1984 | Bonacorsi | F16B 25/0047 | 411/387.4 |
| 4,568,229 A * | 2/1986 | Hulsey | F16B 25/0021 | 408/230 |
| 4,591,112 A * | 5/1986 | Piasecki | B64B 1/00 | 244/26 |
| 4,674,710 A * | 6/1987 | Rodriguez | G05D 1/104 | 244/3 |
| 4,749,319 A * | 6/1988 | Sygnator | F16B 35/048 | 411/311 |
| 4,904,136 A * | 2/1990 | Matsumoto | F02M 3/062 | 411/301 |
| 5,188,496 A * | 2/1993 | Giannuzzi | F16B 25/0026 | 411/386 |
| 5,308,022 A * | 5/1994 | Cronkhite | F41G 3/26 | 434/14 |
| 5,521,817 A * | 5/1996 | Burdoin | G05D 1/0027 | 701/3 |
| 5,540,531 A * | 7/1996 | Choiniere | F16B 25/0063 | 411/387.1 |
| 5,800,107 A * | 9/1998 | Giannuzzi | F16B 33/02 | 411/386 |
| 6,254,327 B1 * | 7/2001 | Chen | F16B 25/0052 | 411/387.4 |
| 6,505,799 B1 * | 1/2003 | Bercaw | A63B 29/027 | 248/231.91 |
| 6,540,179 B2 * | 4/2003 | Henderson | B64C 39/024 | 244/110 E |
| 6,869,042 B2 * | 3/2005 | Harrison | B64D 3/00 | 244/110 R |
| 6,926,233 B1 * | 8/2005 | Corcoran, III | G05D 1/104 | 244/76 R |
| 7,699,260 B2 * | 4/2010 | Hughey | B64C 27/08 | 244/17.11 |
| 7,966,872 B2 * | 6/2011 | Lutke | B64D 5/00 | 73/147 |
| 8,061,646 B2 * | 11/2011 | Gomez | B64C 37/02 | 244/199.3 |
| 8,292,562 B2 * | 10/2012 | Chiu | F16B 35/041 | 411/107 |
| 8,322,648 B2 * | 12/2012 | Kroetsch | B64C 39/024 | 244/17.23 |
| 8,348,572 B2 * | 1/2013 | Friederich | F16B 25/106 | 411/452 |
| 8,403,972 B2 * | 3/2013 | Hasenbohler | A61B 17/863 | 411/411 |
| 8,419,332 B2 * | 4/2013 | Kochheiser | F16B 5/0275 | 411/426 |
| 8,740,134 B2 * | 6/2014 | Suzuki | B64C 39/024 | 244/75.1 |
| 9,043,052 B2 * | 5/2015 | So | B64D 1/22 | 701/3 |
| 9,205,922 B1 * | 12/2015 | Bouwer | B64D 9/00 | |
| 9,457,899 B2 * | 10/2016 | Duffy | B64C 39/024 | |
| 9,464,873 B2 * | 10/2016 | Orlev | F42B 12/22 | |
| 9,764,835 B1 * | 9/2017 | Kimchi | B64C 39/024 | |
| D803,038 S * | 11/2017 | Baker | D8/387 | |
| 9,957,045 B1 * | 5/2018 | Daly | B64C 39/024 | |
| 10,173,775 B2 * | 1/2019 | Samaritano | B64C 27/20 | |
| 10,197,087 B2 * | 2/2019 | Hargis | F16B 43/001 | |
| 10,293,936 B1 * | 5/2019 | Conn | G05D 1/0027 | |
| 10,310,501 B2 * | 6/2019 | Greenberger | G08G 5/0043 | |
| 10,577,098 B2 * | 3/2020 | Chang | B64C 39/024 | |
| 10,619,662 B2 * | 4/2020 | Mair | F16B 25/103 | |
| D887,825 S * | 6/2020 | Schwarzmann | D8/387 | |
| 10,696,394 B2 * | 6/2020 | Chang | B64C 37/02 | |
| 10,712,286 B1 * | 7/2020 | Fetzer | G01N 29/225 | |
| 10,767,678 B2 * | 9/2020 | Kazama | F16B 35/04 | |
| 10,773,799 B1 * | 9/2020 | Thrun | B64C 39/024 | |
| D898,557 S * | 10/2020 | Chen | D8/387 | |
| D899,239 S * | 10/2020 | Schatzl | D8/387 | |
| 11,008,102 B2 * | 5/2021 | Ryan | B64D 5/00 | |
| 11,046,434 B2 * | 6/2021 | Nesti | B64D 5/00 | |
| 11,053,008 B2 * | 7/2021 | Drennan | B64D 5/00 | |
| D928,602 S * | 8/2021 | Vovan | D8/387 | |
| 11,104,439 B2 * | 8/2021 | Fenny | B64D 5/00 | |
| 11,148,808 B2 * | 10/2021 | Wiggerich | B64D 1/22 | |
| 11,150,646 B2 * | 10/2021 | Ivanov | G05D 1/0027 | |
| 11,190,032 B2 * | 11/2021 | Farrahi Moghaddam | H02J 7/0045 | |
| 11,229,464 B2 * | 1/2022 | Smith | A61B 17/0206 | |
| 2001/0005474 A1 * | 6/2001 | Chen | F16B 25/0052 | 411/416 |
| 2003/0147716 A1 * | 8/2003 | Nagawa | F16B 35/041 | 411/288 |
| 2003/0183719 A1 * | 10/2003 | Bevilaqua | B64D 5/00 | 244/2 |
| 2004/0141827 A1 * | 7/2004 | Dicke | F16B 25/0073 | 411/413 |
| 2007/0102565 A1 * | 5/2007 | Speer | B64D 5/00 | 244/2 |
| 2007/0128001 A1 * | 6/2007 | Su | F16B 35/041 | 411/413 |
| 2007/0147973 A1 * | 6/2007 | Laan | F16B 35/041 | 411/411 |
| 2008/0014047 A1 * | 1/2008 | Dohi | F16B 35/041 | 411/387.4 |
| 2008/0226424 A1 * | 9/2008 | Matthiesen | F16B 25/0021 | 411/411 |
| 2009/0028665 A1 * | 1/2009 | Chang | F16B 25/10 | 411/387.3 |
| 2009/0047096 A1 * | 2/2009 | Lin | F16B 25/0015 | 411/411 |
| 2009/0283629 A1 * | 11/2009 | Kroetsch | A63H 27/12 | 244/17.23 |
| 2010/0104395 A1 * | 4/2010 | Stephen | F16B 35/04 | 411/383 |
| 2010/0193625 A1 * | 8/2010 | Sommer | B64C 37/02 | 244/2 |
| 2011/0049288 A1 * | 3/2011 | Suzuki | G05D 1/104 | 244/2 |
| 2011/0217145 A1 * | 9/2011 | Kochheiser | F16B 25/106 | 29/525.11 |
| 2012/0158215 A1 * | 6/2012 | Sun | B64C 27/20 | 701/1 |
| 2012/0305051 A1 * | 12/2012 | Kokotov | B63B 35/44 | 136/246 |
| 2013/0039720 A1 * | 2/2013 | Shih | F16B 25/0047 | 411/387.4 |
| 2013/0089389 A1 * | 4/2013 | Gong | F16B 25/103 | 411/371.2 |
| 2014/0086704 A1 * | 3/2014 | Hemingway | F16B 33/006 | 411/378 |
| 2014/0112734 A1 * | 4/2014 | Ambros | F16B 25/0047 | 411/387.1 |
| 2014/0314522 A1 * | 10/2014 | Lin | F16B 25/0047 | 411/387.1 |
| 2014/0356174 A1 * | 12/2014 | Wang | F01D 5/021 | 416/204 R |
| 2014/0374532 A1 * | 12/2014 | Duffy | G05D 1/104 | 244/2 |
| 2015/0052735 A1 * | 2/2015 | Kochheiser | F16B 25/0084 | 29/525.11 |

(56) References Cited

U.S. PATENT DOCUMENTS

| | | | | |
|---|---|---|---|---|
| 2015/0204370 A1* | 7/2015 | Serizawa | | F16B 33/02 |
| | | | | 411/411 |
| 2016/0146241 A1* | 5/2016 | Eckert | | F16B 25/0047 |
| | | | | 470/9 |
| 2016/0229530 A1* | 8/2016 | Welsh | | A63H 27/12 |
| 2016/0311526 A1* | 10/2016 | Geise | | B64C 27/52 |
| 2016/0340021 A1* | 11/2016 | Zhang | | B64C 27/006 |
| 2016/0340028 A1* | 11/2016 | Datta | | G05D 1/0011 |
| 2016/0378108 A1* | 12/2016 | Paczan | | B64D 31/06 |
| | | | | 705/330 |
| 2017/0036762 A1* | 2/2017 | Gamble | | B64D 5/00 |
| 2017/0101177 A1* | 4/2017 | Smirnov | | B64C 39/024 |
| 2017/0108030 A1* | 4/2017 | Yoshida | | F16B 41/002 |
| 2017/0152881 A1* | 6/2017 | Yang | | F16B 25/106 |
| 2017/0341725 A1* | 11/2017 | Skahan | | B64C 13/044 |
| 2017/0350435 A1* | 12/2017 | Chen | | F16B 33/008 |
| 2018/0043984 A1* | 2/2018 | Robertson | | B64D 5/00 |
| 2018/0178922 A1* | 6/2018 | Pilskalns | | B64C 39/024 |
| 2018/0196418 A1* | 7/2018 | Meier | | G05D 1/0225 |
| 2018/0273158 A1* | 9/2018 | Courtin | | B64C 39/024 |
| 2018/0327087 A1* | 11/2018 | Wang | | F01D 5/021 |
| 2018/0362188 A1* | 12/2018 | Achtelik | | B64C 39/024 |
| 2019/0016476 A1* | 1/2019 | Scherz | | H02J 7/0042 |
| 2019/0101151 A1* | 4/2019 | Michiwaki | | F16B 33/02 |
| 2019/0245365 A1* | 8/2019 | Farrahi Moghaddam | | |
| | | | | B64U 30/20 |
| 2019/0344770 A1* | 11/2019 | Cha | | B64C 39/024 |
| 2020/0033851 A1* | 1/2020 | Hajimiri | | B64C 37/02 |
| 2020/0140082 A1* | 5/2020 | von Flotow | | B64F 1/04 |
| 2020/0207469 A1* | 7/2020 | Benedict | | B64C 27/20 |
| 2020/0268546 A1* | 8/2020 | Radmand | | A61F 5/566 |
| 2020/0291979 A1* | 9/2020 | Cowles, Jr. | | F16B 35/048 |
| 2020/0324893 A1* | 10/2020 | Mills | | B64C 39/024 |
| 2021/0033122 A1* | 2/2021 | Wang | | F16B 33/006 |
| 2021/0237606 A1* | 8/2021 | McNair | | B60L 53/665 |
| 2021/0237901 A1* | 8/2021 | von Flotow | | B64F 1/0295 |
| 2021/0403146 A1* | 12/2021 | Atsumi | | B64C 17/02 |
| 2022/0017204 A1* | 1/2022 | Helou, Jr. | | B64D 9/003 |

* cited by examiner

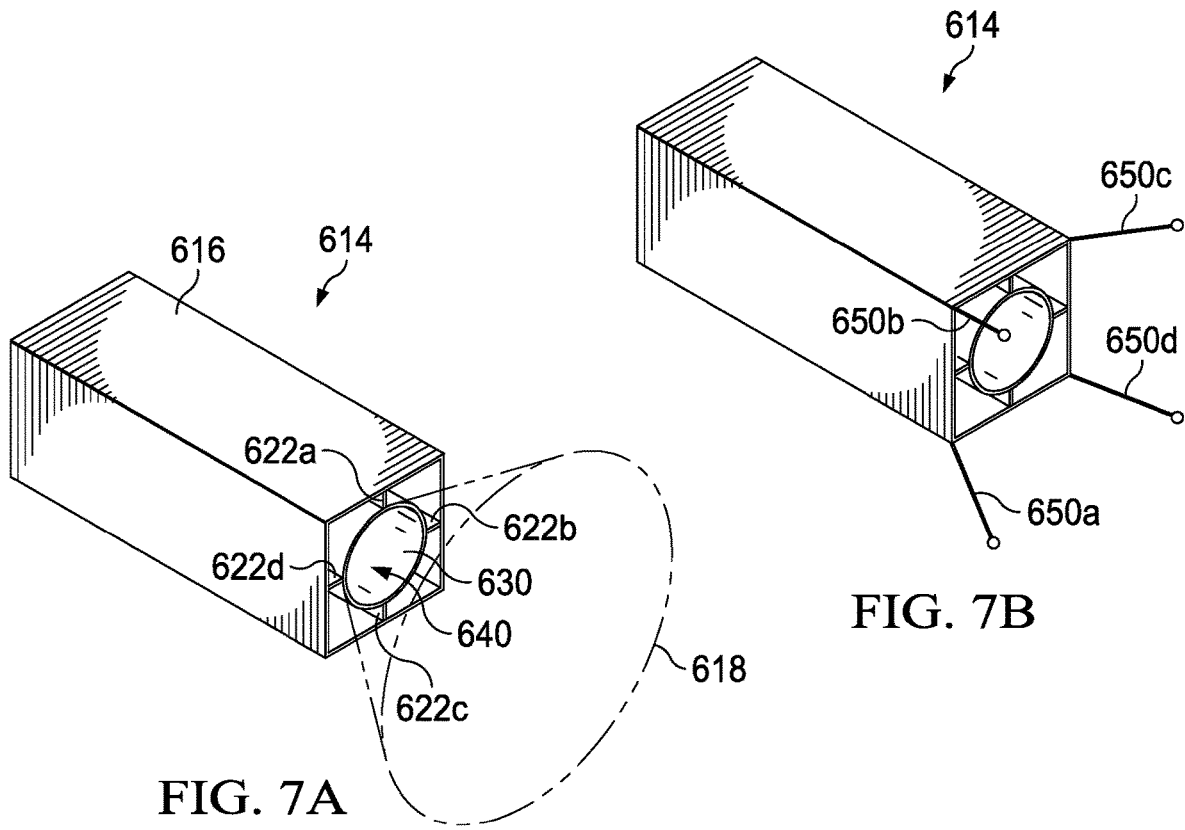
FIG. 7A
FIG. 7B
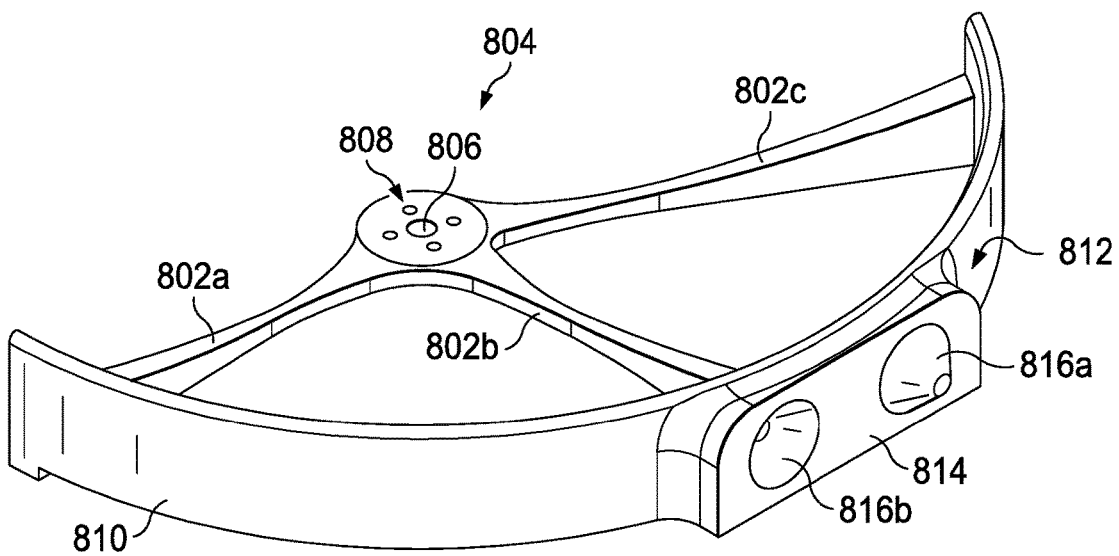
FIG. 8

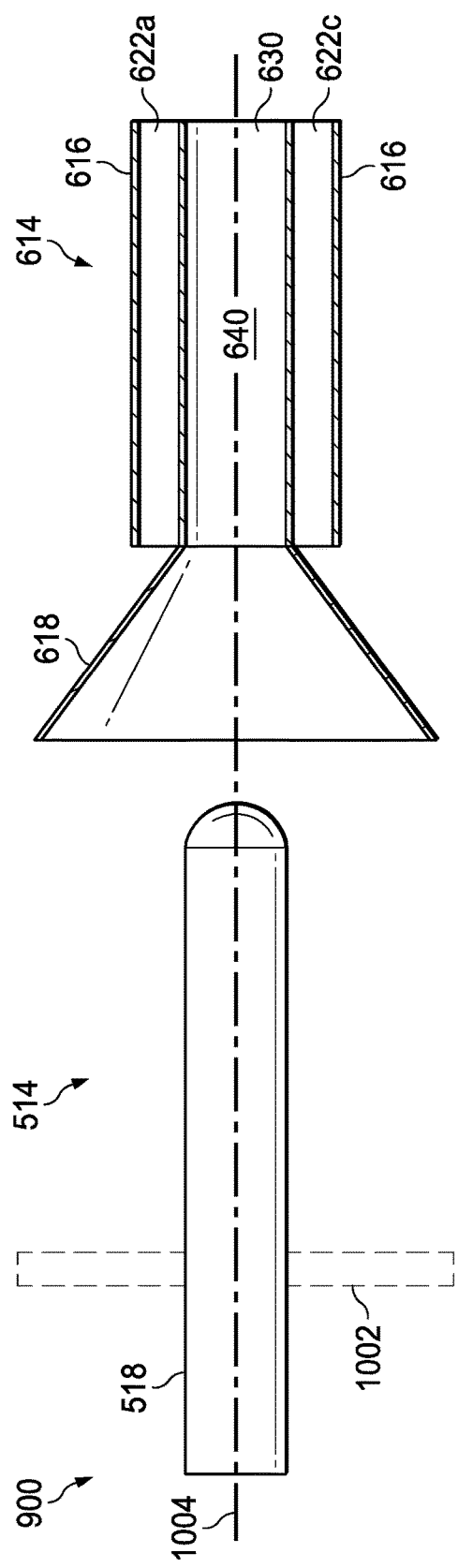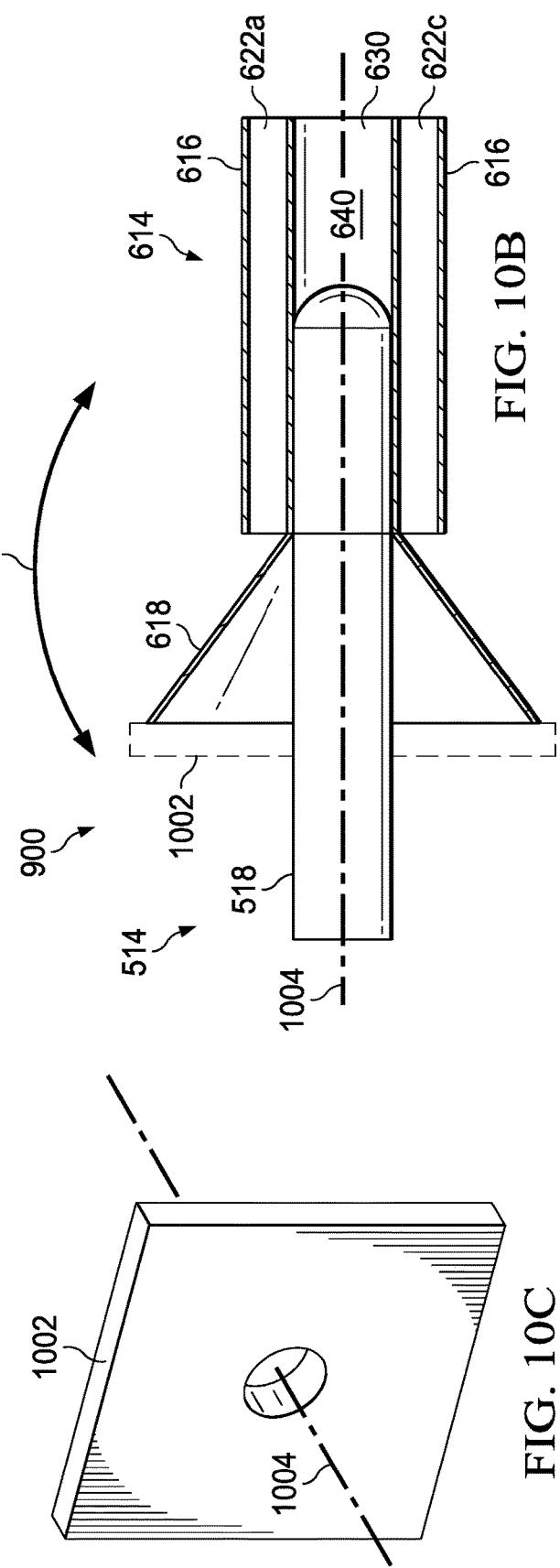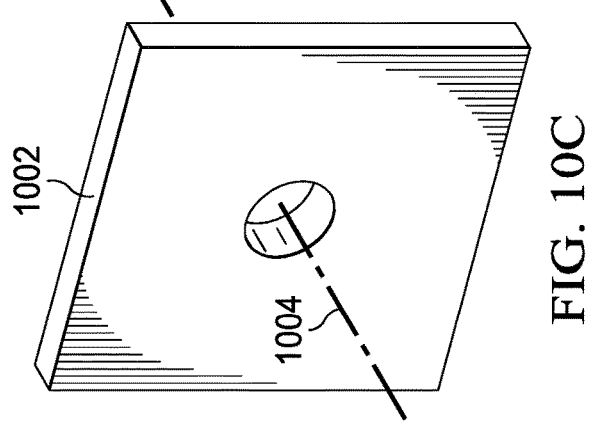

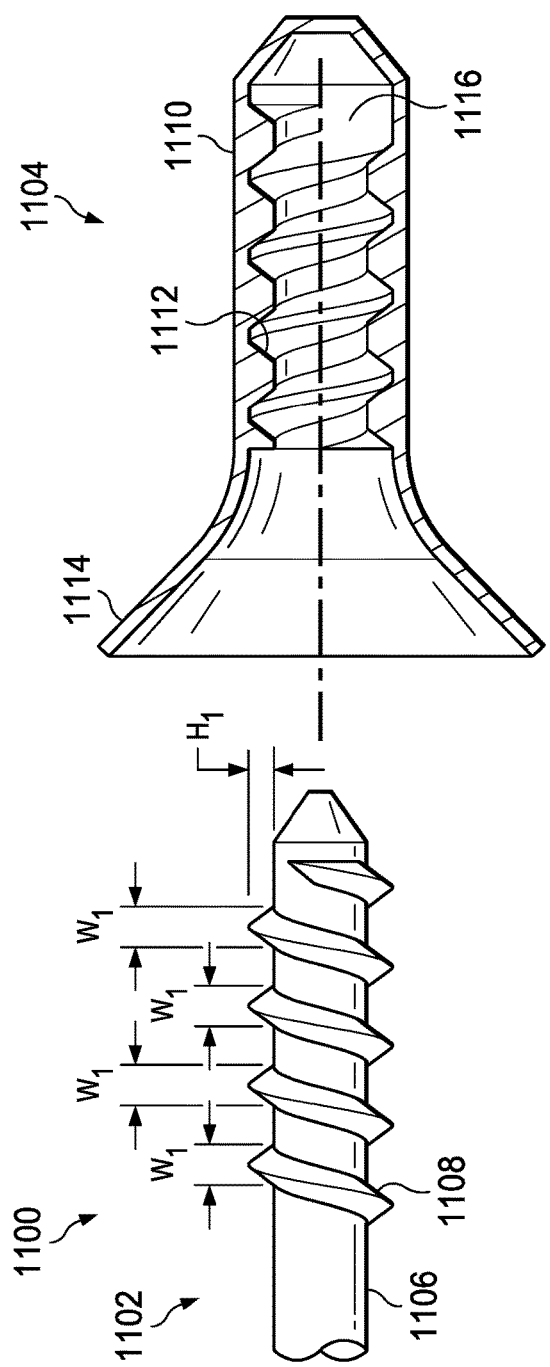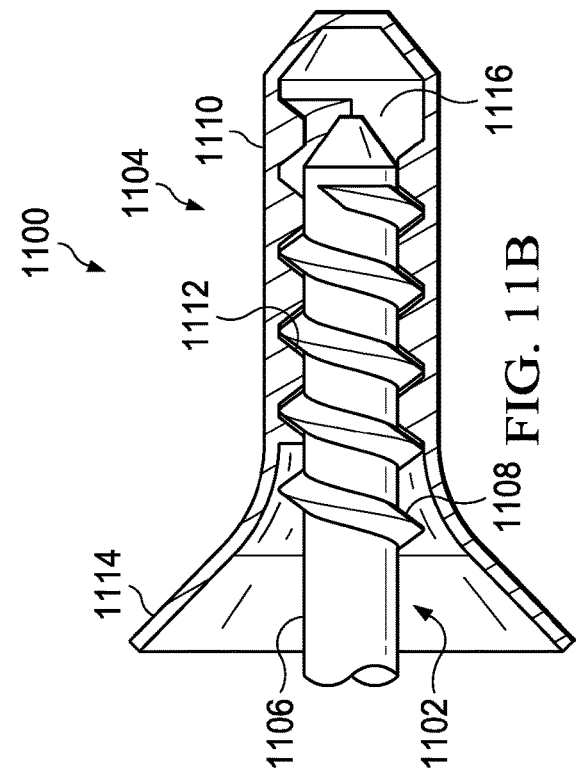
FIG. 11A
FIG. 11B

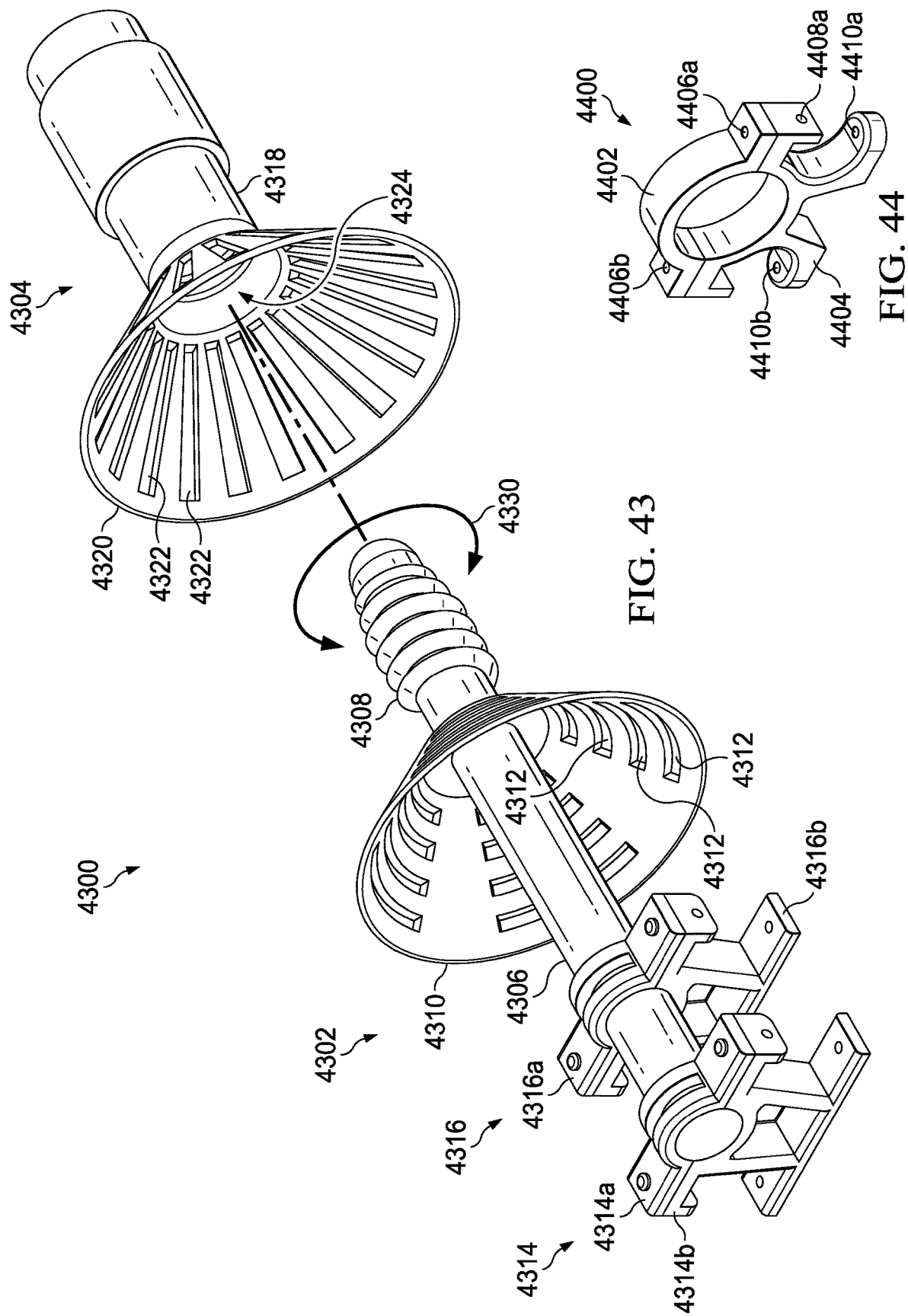

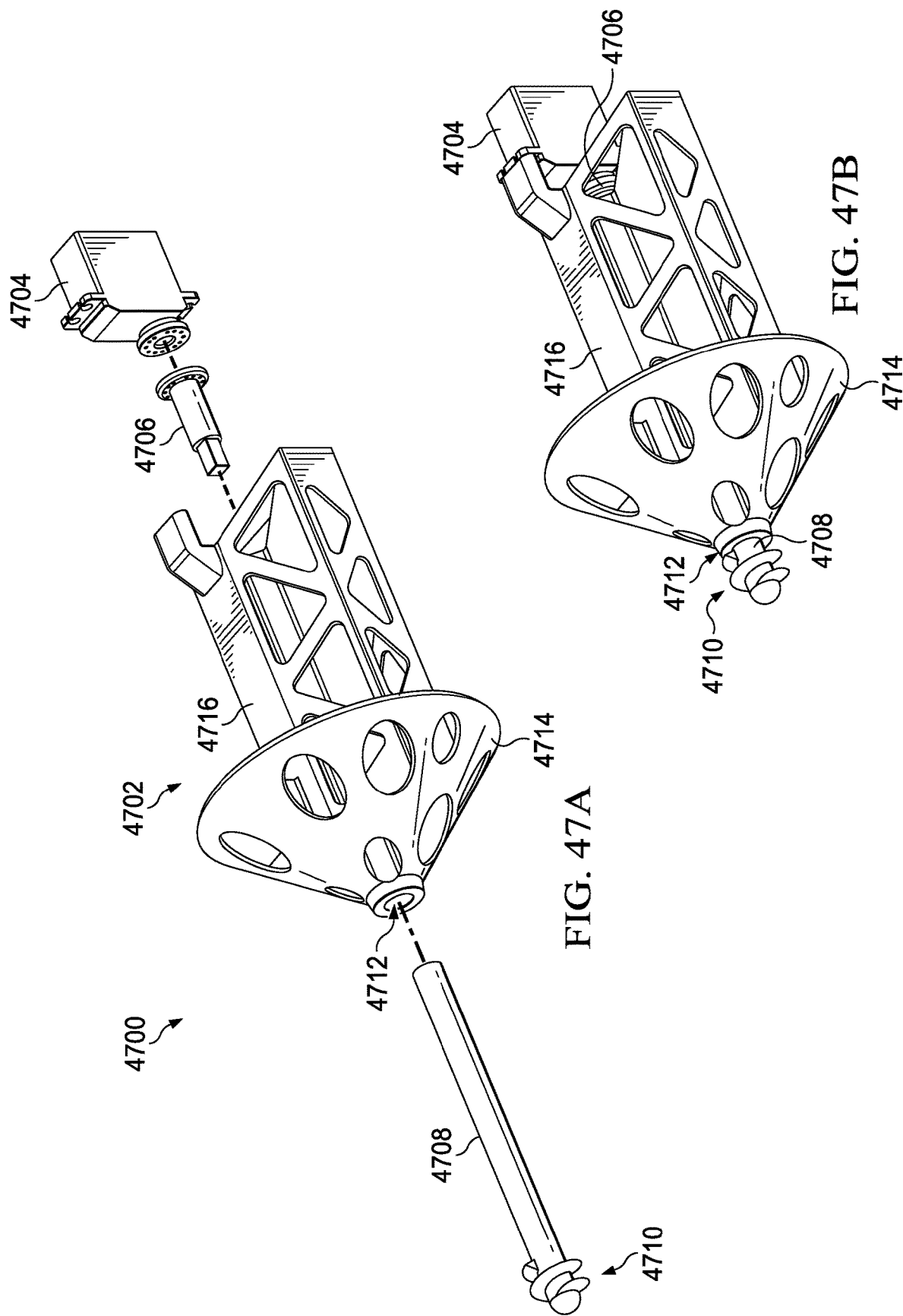

AIRCRAFT COUPLING MECHANISM

TECHNICAL FIELD

This disclosure relates generally to aircraft, and more particularly, though not exclusively, to systems and apparatuses for coupling aircraft to one another.

BACKGROUND

Some aircraft are utilized to carry various loads during flight. For example, an aircraft may be used to lift an object while the aircraft is airborne and to transport the object to a new location. Each aircraft has technical limits on a weight that it can carry while maintaining safe flight operation. A maximum payload of an aircraft is a weight describing a load carrying capacity of the aircraft during flight. For example, an aircraft manufacture, or other organization, may determine the weight that the aircraft can carry during flight based on several factors such as flight stability, thrust limits of drive systems, a structural capacity of one or more components onboard the aircraft, and the like. The maximum payload of the aircraft is a limit that, if exceeded, could inhibit the ability of the aircraft to safely fly. An aircraft may be physically unable to take-off and/or remain airborne while attempting to carry a weight that exceeds the maximum payload. Thus, it may be unsafe to utilize and aircraft to attempt to carry a weight that exceeds the maximum payload of the aircraft.

SUMMARY

In some examples, a male part for coupling aircraft to one another comprises a wall forming a shaft and an attachment mechanism. The wall may be attached to a first aircraft. The attachment mechanism is to regulate a mechanical engagement between the shaft on the male part and a female part on a second aircraft while the first aircraft and the second aircraft are airborne. The attachment mechanism is operable to switch between an engaged position and a disengaged position. In the engaged position, the attachment mechanism is operable to initiate the mechanical engagement to rigidly attach the first aircraft and the second aircraft to one another. In the disengaged position, the attachment mechanism is operable to discontinue the mechanical engagement to detach the first aircraft and the second aircraft from one another.

In further examples, a female part for coupling aircraft to one another comprises a wall forming a cavity and an attachment mechanism. The wall may be attached to a first aircraft. The attachment mechanism is to regulate a mechanical engagement between the cavity on the female part and a male part on a second aircraft while the first aircraft and the second aircraft are airborne. The attachment mechanism is operable to switch between an engaged position and a disengaged position. In the engaged position, the attachment mechanism is operable to initiate the mechanical engagement to rigidly attach the first aircraft and the second aircraft to one another. In the disengaged position, the attachment mechanism is operable to discontinue the mechanical engagement to detach the first aircraft and the second aircraft from one another.

In some examples, a coupling system for coupling two or more aircraft to one another comprises a male part, a female part, and an attachment mechanism. The male part comprises a shaft and a first fastener to attach the male part to a first aircraft. The female part comprises a cavity and a second fastener to attach the female part to a second aircraft. The attachment mechanism is to regulate a mechanical engagement between the shaft on the male part and the cavity on female part while the first aircraft and the second aircraft are airborne. The attachment mechanism is operable to switch between an engaged position and a disengaged position. In the engaged position, the attachment mechanism is operable to initiate the mechanical engagement to rigidly attach the first aircraft and the second aircraft to one another. In the disengaged position, the attachment mechanism is operable to discontinue the mechanical engagement to detach the first aircraft and the second aircraft from one another.

BRIEF DESCRIPTION OF THE DRAWINGS

FIGS. 7A and 7B illustrate details of a female part, in accordance with some embodiments of the present disclosure.

FIG. 8 shows a three-dimensional view of a propeller shroud, in accordance with some embodiments of the present disclosure.

FIGS. 10A, 10B, and 10C illustrate details of coupling a male part and a female part, in accordance with some embodiments of the present disclosure.

FIG. 10C illustrates details of a backstop for a male part, in accordance with some embodiments of the present disclosure.

FIGS. 11A, 11B, 12A, 12B, 12C, 13, 14, 15, 16, 17, and 18 illustrate details of a male part and a female part coupling with one another based on an attachment mechanism comprising a threaded interface, in accordance with some embodiments of the present disclosure.

FIG. 43 illustrates details of a male part and a female part coupling with one another based on an attachment mechanism comprising a threaded interface, in accordance with some embodiments of the present disclosure.

FIG. 44 illustrates details of a brace, in accordance with some embodiments of the present disclosure.

FIGS. 47A and 47B illustrate details of a male part 4700, in accordance with some embodiments of the present disclosure.

DETAILED DESCRIPTION

Figure 1:
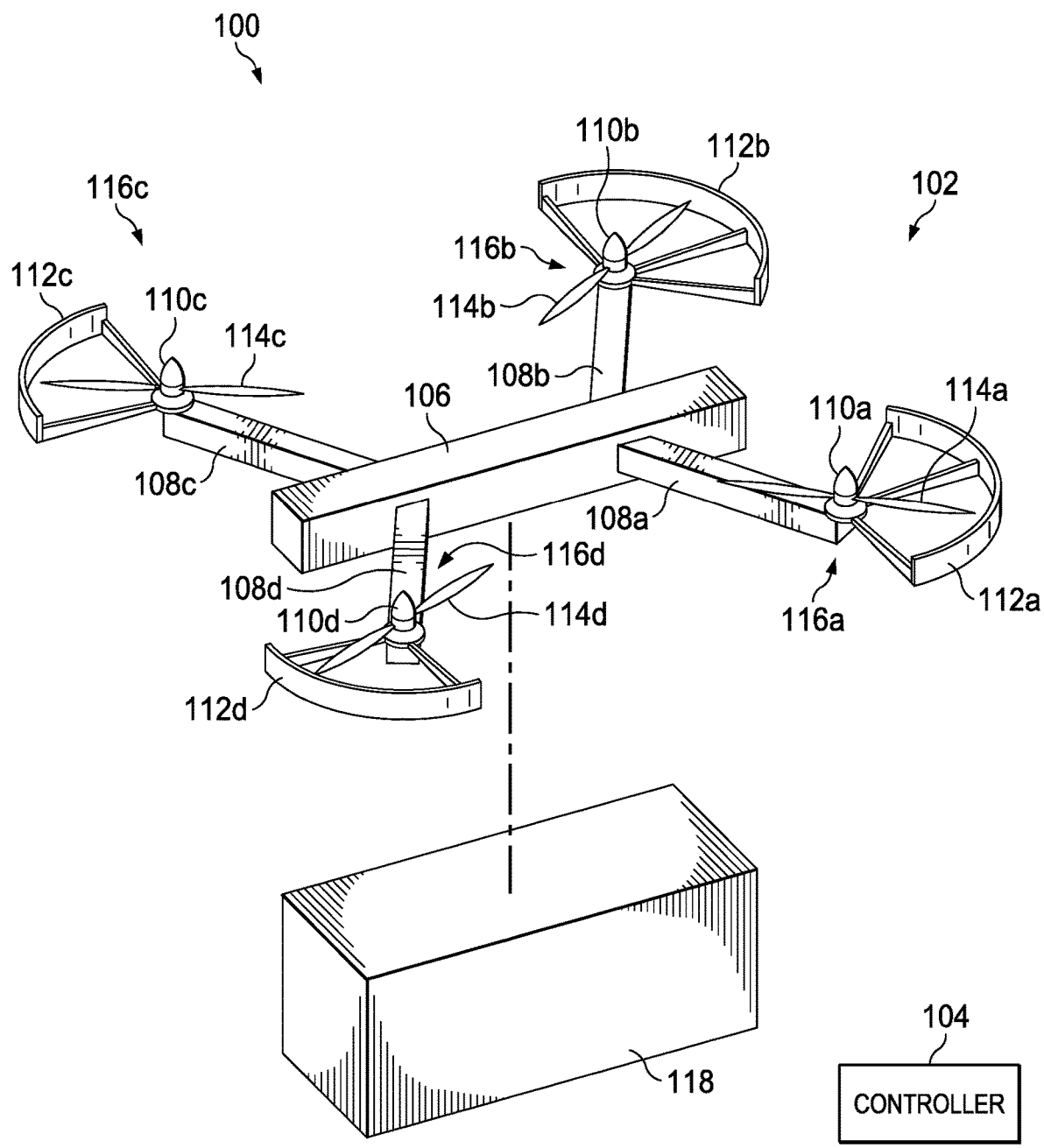
FIGS. 1, 2A, 2B, 3A, and 3B illustrate example aircraft, in accordance with some embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiments, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

FIG. 1 illustrates a system 100 which includes an aircraft, which in this case is a quadcopter 102, a payload 118, and a controller 104. The quadcopter 102 includes a fuselage 106, an airframe (not shown, hidden beneath the fuselage 106), supports 108a, 108b, 108c, and 108d, and drive systems 116a, 116b, 116c, and 116d. The drive systems 116a, 116b, 116c, and 116d include rotor hubs 110a, 110b, 110c, and 110d, respectively, and propeller shrouds 112a, 112b, 112c, and 112d, respectively. Each of the rotor hubs 110a, 110b, 110c, and 110d is rotatable and includes a plurality of rotor blades 114a, 114b, 114c, and 114d, respectively. The drive systems 116a, 116b, 116c, and 116d control direction, thrust, and lift of the quadcopter 102 for flight operations. In FIG. 1A, the quadcopter 102 is airborne while carrying the payload 118.

The controller 104 is operable to remotely control operation of the quadcopter 102. The controller 104 wirelessly transmits signals (e.g., radio signals) to and/or receives signals from the quadcopter 102. The controller 104 may control the quadcopter 102 during flight by actively adjusting a rotational speed of each of the drive systems 116a, 116b, 116c, and 116d to selectively control direction, thrust, and lift of the quadcopter 102. For example, each of the drive systems 116a, 116b, 116c, and 116d may be operated at a same rotational speed to uniformly lift the quadcopter 102 (e.g., during takeoff) or some may be operated at a different rotational speed relative to others to control a direction of the quadcopter 102 (e.g., to turn during flight). Alternatively, the controller 104 may transmit a set of instructions to the quadcopter 102 after which the quadcopter 102 may fly autonomously by updating a rotational speed of each of the drive systems based on the set of instructions (e.g., without any further input from the controller 104).

Figure 2A:
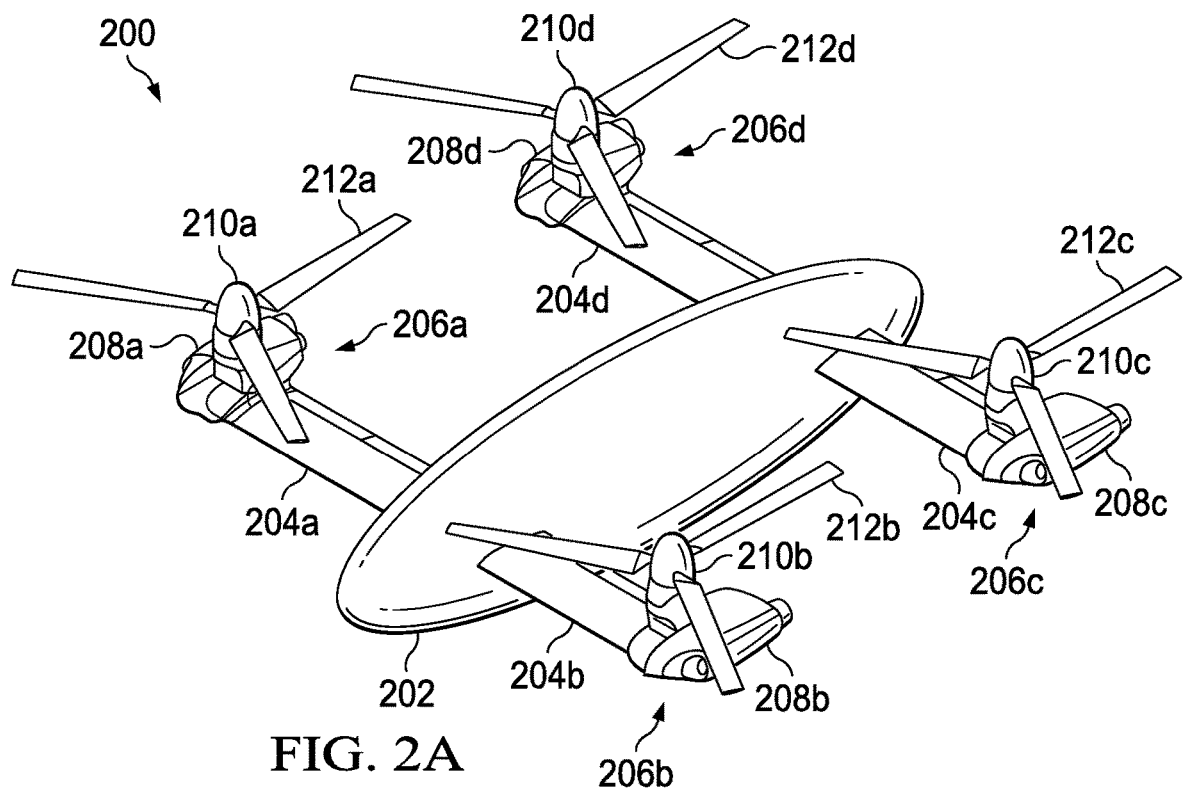
Figure 2B:
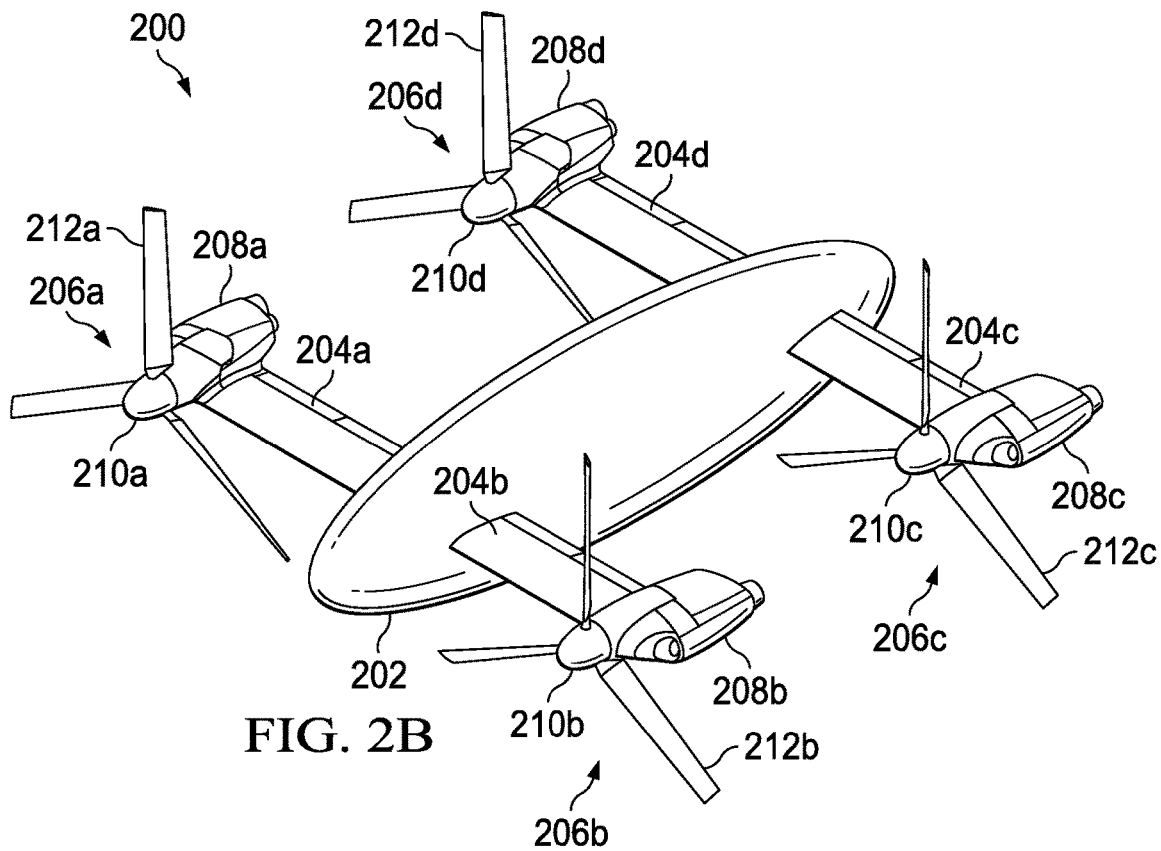

FIGS. 2A and 2B illustrate an exemplary aircraft, which in this case is a tiltrotor aircraft 200. Tiltrotor aircraft 200 includes a fuselage 202, wings 204a, 204b, 204c, and 204d, and drive systems 206a, 206b, 206c, and 206d. The drive systems 206a, 206b, 206c, and 206d include fixed engines 208a, 208b, 208c, and 208d, respectively, and proprotors 210a, 210b, 210c, and 210d, respectively. Each of the proprotors 210a, 210b, 210c, and 210d is rotatable and includes a plurality of rotor blades 212a, 212b, 212c, and 212d, respectively. The position of proprotors 210a, 210b, 210c, and 210d, as well as the pitch of the rotor blades 212a, 212b, 212c, and 212d, can be selectively controlled in order to selectively control direction, thrust, and lift of the tiltrotor aircraft 200.

FIG. 2A illustrates the tiltrotor aircraft 200 in helicopter mode, in which proprotors 210a, 210b, 210c, and 210d are positioned substantially vertical to provide a lifting thrust. FIG. 2B illustrates tiltrotor aircraft 200 in an airplane mode in which proprotors 210a, 210b, 210c, and 210d are positioned substantially horizontal to provide a forward thrust in which a lifting force is supplied by the wings 204a, 204b, 204c, and 204d. It should be appreciated that tiltrotor aircraft can be operated such that proprotors 210a, 210b, 210c, and 210d are selectively positioned between airplane mode and helicopter mode, which can be referred to as a conversion mode.

Figure 3A:
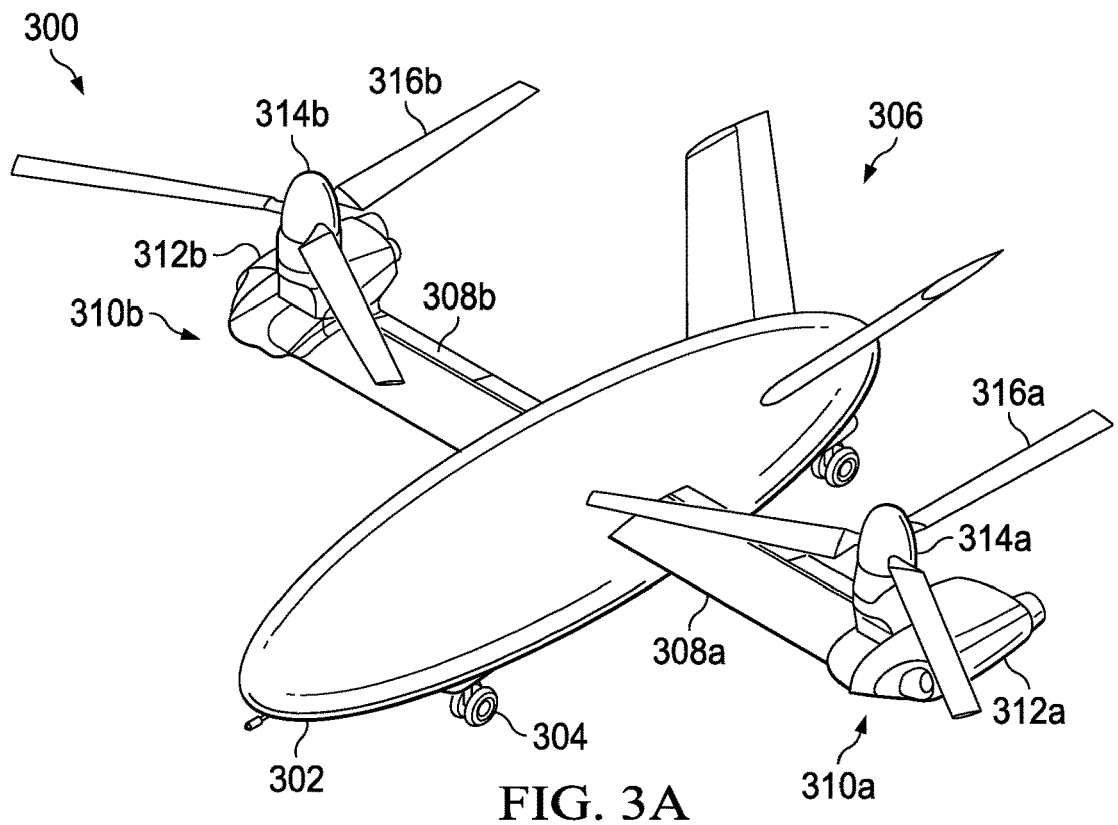
Figure 3B:
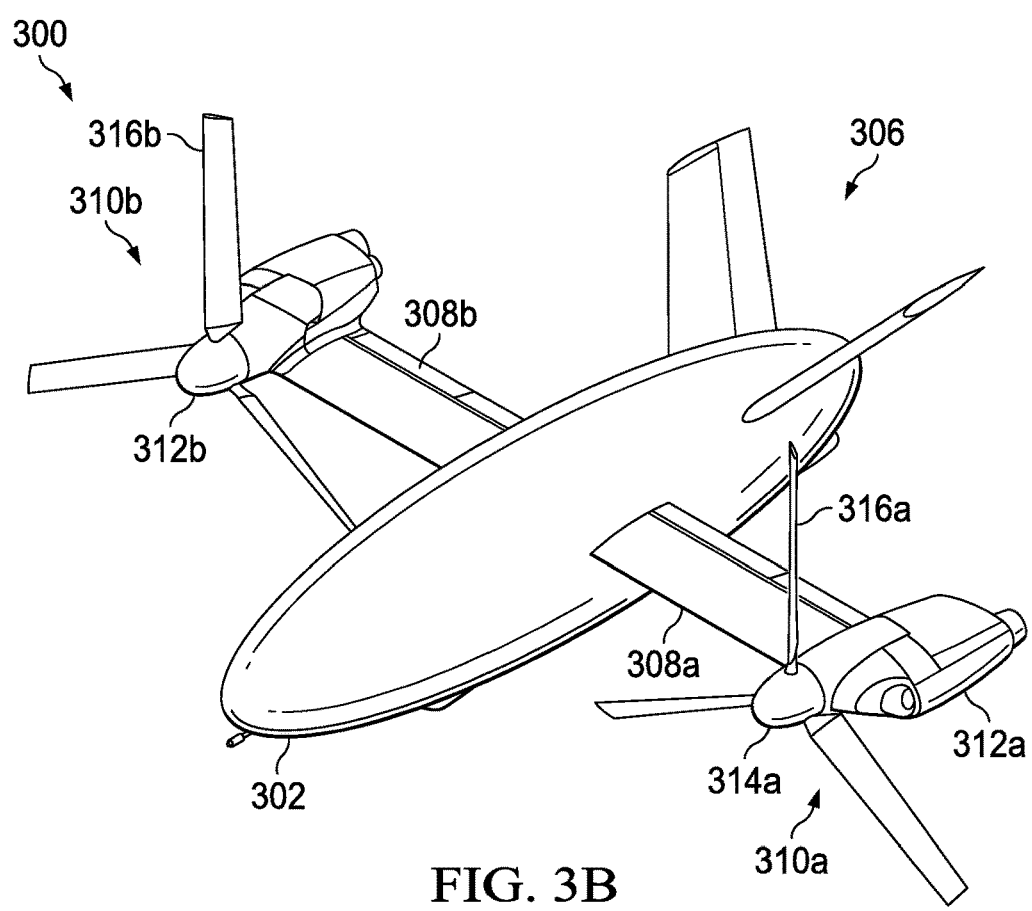

FIGS. 3A and 3B illustrate an exemplary aircraft, which in this case is a tiltrotor aircraft 300. Tiltrotor aircraft 300 includes a fuselage 302, a landing gear 304, a tail member 306, wings 308a and 308b, and drive systems 310a and 310b. The drive systems 310a and 310b include a fixed engines 312a and 312b, respectively, and proprotors 314a and 314b, respectively. Each of the proprotors 314a and 314b is rotatable and includes a plurality of rotor blades 316a and 316b, respectively. The position of proprotors 314a and 314b, as well as the pitch of rotor blades 316a and 316b, can be selectively controlled in order to selectively control direction, thrust, and lift of the tiltrotor aircraft 300.

FIG. 3A illustrates the tiltrotor aircraft 300 in helicopter mode, in which proprotors 314a and 314b are positioned substantially vertical to provide a lifting thrust. FIG. 3B illustrates tiltrotor aircraft 300 in an airplane mode in which proprotors 314a and 314b are positioned substantially horizontal to provide a forward thrust in which a lifting force is supplied by wings 308a and 308b. It should be appreciated that tiltrotor aircraft can be operated such that proprotors 314a and 314b are selectively positioned between airplane mode and helicopter mode, which can be referred to as a conversion mode.

It should be appreciated that the quadcopter 102, the tiltrotor aircraft 200, and the tiltrotor aircraft 300 of FIGS. 1, 2A, 2B, 3A, and 3B are merely illustrative of a variety of aircraft that can be used to implement embodiments of the present disclosure. Other aircraft implementations can include, for example, fixed wing airplanes, hybrid aircraft, gyrocopters, drones, a variety of helicopter configurations, among other examples. In some examples, one or more of the quadcopter 102, the tiltrotor aircraft 200, and the tiltrotor aircraft 300 is an unmanned aerial vehicle (UAV). In other examples, one or more of the quadcopter 102, the tiltrotor aircraft 200, and the tiltrotor aircraft 300 is a manned aircraft. Moreover, it should be appreciated that even though aircraft are particularly well suited to implement embodiments of the present disclosure, the described embodiments can also be implemented using non-aircraft vehicles and devices.

Aircraft can carry a payload during flight. For example, FIG. 1 illustrates the quadcopter 102 carrying the payload 118 during flight. A maximum payload of an aircraft is a weight describing a load carrying capacity of the aircraft during flight. The maximum payload of the aircraft is a limit that, if exceeded, could inhibit the ability of the aircraft to safely fly. In some examples, the quadcopter 102 may be physically unable to take-off and/or remain airborne while attempting to carry a weight that exceeds the maximum payload.

The maximum payload limits the use of an aircraft for supporting various payloads. For example, an aircraft may be inoperable to independently support a weight larger than the maximum payload. This challenge may be addressed, for example, by employing a larger aircraft with a higher maximum payload. However, a larger aircraft may be bulky and/or costly to deploy, rendering it unusable in situations with tight spatial constraints and/or too expensive for some applications.

A solution to the above-identified challenges (and others) disclosed herein includes a coupling system for rigidly attaching aircraft to one another based on an attachment mechanism. For example, the coupling system may include a male part and a female part that, when attached to separate aircraft, couple the aircraft to one another based on the attachment mechanism. Walls of the male part and the female part have structural load carrying capacity that facilitate the transfer of loads between the aircraft and enable the combined two, or more, aircraft to carry a payload that is greater than the maximum payload of any of the individual aircraft. The embodiments described throughout this disclosure provide numerous technical advantages including that the coupled aircraft (i.e., coupled together by the male part and the female part) can carry a payload that is greater than the maximum payload of any of the individual aircraft.

An attachment mechanism is inclusive of a component to fasten and resist relative movement between male and female parts of aircraft coupled together via the attachment mechanism. For example, in various embodiments, an attachment mechanism may include, but not be limited to, a fastener, a screw, a male thread, a female thread, a latch, an indentation, a notch, a channel, a lip, a hook-and-loop fastener, a pin, a recess, a lock bolt, a bladder, an adhesive material, a grapple, a grapple attachment, a welding element, a conveyor, a gripper, a pump, a magnet for fastening male and female parts, combinations thereof, or the like. In some embodiments, an attachment mechanism includes a motor operable to generate power to regulate a mechanical engagement between male and female parts. In further embodiments, an attachment mechanism includes a magnet to regulate the mechanical engagement based on a magnetic attraction or repulsion. For example, an electromagnet may generate a magnetic field to regulate the mechanical engagement.

Some embodiments of the present disclosure are illustrated or described in the context of coupling one or more unmanned aerial vehicles (UAVs). However, the teachings and the embodiments of the present disclosure are not limited to use with UAVs. Indeed, the teachings and the embodiments of the present disclosure are applicable to a multitude of different aircraft including (but not limited to) manned aircraft, fixed wing airplanes, hybrid aircraft, gyrocopters, drones, and a variety of helicopter configurations.

Figure 4:
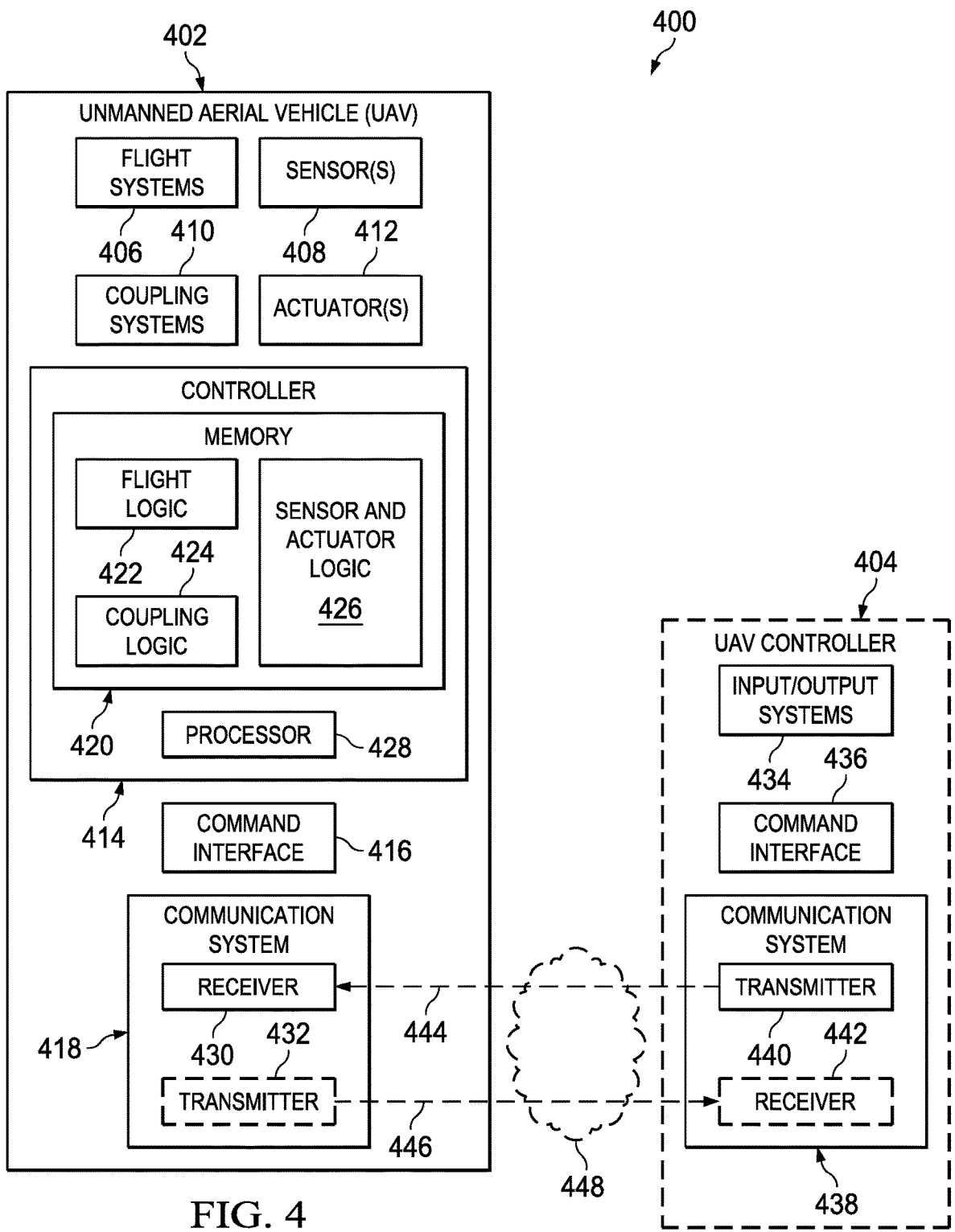
FIG. 4 illustrates a simplified component diagram of an aircraft with systems for coupling to another aircraft, in accordance with some embodiments of the present disclosure.

FIG. 4 illustrates a simplified component diagram of a system 400 including an unmanned aerial vehicle (UAV) 402 with systems for coupling to another aircraft and a UAV controller 404 for controlling the UAV, in accordance with some embodiments of the present disclosure. The UAV 402 includes flight system 406, sensors 408, coupling systems 410, actuators 412, a controller 414, a command interface 416, and a communication system 418.

The flight systems 406 are to facilitate flight of the UAV 402. For example, the flight systems 406 can include wings, engines, drive systems, fuel systems, cooling systems, propellers, and/or other components for flying the UAV 402.

The coupling systems 410 are to facilitate coupling the UAV 402 to another aircraft. As an example, the coupling systems 410 can include a male part and/or a female part with an attachment mechanism for attaching the part to another aircraft. The attachment mechanism may include any one or more of the attachment mechanisms disclosed herein. The aircraft may remain coupled during flight. For example, the coupling may occur during flight or may occur before flight (e.g., while the aircraft are grounded) and remain coupled during the flight. The aircraft may decouple during flight. As an example, after two or more coupled aircraft have completed transport of a shared payload, the aircraft may decouple while airborne and then operate independent of one another.

The sensors 408 detect a status of systems and/or components onboard the aircraft such as the flight systems 406, the coupling systems 410, and/or other systems. For example, each of the sensors 408 may detect the status of a specific component in the flight systems 406 and/or the coupling systems 410. The actuators 412 provide an output to drive activity of the systems and/or components onboard the aircraft such as the flight systems 406, the coupling systems 410, and/or other systems. For example, each of actuators 412 may provide an output to control of a specific component in the flight systems 406 and/or the coupling systems 410.

The controller 414 controls systems of the UAV 402 such as the flight systems 406, the coupling systems 410, the sensors 408, and the actuators 412. The controller 414 includes a memory 420 and a processor 428. The memory 420 stores flight logic 422, which includes instructions for controlling flight of the UAV 402; coupling logic 424, which includes instructions for controlling coupling the UAV 402 to another aircraft; and sensor and actuator logic 426, which includes instructions for controlling the sensors 408 and the actuators 412. In some examples, the sensor and actuator logic 426 includes instructions that relate sensor readings detected by the sensors 408 to specific components onboard the UAV 402 and functions to determine an output for the actuators 412 based on the sensor readings and a desired status of the specific components.

The processor 428 executes instructions from the memory 420 and/or other memory elements such as other memory onboard or remote to the UAV 402. The processor 428 may comprise a microprocessor, controller, an application-specific integrated circuit (ASIC), a field programmable gate array (FPGA), digital signal processor (DSP), or any other suitable computing device, resource, or combination of hardware, stored software and/or encoded logic operable to process data.

The memory 420 may comprise any form of volatile or non-volatile memory including, without limitation, magnetic media (e.g., one or more tape drives), optical media, random access memory (RAM), read-only memory (ROM), flash memory, removable media, an erasable programmable read only memory (EPROM), an electrically erasable programmable ROM (EEPROM)), a memory element in an application-specific integrated circuit (ASIC), a memory element in a field programmable gate array (FPGA), or any other suitable memory component or components.

Operations outlined herein may be implemented using logic, which can include fixed logic, hardware logic, programmable logic, digital logic, etc. For example, in some embodiments, logic may be encoded in one or more tangible media, which may be inclusive of non-transitory tangible media and/or non-transitory computer readable storage media (e.g., embedded logic provided in an ASIC, embedded logic provided in an FPGA, logic provided digital signal processing instructions, in software [potentially inclusive of object code and source code] to be executed by a processor, or other similar machine, etc.).

In some examples, the controller 414 controls the flight systems 406 and/or the coupling systems 410 based on a feedback loop involving the sensors 408 and the actuators 412. The feedback loop can include the sensors 408 detecting a current status (e.g., a position) of a component and the actuators 412 generating an output to move the component to a different status (e.g., a different position based on the current status detected by the sensors 408) at which the feedback loop repeats by detecting a new status via the sensors 408 and generating a new output via the actuators 412. The controller 414 can control the systems of the UAV 402 based on a signal 444 received from the UAV controller 404, which is remote from the UAV 402. The UAV 402 can also transmit data to the UAV controller 404 based on a signal 446.

The controller 414 communicates with the UAV controller 404 via the communication system 418. The communication system 418 and the command interface 416 cooperate to process data received from the UAV controller 404 and to transmit data to the UAV controller 404. The communication system 418 includes a receiver 430 for receiving the signal 444 from the UAV controller 404. The signal 444 may be received directly from the UAV controller 404 such as by a radio frequency transmission. The signals may be received over a network 448 such as a packet switched network, a satellite network, the Internet, or other network. In some examples, the communication system 418 also includes a transmitter 432 for transmitting the signal 446 to the UAV 402. The signal 446 may include a status of the UAV 402 itself such as location coordinates of the UAV 402. The signal 446 may include an operational status of components onboard the UAV 402 such a fuel level, whether the UAV 402 is coupled to another aircraft, and/or an indication of whether a drive system is properly functioning. The command interface 416 translates the signal 444 from a format as received by the receiver 430 to instructions executable by the systems, controllers, and/or processors onboard the UAV 402. Similarly, the command interface 416 translates from a format generated by the systems, controllers, and/or processors onboard the UAV 402 to a format for transmission as the signal 446 by the transmitter 432.

The UAV controller 404 is operable to remotely control operation of the UAV 402. The UAV controller 404 wirelessly transmits signals (e.g., radio signals) to and/or receives signals from the UAV 402. The UAV controller 404 is an example of the controller 104 of FIG. 1. The UAV controller 404 includes input/output system 434, a command interface 436, and a communication system 438. The input system of the input/output system 434 is to receive input operable to control the UAV 402. The output system of the input/output system 434 is to provide output based on an activity and/or a status of the UAV 402. The input system can include, for example, one or more of a button, a key, a joystick, a keyboard, a mouse, a display device (e.g., a touchscreen display), a joystick, a mobile device, and/or a computing device. The input system can receive inputs such as movement of a joystick in a direction or a keypress on an arrow key to control movement of the UAV 402 in a corresponding direction. The output system can include, for example, a display device such as a screen, a speaker, a haptic feedback system including a vibratory element, a mobile device, and/or a computing device. The output device can generate outputs that correspond to activity and/or status of the UAV 402. For example, the output device can generate a visual output via the display device, an audible signal via the speaker, and/or a tactile output via the vibratory element to identify whether the UAV 402 is coupled to another aircraft, whether a coupling system is properly functioning, and/or whether a drive system is properly functioning. The input/output system 434 transmits input signals to and receives output signals from the communication system 438 via the command interface 436.

The communication system 438 includes a transmitter 440 for transmitting a signal 444 to the UAV 402. In some examples, the communication system 418 also includes a receiver 442 for receiving the signal 446 from the UAV 402. The communication system 438 and the command interface 436 cooperate to process data received from the UAV 402 and to transmit data to the UAV 402. The communication system 438 and the command interface 436 in the UAV controller 404 operate similar to the communication system 418 and the command interface 416 in the UAV 402; a difference is that the communication system 438 and the command interface 436 in the UAV controller 404 translates signals to and from the input/output system 434 in the UAV controller 404. Input received by the input/output system 434 is translated by the command interface 436 to commands that are executable by the UAV 402. The communication system 438 transmits the commands over the transmitter 440, e.g., as the signal 444. The command interface 436 translates the signal 446 from a format as received by the receiver 442 to commands that are executable by the input/output system 434.

Figure 5:
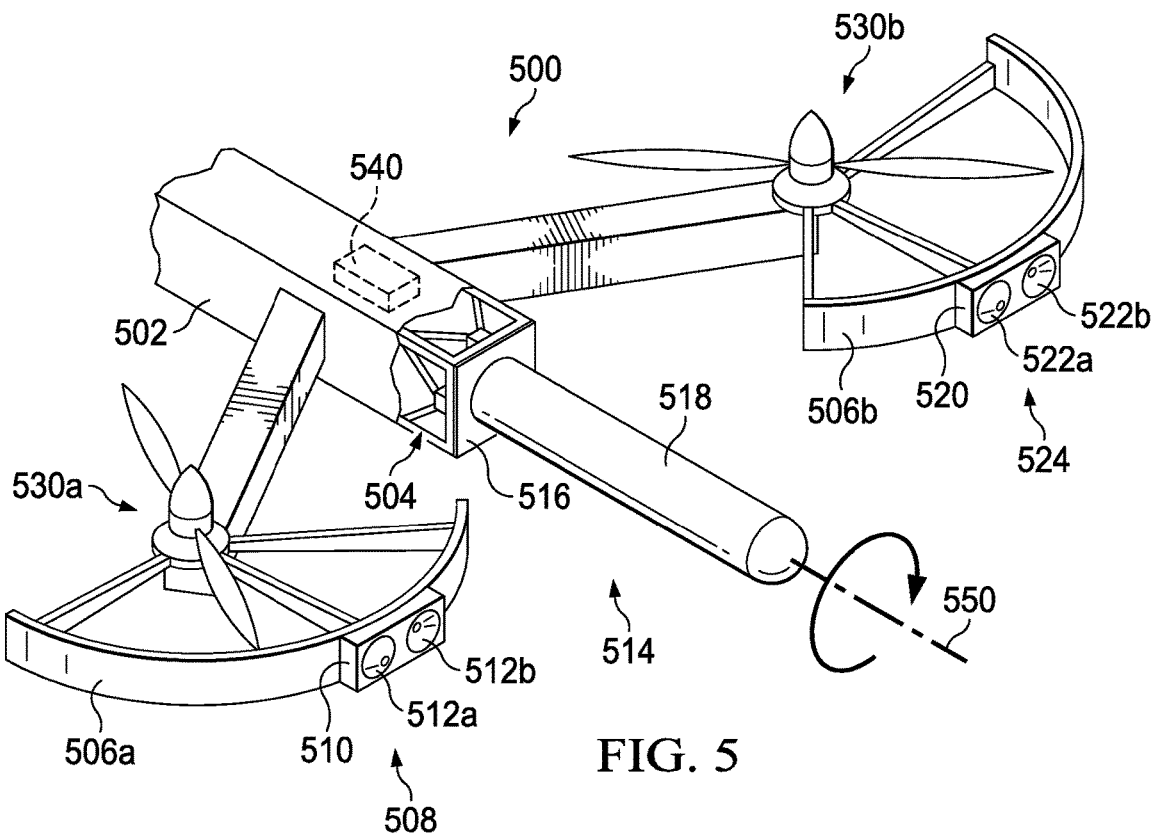
FIG. 5 shows a three-dimensional view of a male part attached to an aircraft, in accordance with some embodiments of the present disclosure.

FIG. 5 shows a three-dimensional view of a male part 514 attached to an aircraft 500, in accordance with some embodiments of the present disclosure. The aircraft 500 includes an airframe 504, a fuselage 502, drive systems 530a, 530b, 530c (see FIG. 9A), and 530d (see FIG. 9A), and the male part 514. The airframe 504 supports an outer surface of the fuselage 502. Each of the drive systems 530a, 530b, 530c, and 530d includes rotor hubs (each including a plurality of rotor blades) and propeller shrouds 506a, 506b, 506c (see FIG. 9A), and 506d (see FIG. 9A). The propeller shrouds 506a and 506b include shroud couplings 508 and 524, respectively. The aircraft 500 is an example of the quadcopter 102 of FIG. 1; several details of the aircraft 500 are not repeated here only of the sake of brevity. Some embodiments include a motor 540, which provides power to generate a mechanical engagement between the male part 514 and a female part. For example, the motor 540 can generate a relative rotation between the male part 514 and the female part (e.g., for a threaded interface), and can provide power to engage a latch mechanism, a lock-bolt mechanism, a pressurized interface, and/or a magnetic interface. In some examples, the motor 540 is a servomotor.

The male part 514 is for coupling the aircraft 500 to another aircraft such as the aircraft 600 of FIG. 6 described below. The male part 514 includes a wall 518, a plate 516, and an attachment mechanism (not labeled in FIG. 5). The wall 518 is attached to the airframe 504 by the plate 516. For example, one or more fasteners may attach the plate 516 to the airframe 504. The wall 518 forms a shaft that extends from the aircraft 500. The shaft is tubular in shape. The attachment mechanism regulates a mechanical engagement between the wall 518 and another aircraft while the aircraft 500 and the other aircraft are airborne. In some cases, the other aircraft includes a female part, e.g., as described with respect to FIG. 6, below. The attachment mechanism regulates the mechanical engagement between the shaft on the male part 514 and the female part on the other aircraft. The attachment mechanism is operable to switch between an engaged position and a disengaged position. In the engaged position, the attachment mechanism initiates the mechanical engagement to rigidly attach the aircraft 500 and the other aircraft to one another. In the disengaged position, the attachment mechanism discontinues the mechanical engagement to detach the aircraft 500 and the second aircraft from one another. Several attachment mechanisms are described in further detail below.

The propeller shrouds 506a and 506b include shroud couplings 508 and 524, respectively. Each of the shroud couplings 508 and 524 includes plates 510 and 520, respectively, attached to the corresponding propeller shroud. Each plate includes a projection and an indentation. The plate 510 includes a projection 512a and an indentation 512b. The plate 520 includes a projection 522a and an indentation 522b. The shroud couplings 508 and 524 are configured to nest within corresponding shroud couplings on another aircraft while the aircraft 500 is coupled with the other aircraft. The shroud couplings 508 and 524 being nested within corresponding shroud couplings helps stabilize the two aircraft when coupled to one another, for example, by resisting relative rotation (e.g., about the axis 550) between the two aircraft.

Figure 6:
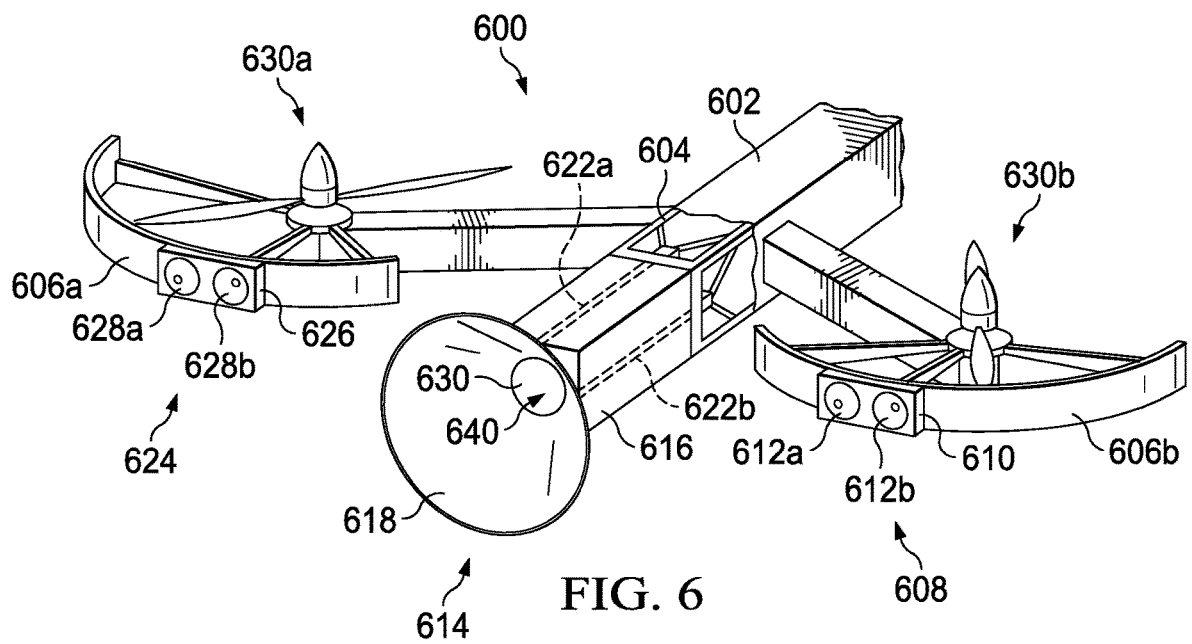
FIG. 6 shows a three-dimensional view of a female part attached to an aircraft, in accordance with some embodiments of the present disclosure.

FIG. 6 shows a three-dimensional view of a female part 614 attached to an aircraft 600, in accordance with some embodiments of the present disclosure. The aircraft 600 includes an airframe 604, a fuselage 602, drive systems 630a, 630b, 630c (see FIG. 9A), and 630d (see FIG. 9A), and the female part 614. The airframe 604 supports an outer surface of the fuselage 602. Each of the drive systems 630a, 630b, 630c, and 630d includes rotor hubs (each including a plurality of rotor blades) and propeller shrouds 606a, 606b, 606c (see FIG. 9A), and 606d (see FIG. 9A). The propeller shrouds 606a and 606b include shroud couplings 608 and 624, respectively. The aircraft 600 is an example of the quadcopter 102 of FIG. 1; several details of the aircraft 600 are not repeated here only of the sake of brevity.

The female part 614 is for coupling the aircraft 600 to another aircraft such as the aircraft 500 of FIG. 5. The wall 616 attaches the female part 614 to the airframe 604. FIG. 7A illustrates further details of the female part 614. The female part 614 includes a wall 616, a cavity 640, a cone 618, and ribs 622a, 622b, 622c, and 622d, and an attachment mechanism (not shown). In FIG. 7A, the cone 618 is dashed to reveal the ribs 622a, 622b, 622c, and 622d. A wall 630 forms the cavity 640. The cavity 640 is a tubular cavity corresponding in shape to the tube on the male part 514. The ribs 622a, 622b, 622c, and 622d are attached between the wall 630 and the wall 616. The 622a, 622b, 622c, and 622d increase a load-carrying capacity of the female part 614 by stiffening and, thereby, increasing the moment-bearing capacity of the walls 630 and 616. The cone 618 is to guide a male part into the cavity 640. The cone 618 is attached to and extends from the wall 630. The attachment mechanism regulates a mechanical engagement between the female part 614 and another aircraft while the aircraft 600 and the other aircraft are airborne. In some cases, the other aircraft includes a male part, e.g., as described with respect to FIG. 5. The attachment mechanism regulates the mechanical engagement between the cavity 640 on the female part 614 and the male part on the other aircraft. The attachment mechanism is operable to switch between an engaged position and a disengaged position. In the engaged position, the attachment mechanism rigidly attaches the aircraft 600 and the other aircraft to one another. In the disengaged position, the attachment mechanism detaches the aircraft 600 and the other aircraft from one another. Several attachment mechanisms are described in further detail below.

Turning back to the FIG. 6, each of the shroud couplings 608 and 624 includes plates 610 and 626, respectively, attached to the corresponding propeller shroud. Each plate includes a projection and an indentation. The plate 610 includes a projection 612*a* and an indentation 612*b*. The plate 626 includes a projection 628*a* and an indentation 628*b*. The shroud couplings 608 and 624 are configured to nest within corresponding shroud couplings on another aircraft such as shroud couplings 508 and 524 on the aircraft 500 while the aircraft 600 and the aircraft 500 are coupled. The shroud couplings 608 and 624 being nested within corresponding shroud couplings helps stabilize the two aircraft when coupled to one another by resisting relative rotation between the two aircraft.

FIG. 7B illustrates details of an alternative version of the female part 614, in accordance with some embodiments of the present disclosure. In such embodiments, the female part 614 includes limit switches 650*a*, 650*b*, 650*c*, and 650*d*, each of which is attached to and extends from a wall of the female part 614. Each of the limit switches 650*a*, 650*b*, 650*c*, and 650*d* is operable to deflect (e.g., bend) based on contact with another object (such as a male part) and to provide an output such as an electrical signal indicating such deflection and/or an amount of the deflection. In some examples, the electrical signal can be used to guide movement of aircraft to align the female part 614 with a male part while attempting to couple the female part 614 and the male part during flight. The limit switches are an example of a sensor operable to detect a proximity between two aircraft. In some examples, an attachment mechanism is operable to switch between an engaged position and a disengaged position based on the proximity of the two aircraft detected by such a sensor. Embodiments of the present disclosure are not limited to limit switches and may utilize any sensor.

FIG. 8 shows a three-dimensional view of a propeller shroud 800, in accordance with some embodiments of the present disclosure. The propeller shroud 800 is an example of the propeller shrouds 506*a* and 506*b* on the aircraft 500 and the propeller shrouds 606*a* and 606*b* on the aircraft 600. The propeller shroud 800 includes a hub 804, supports 802*a*, 802*b*, 802*c*, a guard 810, and a shroud coupling 812. The hub 804 includes an opening 806 and openings 808. The opening 806 enables a propeller driveshaft to pass through the hub 804. The openings 808 are to attach the hub 804 to an aircraft, e.g., with fasteners. The supports 802*a*, 802*b*, 802*c* extend from the hub 804 and support the guard 810. The guard 810 stops a propeller from colliding with other objects.

The shroud coupling 812 is to engage the propeller shroud 800 with another propeller shroud similar to the propeller shroud 800. The shroud coupling 812 includes a plate 814, a conical projection 816*a* extending from the plate 814, and a conical indentation 816*b* recessed into the plate 814. When the shroud coupling 812 engages with another shroud coupling, the conical projection 816*a* nests into a conical indentation (similar to the conical indentation 816*b*) and another conical projection (similar to the conical projection 816*a*) nests into the conical indentation 816*b*. The shroud couplings being nested within one another resisting relative movement between the two aircraft to which the shroud couplings are attached.

FIGS. 9A, 9B, 9C, and 9D illustrate the aircraft 500 (of the FIG. 5) and the aircraft 600 (of the FIG. 6) docking while airborne and carrying an increased payload based on coupling the male part 514 and the female part 614, in accordance with some embodiments of the present disclosure. In some examples, the aircraft 500 and the aircraft 600 are a same model of aircraft. FIGS. 10A, 10B, and 10C illustrate details of coupling the male part 514 and the female part 614, in accordance with some embodiments of the present disclosure.

Figure 9A:
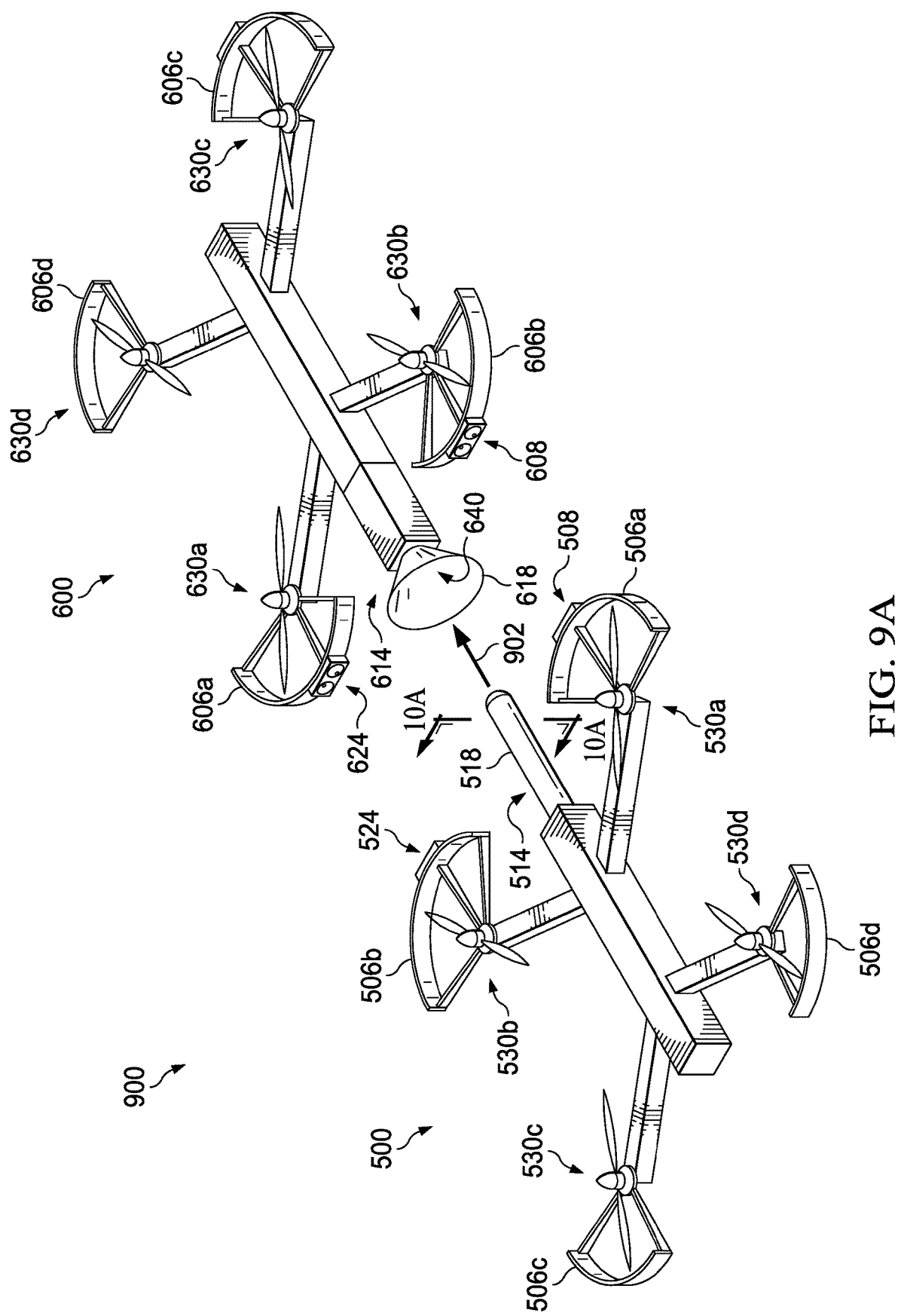
FIGS. 9A, 9B, 9C, and 9D illustrate two aircraft docking while airborne and carrying an increased payload based on coupling a male part and a female part, in accordance with some embodiments of the present disclosure.

FIG. 9A illustrates the aircraft 500 and the aircraft 600 airborne and uncoupled based on the male part 514 and the female part 614 being disengaged from one another. The aircraft 500 and 600 are described with respect to FIGS. 5 and 6, respectively. Details of the aircraft 500 and 600 are not repeated here only of the sake of brevity. FIG. 10A illustrates a cross section of the male part 514 and the female part 614 in the disengaged position from a viewpoint as generally indicated by arrows labeled "10A" in FIG. 9A. The male part 514 and the female part 614 are described with respect to FIGS. 5, 6, and 7A. Details of the male part 514 and the female part 614 are not repeated here only of the sake of brevity. One difference in the FIG. 10A is that the male part 514 is shown with a backstop 1002, which is present in some embodiments. In the disengaged position shown in FIGS. 9A and 10A, the aircraft 500 is advancing toward the aircraft 600 as indicated by the arrow 902 (FIG. 9A) based on thrust provided by the drive systems. The male part 514 and the female part 614 are not contacting one another and are not engaged with one another as shown in FIGS. 9A and 10A. In addition, the shroud couplings 508 and 524 on the aircraft 500 are not engaged with the shroud couplings 608 and 624 on the aircraft 600.

As the aircraft 500 and the aircraft 600 continue advancing toward one another, the male part 514 is inserted into the female part 614. In this example, the male part 514 and the female part 614 are aligned with one another. An axis 1004 passes through a centerline of the shaft formed by the wall 518 and through a centerline of the cavity 640, as shown in FIG. 10A. If the male part 514 and the female part 614 are misaligned during the insertion (e.g., oriented at an oblique angle relative to the axis 1004), the cone 618 can guide the male part 514 into the cavity 640.

Figure 9C:
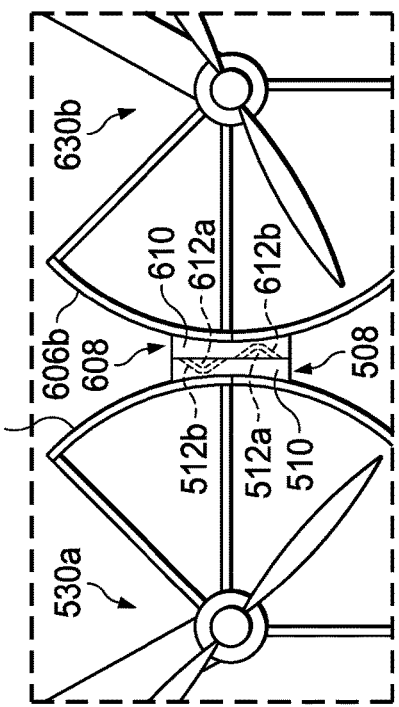
Figure 9B:
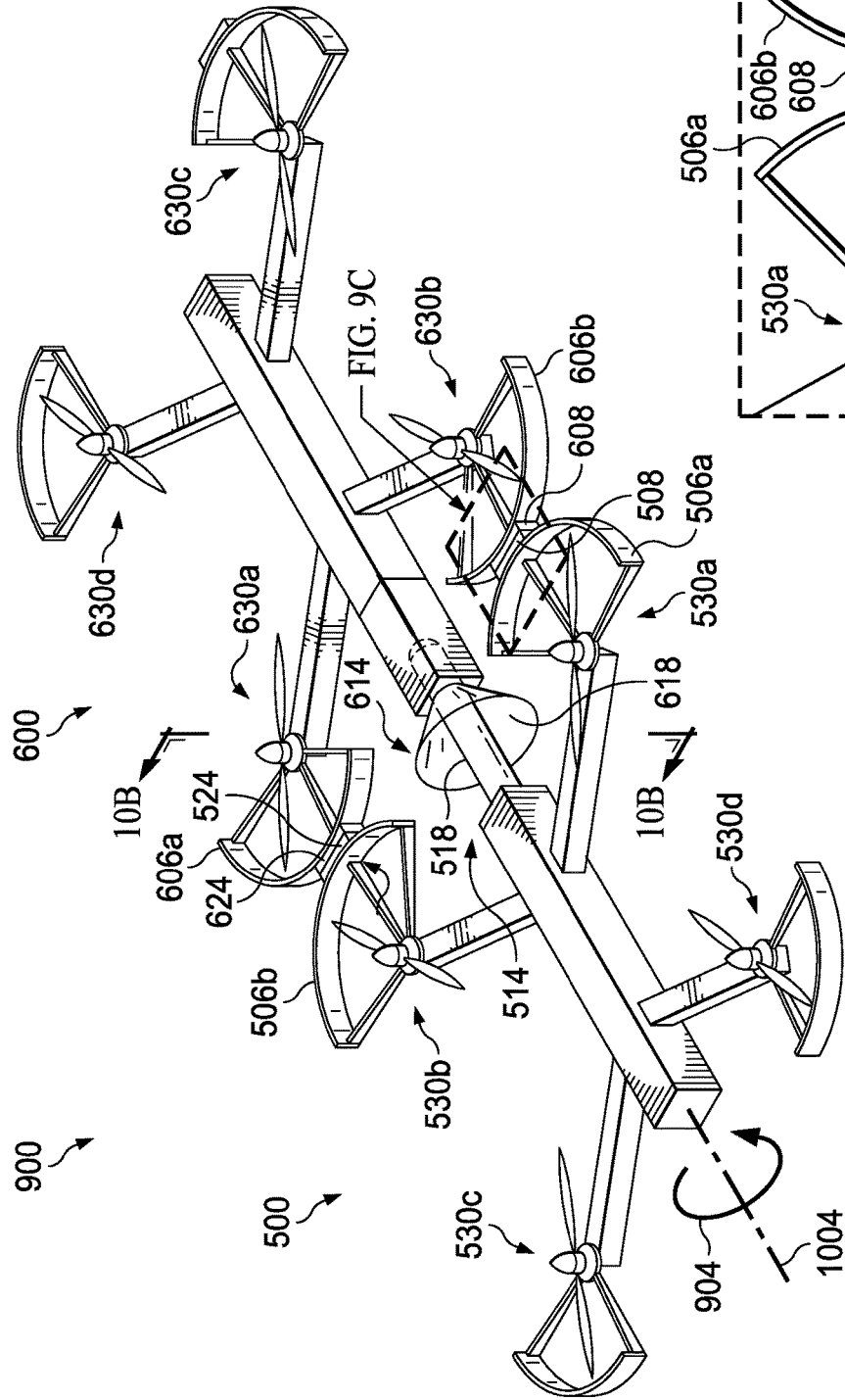

FIG. 9B illustrates the aircraft 500 and the aircraft 600 airborne and coupled to one another based on the male part 514 and the female part 614 being engaged with one another. FIG. 10B illustrates a cross section of the male part 514 and the female part 614 in the coupled with one another from a viewpoint as generally indicated by arrows labeled "10B" in FIG. 9B. When coupled, as shown in FIGS. 9B and 10B, the wall 518 forming the shaft of the male part 514 is nested within the wall 630 forming the cavity 640 of the female part 614. This wall 518 nesting within the wall 630 creates a mechanical engagement between the male part 514 and the female part 614. In some examples, the mechanical engagement is caused by an attachment mechanism generating a force to hold together the male part 514 and the female part 614. For example, a bending moment 1006 is transferred between the male part 514 and the female part 614, shown in FIG. 10B. The ribs 622*a*, 622*b*, 622*c*, and 622*d* increase the moment-bearing capacity of the walls 630 and 616 of the female part 614 and enable them to support the bending moment 1006. In some example, the ribs 622*a*, 622*b*, 622*c*, and 622*d* extend along the cone 618 to further increase the moment-bearing capacity of the female part 614.

When the male part 514 and female part 614 are coupled, the backstop 1002 contacts the cone 618 and prevents the wall 518 of male part 514 from being further inserted into the wall 630 of the female part 614, as shown in the FIG.

10B. FIG. 10C illustrates details of the backstop 1002, in accordance with some embodiments of the present disclosure. In this example, the backstop 1002 comprises a rectangular wall including an opening through which the wall 518 extends.

FIG. 9C illustrates a view from above drive systems of the aircraft 500 and the aircraft 600 while the aircraft 500 and 600 are coupled to one another, as shown from a viewpoint as generally indicated by an area labeled "9C" in FIG. 9B. FIG. 9C shows the drive system 530a, propeller shroud 506a, and shroud coupling 508 of the aircraft 500 and the drive system 630a, propeller shroud 606a, and shroud coupling 608 of the aircraft 600. The shroud couplings 508 and 608 are engaged with one another. The projection 512a of the shroud coupling 508 nests within the indentation 612b of the shroud coupling 608 and the projection 612a of the shroud coupling 608 nests within the indentation 512b of the shroud coupling 508.

The shroud couplings 508 and 608 being engaged with one another can resist relative rotation between the aircraft 500 and 600 such as resisting the rotation 904 about the axis 1004 as illustrated in the FIG. 9B. Any attempted relative rotation such as the rotation 904 between the aircraft 500 and 600 would cause a shear force in the nested projections and indentations of the shroud couplings 508 and 608. A shear reaction force provided by the shroud couplings 508 and 608 resists and, thereby, inhibits such relative rotation.

Figure 9D:
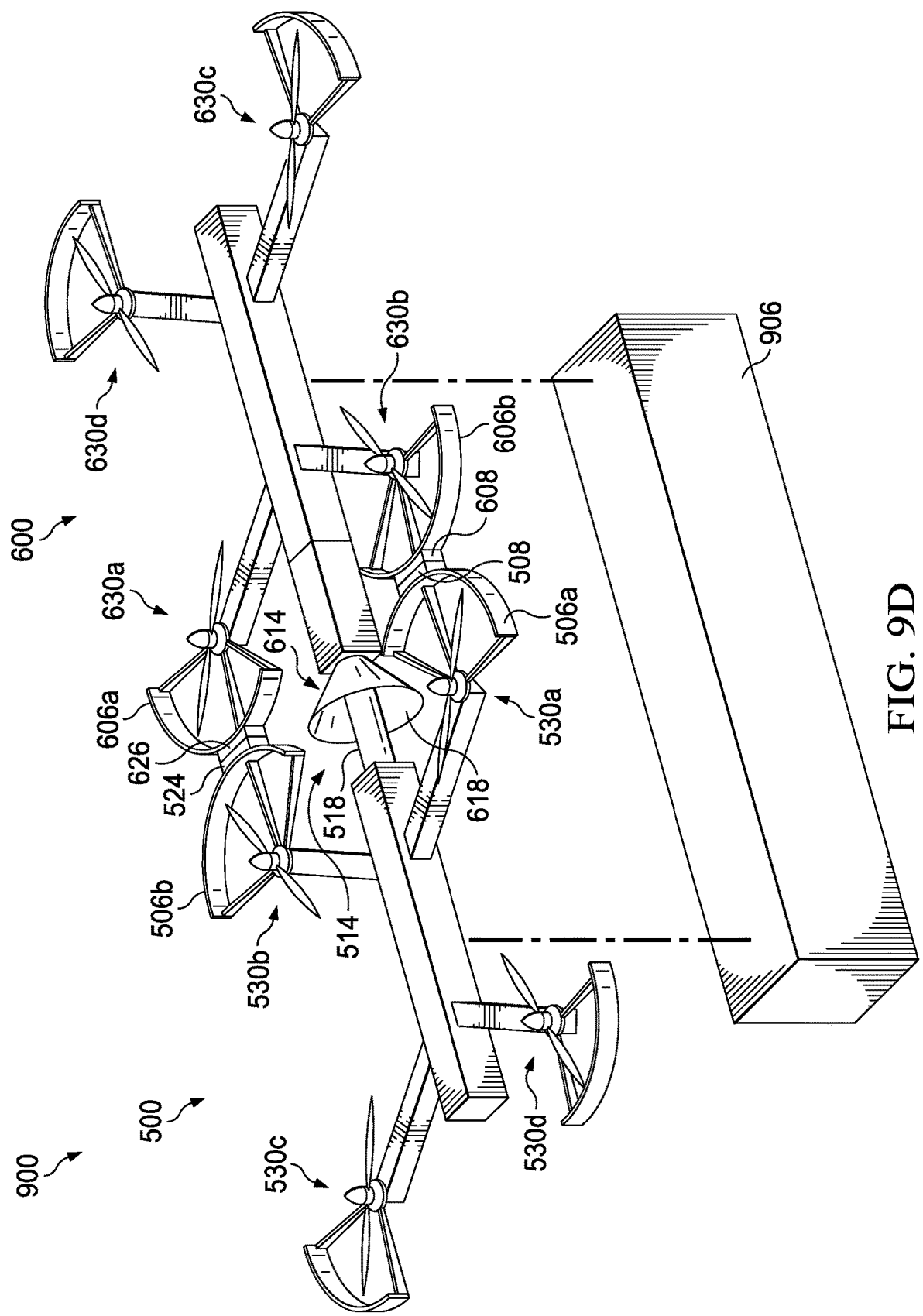

FIG. 9D illustrates the aircraft 500 and 600 docking while airborne and carrying an increased payload the based on coupling the male part 514 and the female part 614. As an example, each of the aircraft 500 and 600 is able to individually carry the payload 118 such as illustrated in FIG. 1. A payload 906 of FIG. 9D is greater than the maximum payload of either of the individual aircraft. Neither of the aircraft 500 and 600 is able to individually carry the payload 906. Advantageously, because the aircraft 500 and 600 are coupled to one another by the male part 514 and the female part 614 (e.g., as described with respect to FIGS. 9B, 9C, and 10B), they can collectively carry the payload 906, which is greater than the maximum payload of either of the individual aircraft. In some embodiments, a weight of the payload 906 is 1.5 times, or more, greater than a weight of the payload 118 (i.e., weight of payload 906≥1.5*weight of payload 118). The aircraft 500 and 600 being coupled can cause a transfer of one or more mechanical forces between the male part 514 and the female part 614. The mechanical forces can include, for example, a bending moment, a torsional force, a shear force, a tensile force, and/or a compressive force. The male part 514 and the female part 614 have a structural capacity to withstand such forces without failure. The aircraft 500 and 600 distribute at least a portion of the weight of the payload 906 across the male part 514 and the female part 614. This distribution of load can cause a bending moment (such as the bending moment 1006 illustrated in FIG. 10B), which is resisted based on the moment carrying capacity of the male part 514 and the female part 614. In other examples, a mechanical force is generated based on a difference in thrust generated by the aircraft 500 and the aircraft 600. For example, if one of the aircraft 500 and 600 is attempting to move at a different vertical speed than the other aircraft, a shear force is produced and is resisting by the shear capacity of the male part 514 and the female part 614. The male part 514 and the female part 614 can resist such forces while continuing to couple the aircraft 500 and 600 to one another during flight.

Embodiments of attachment mechanisms are described below, e.g., with respect to FIGS. 11A, 11B, 12A, 12B, 12C, 13, 14, 15, 16, 17, 18, 19A, 19B, 20, 21, 22A, 22B, 22C, 23A, 23B, 24A, 24B, 25, 26, 27A, 27B, 28A, 28B, 29A, 29B, 30A, 30B, 31A, 31B, 32A, 32B, 35A, 35B, 33, 34, 36A, 36B, 36C 37A, 37B, 38A, 38B, 39A, 39B, 40, 41, 43, and 46. Each of the Figures includes a partial cutaway view of a male part and a female part. Any one or more of the attachment mechanisms may be deployed on the male part 514 of the aircraft 500 and/or on the female part 614 of the aircraft 600.

FIGS. 11A, 11B, 12A, 12B, 12C, 13, 14, 15, 16, 17, and 18 illustrate details of a male part and a female part coupling with one another based on an attachment mechanism comprising a threaded interface, in accordance with some embodiments of the present disclosure. In each of these Figures, a thread such as a male thread or a female thread is an attachment mechanism for coupling the male part and the female part to one another. The coupling of the male part and the female part couples different aircraft to one another.

FIGS. 11A and 11B illustrate a system 1100 including a male part 1102 and a female part 1104. The male part 1102 includes a wall forming a shaft 1106, and a male thread 1108. The male thread 1108 includes a helical rib projecting from the shaft 1106 and wrapping around the shaft 1106. The male thread 1108 extends from the shaft 1106 by a height $H_1$ and has a width $W_1$. The height $H_1$ and the width $W_1$ are constant along the male thread 1108. The female part 1104 includes a wall 1110 forming a cone 1114 and a cavity 1116, and a female thread 1112. The cone 1114 is to guide the male part 1102 into the cavity 1116. The cavity 1116 is to receive insertion of the shaft 1106. The female thread 1112 includes a helical channel recessed into the wall 1110. The female thread 1112 wraps around the wall 1110 proximate the cavity 1116. The female thread 1112 corresponds to the dimensions of the male thread 1108. Thus, the female thread 1112 is recessed into the wall 1110 by a depth $H_1$ and a width $W_1$. The depth $H_1$ and the width $W_1$ are constant along a length of the female thread 1112.

FIG. 11A illustrates the male thread 1108 and the female thread 1112 in a disengaged position. A relative rotation (e.g., in a first direction) between the male part 1102 and female part 1104 can engage the male thread 1108 with the female thread 1112. As the male thread 1108 and the female thread 1112 rotate relative to one another, the male part 1102 and the female part 1104 are drawn closer to one another and the male thread 1108 and the female thread 1112 reach an engaged position, e.g., as illustrated in FIG. 11B. Similarly, a relative rotation (e.g., in a second direction) between the male part 1102 and the female part 1104 may disengage the male thread 1108 from the female thread 1112.

One challenge associated with some threaded interfaces is that the male and female threads may only partially engage with one another when the male and female parts are misaligned (e.g., are oriented at an oblique angle with respect to one another). This misalignment can create a problem where the male and female threads prematurely bind and prevent further relative rotation to fully engaged the male and female parts. The system illustrated in FIGS. 12A, 12B, 12C, 13, and 14 can solve such problems based on a threaded interface having a thread of varying dimensions.

Figure 12A:
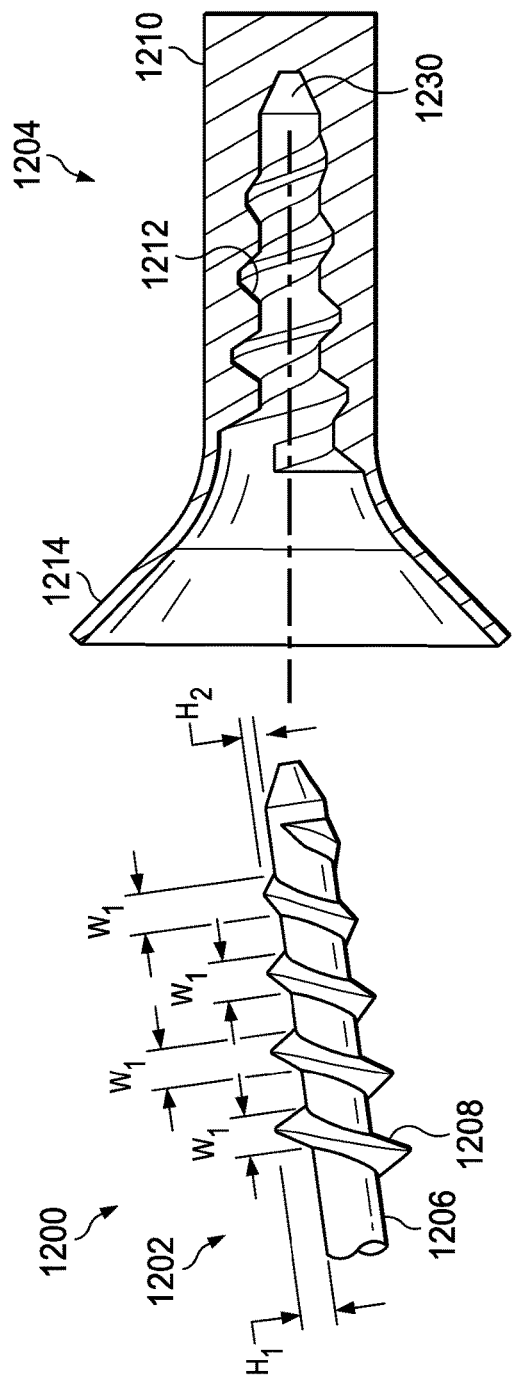
Figure 12C:
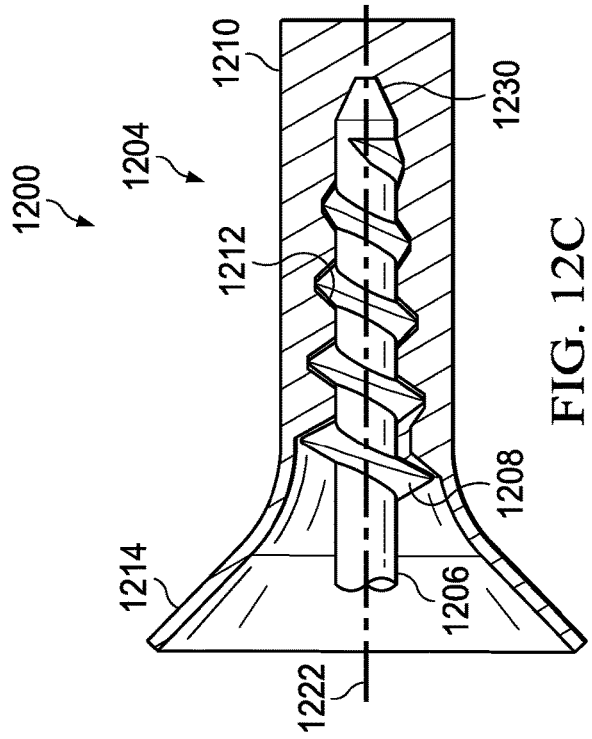
Figure 12B:
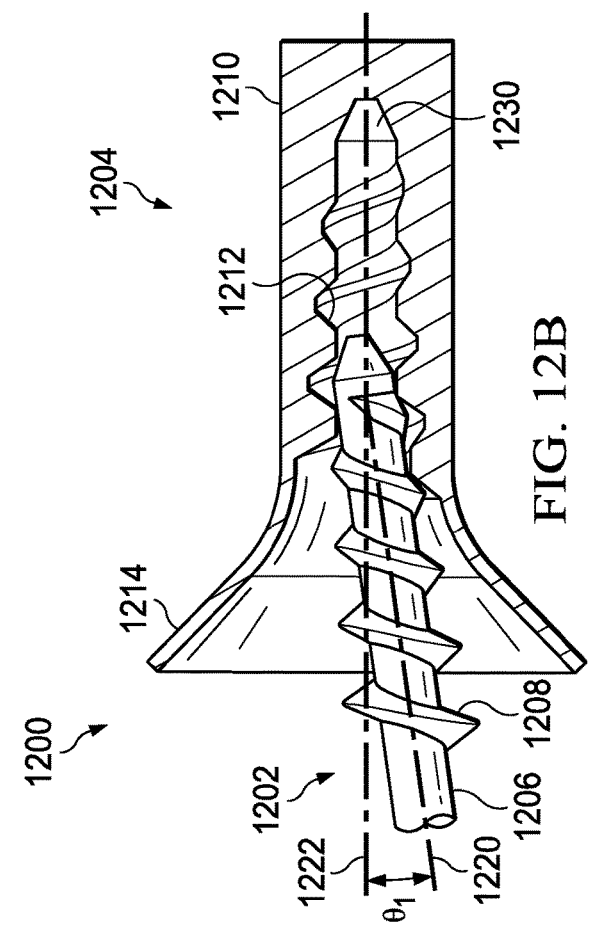

FIGS. 12A, 12B, and 12C illustrate a system 1200 including a male part 1202 and a female part 1204. The male part 1202 includes a male thread 1208 and a wall forming a shaft 1206. The male thread 1208 includes a helical rib projecting from and wrapping around the shaft 1206. The male thread 1208 has a constant width $W_1$. The male thread 1208 extends from the shaft 1206 by a height that varies between heights $H_1$ and $H_2$. The male thread 1208 tapers down in height from one end toward an opposite end of the shaft 1206. The height $H_2$ is less than the height $H_1$. In some examples, $H_1$ is equal to or greater than 2 times $H_2$ (i.e., $H_1 \geq 2*H_2$). The female part 1204 includes a female thread 1212 and a wall 1210 forming a cone 1214 and a cavity 1230. The cone 1214 is to guide the male part 1202 into the cavity 1230. The cavity 1230 is to receive insertion of the male part 1202. The female thread 1212 includes a helical channel recessed into the wall 1210. The female thread 1212 wraps around the wall 1210 proximate the cavity 1230. The female thread 1212 corresponds to the dimensions of the male thread 1208. Thus, the female thread 1212 is recessed into the wall 1201 by a varying depth $H_1$ to $H_2$ and a constant width $W_1$.

FIG. 12A illustrates the male thread 1208 and the female thread 1212 in a disengaged position. A relative rotation (e.g., in a first direction) between the male part 1202 and the female part 1204 can engage the male thread 1208 with the female thread 1212. FIG. 12B illustrates the male thread 1208 with the female thread 1212 in a partially engaged position and misaligned during insertion of the male part 1202 in the female part 1204. An axis 1220 is colinear with a centerline of the male part 1202. An axis 1222 is colinear with a centerline of the female part 1204. The male part 1202 and the female part 1204 are oriented at an oblique angle $\theta_1$ with respect to one another, where the oblique angle $\theta_1$ is measured between axes 1220 and 1222. In some existing systems, such misalignment can create a problem where the threads prematurely bind and prevent further relative rotation to fully engaged the male and female parts. However, the system 1200 addresses this problem with a thread that varies in dimension along a length of the thread. In the example of FIGS. 12A, 12B, and 12C, the male thread 1208 tapers down in height toward a distal end of the shaft 1206. As illustrated in FIG. 12B, this change in height of the male thread 1208 and the female thread prevents such binding of the male thread 1208 and the female thread by providing additional clearance between the male thread 1208 and the female thread 1212 such that they can continue to rotate relative to one another, even when they are oriented at the oblique angle $\theta_1$ relative to one another. As the male thread 1208 and the female thread 1212 rotate relative to one another, the male part 1202 and the female part 1204 are drawn closer to one another and are drawn into alignment by the male thread 1208 and the female thread 1212 to reach an engaged position, as illustrated in FIG. 12C. Similarly, the male part 1202 and the female part 1204 may be disengaged by producing a relative rotation (e.g., in a second direction, opposite the first direction) between the male thread 1208 from the female thread 1212 to disengage the them form one another.

Figure 13:
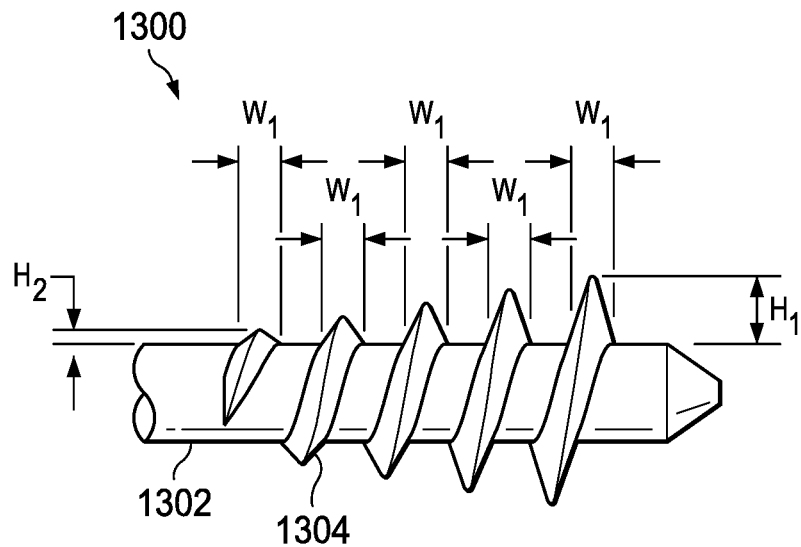
Figure 14:
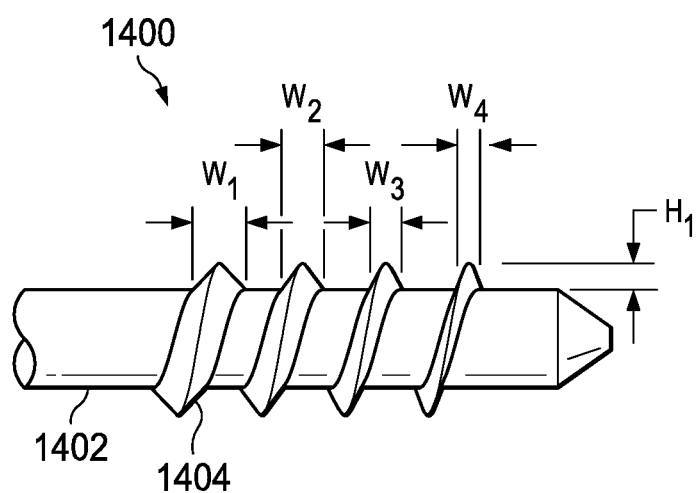

FIGS. 13 and 14 illustrate some variations of the male part 1202 of the FIGS. 12A, 12B, and 12C. FIG. 13 illustrates a male part 1300 that includes a wall forming a shaft 1302 and a male thread 1304. The male thread 1304 of the male part 1300 is similar to the male thread 1208 of the male part 1202 of FIGS. 12A, 12B, and 12C. A difference is that the height of the male thread 1208 decreases toward a distal end of the shaft 1206 while a height of the male thread 1304 increases toward a distal end of the shaft 1302. The male thread 1304 has a constant width $W_1$. The male thread 1304 extends from the shaft 1302 by a height that varies from $H_2$ up to $H_1$. A female part corresponding to the male part 1300 can include a female thread that corresponds in dimensions to that of the male thread 1304 (e.g., similar to the correspondence in dimensions between the male part and female part as illustrated in FIGS. 12A, 12B, and 12C). FIG. 14 illustrates a male part 1400 that includes a wall forming a shaft 1402 and a male thread 1404. The male thread 1404 of the male part 1400 is similar to the male thread 1208 of the male part 1202 of FIGS. 12A, 12B, and 12C and the male threads 1304 of the male part 1300 of FIG. 13. A difference is that the male thread 1208 and 1304 have a constant width $W_1$ while the male thread 1404 has a width that decreases toward a distal end of the shaft 1302. The male thread 1404 has a constant height $H_1$. The male thread 1404 extends from the shaft 1402 by a height that varies from $W_1$ down to $W_4$, e.g., where $W_4 < W_3 < W_2 < W_1$. In some examples, $W_1$ is equal to or greater than 2 times $W_4$ (i.e., $W_1 \geq 2*W_4$). A female part corresponding to the male part 1400 can include a female thread that corresponds in dimensions to that of the male thread 1404 (e.g., similar to the correspondence in dimensions between the male part and female part as illustrated in FIGS. 12A, 12B, and 12C).

Figure 15:
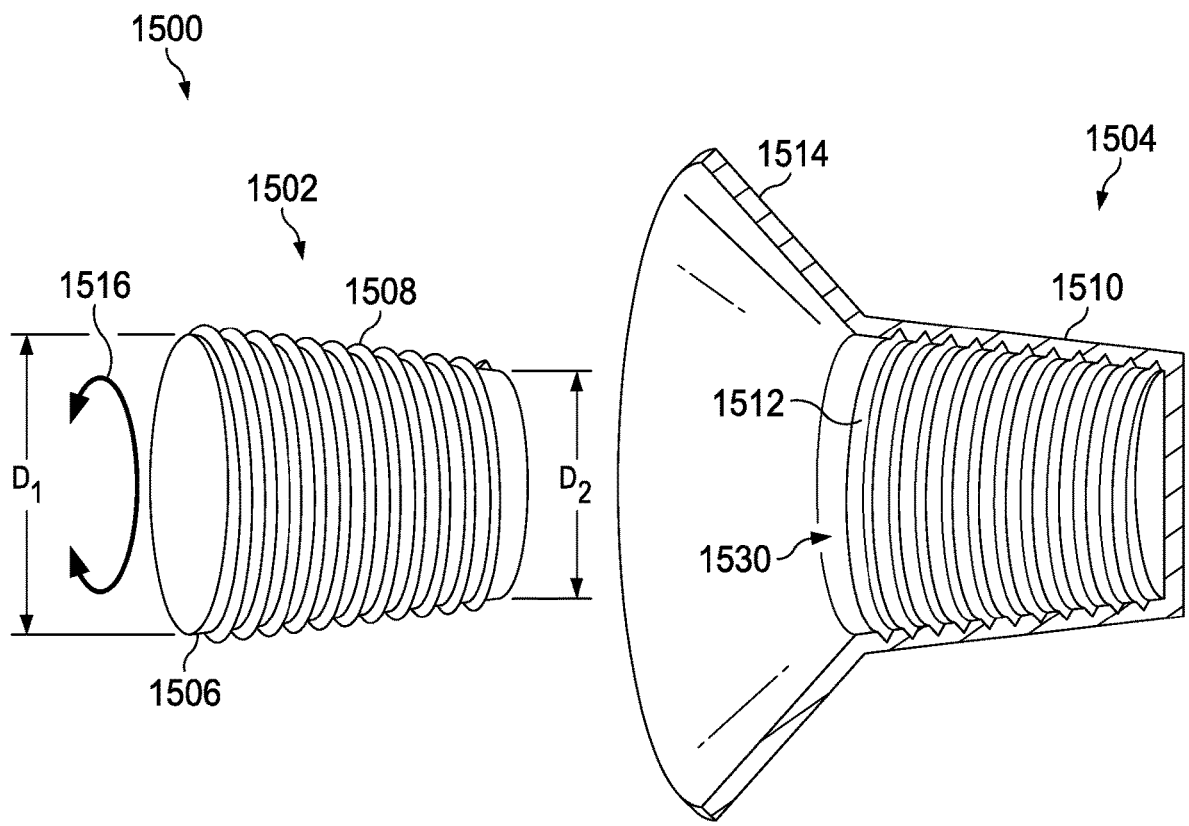

FIG. 15 illustrates a system 1500 including a male part 1502 and a female part 1504. The male part 1502 includes a wall forming a shaft 1506 and a male thread 1508. The shaft 1506 is tubular in shape. The female part 1504 includes a wall 1510 forming a cone 1514 and a cavity 1530, and a female thread 1512. The shaft 1506 of the male part 1502 is rotatable relative to the female part 1504, e.g., as generally indicated by arrow 1516. In some examples, a motor, such as the motor 540 of the FIG. 5, dives the rotation of the shaft 1506. Various components of the male part 1502 and the female part 1504 operate and interoperate in a matter as described above, e.g., with respect to FIGS. 12A, 12B, and 12C; details of such components are not repeated here only of the sake of brevity. A difference between the system 1200 of FIGS. 12A, 12B, and 12C and the system 1500 is that, in the system 1500, the shaft 1506 varies in diameter along a length of the shaft 1506. The shaft 1506 is a first diameter $D_1$ at a first end of the shaft 1506 and is a second diameter $D_2$ at a second end of the shaft 1506. The shaft 1506 tapers from the first diameter $D_1$ to the second diameter $D_2$. The first diameter $D_1$ is larger than the second diameter $D_2$. In some examples, $D_1$ is equal to or greater than 2 times $D_2$ (i.e., $D_1 \geq 2*D_2$). The cavity 1530 in the female part 1504 corresponds to the dimensions of the shaft 1506 on male part 1502. Thus, the cavity 1530 is the first diameter $D_1$ at a first end of the cavity 1530 (i.e. proximate the cone 1514) and is the second diameter $D_2$ at a second end of the cavity 1530 (i.e. distal the cone 1514). The tapered design illustrated in the FIG. 15 can be combined with the embodiments illustrated in the FIGS. 12A, 12B, 12C, 13, and/or 14 as well as any other male and/or female parts of the present disclosure.

Figure 16:
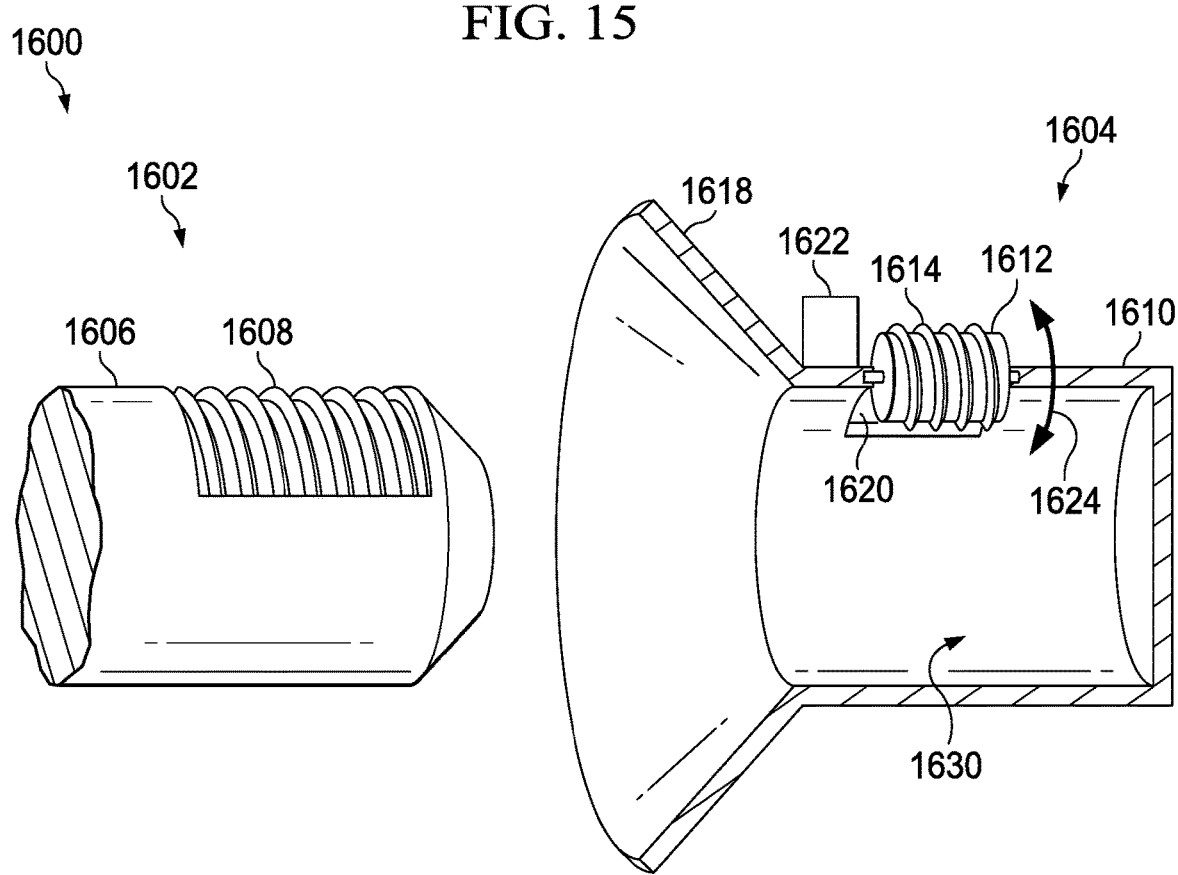

FIG. 16 illustrates a system 1600 including a male part 1602 and a female part 1604. The male part 1602 includes a wall forming a shaft 1606. A portion of the shaft 1606 includes threads 1608. The female part 1604 includes a wall 1610 forming a cone 1618 and a cavity 1630. The wall 1610 includes an opening 1620, within which a shaft 1612 is rotatably mounted. The shaft 1612 includes threads 1614. The threads 1608 and 1614 are designed to mechanically engage with one another, e.g., similar to the mechanical engagement between the male threads and female threads described in FIGS. 12A, 12B, and 12C. A motor 1622 drives rotation of the shaft 1612, which creates relative rotation between the threads 1608 and 1614 as generally indicated by arrow 1624. As the threads 1608 and 1614 rotate relative to one another in a first direction, the male part 1602 and the female part 1604 are drawn closer to one another and the threads 1608 and 1614 reach an engaged position. Alternatively, as the threads 1608 and 1614 rotate relative to one another in a second direction (opposite the first direction), the male part 1602 is withdrawn from the female part 1604 and the threads 1608 and 1614 reach a disengaged position. In some examples, the thread 1608 is a male thread and the thread 1614 is a female thread. In other examples, the thread 1608 is a female thread and the thread 1614 is a male thread.

Figure 17:
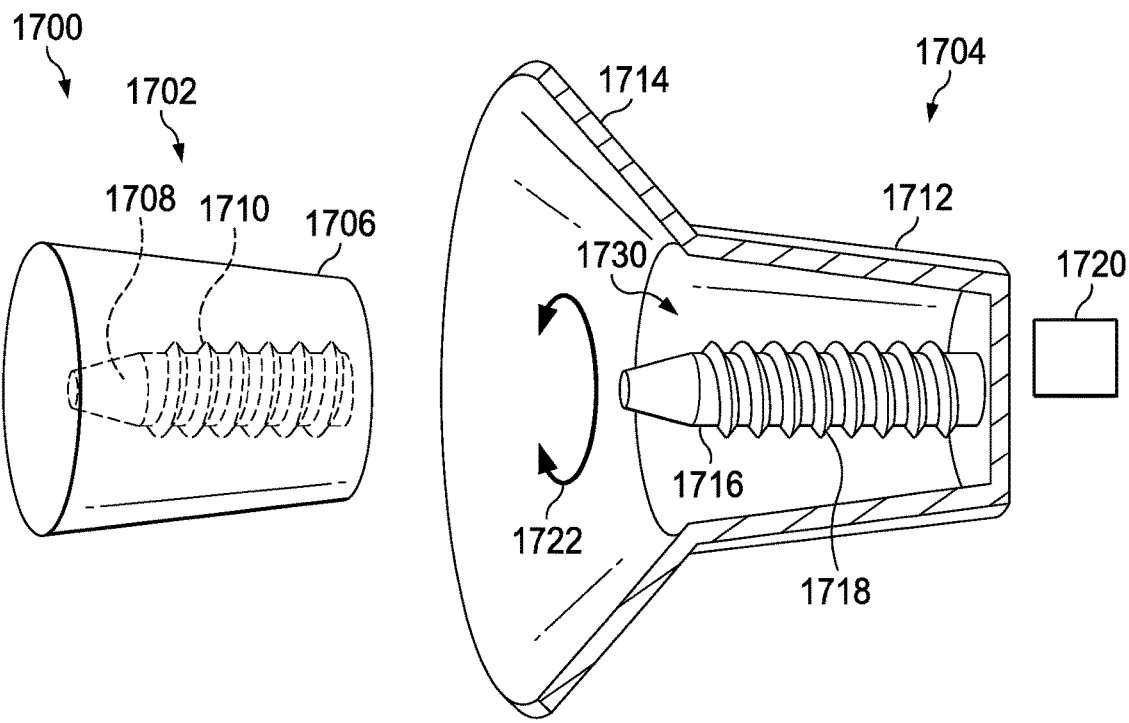

FIG. 17 illustrates a system 1700 including a male part 1702 and a female part 1704. The male part 1702 includes a wall forming a shaft 1706. The shaft 1706 includes a recession 1708. A female thread 1710 is disposed along the length of a surface of the recession 1708. The female part 1704 includes a wall 1712 forming a cone 1714 and a cavity 1730. A shaft 1716 is attached to the wall 1712 at an end of the cavity 1730. The shaft 1716 extends from the wall 1712 into the cavity 1730. The shaft 1716 includes a male thread 1718 extending from its surface. The female thread 1710 and the male thread 1718 are to mechanically engage with one another based on the threads interlocking with one another. A motor 1720 drives rotation of the shaft 1716 with the cavity 1730, which creates relative rotation between the female thread 1710 and the male thread 1718 as generally indicated by arrow 1722. A rotation in a first direction between the female thread 1710 and the male thread 1718 can engage the female thread 1710 and the male thread 1718 and draw the male part 1702 and the female part 1704 closer to one another. A rotation in a second direction (opposite the first direction) between the female thread 1710 and the male thread 1718 can withdraw the male part 1602 from the female part 1604 and moving the female thread 1710 and the male thread 1718 to a disengaged position.

Figure 18:
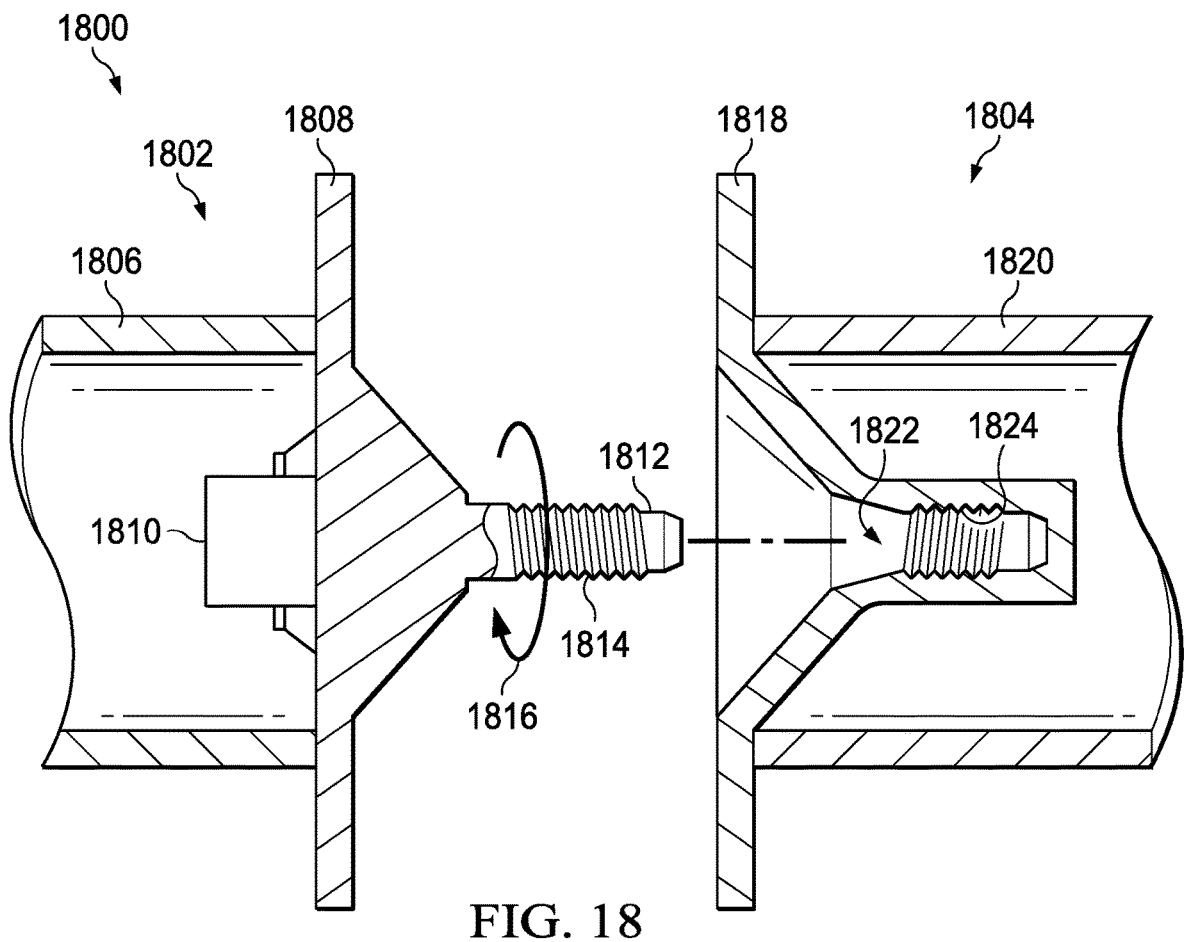

FIG. 18 illustrates a system 1800 including a male part 1802 and a female part 1804. The male part 1802 includes a wall forming a shaft 1806. A plate 1808 is attached to an end of the shaft 1806. The plate 1808 forms a protrusion. A screw including a shaft 1812 and a male thread 1814 extends through an opening in the protrusion in the plate 1808 and projects from the plate 1808. A motor 1810 is attached to the plate 1808 and drives rotation of the shaft 1812 as generally indicated by arrow 1816. The female part 1804 includes a wall forming a shaft 1820. A plate 1818 is attached to an end of the shaft 1820. The plate 1818 forms a recession and a cavity 1822. A female thread 1824 is recessed into a portion of the cavity 1822. The male part 1802 and the female part 1804 can mechanically engage with one another based on the male thread 1814 and the female thread 1824 interlocking. The motor 1810 drives rotation of the shaft 1806 with the cavity 1822, which creates relative rotation between the male thread 1814 and the female thread 1824. A rotation in a first direction can engage the male thread 1814 and the female thread 1824 can draw the male part 1802 and the female part 1804 closer to one another. A rotation in a second direction (opposite the first direction) can force the male part 1802 and the female part 1804 away from one another and move the male thread 1814 and the female thread 1824 to a disengaged position.

Though the FIGS. 11A, 11B, 12A, 12B, 12C, 13, 14, 15, and 18 each illustrate a male part including a male thread and a female part including a female thread, embodiments of the present disclosure are not limited to such a configuration. In other embodiments of the present disclosure, the male and female threads are swapped on the male and female parts such that the male part includes the female thread and the female part includes the male thread.

FIGS. 19A, 19B, 20, 21, 22A, 22B, 22C, 23A, 23B, 24A, 24B, 25, 26, 27A, and 27B illustrate details of a male part and a female part operable to couple with one another based on an attachment mechanism comprising a latch mechanism, in accordance with some embodiments of the present disclosure.

Figure 19A:
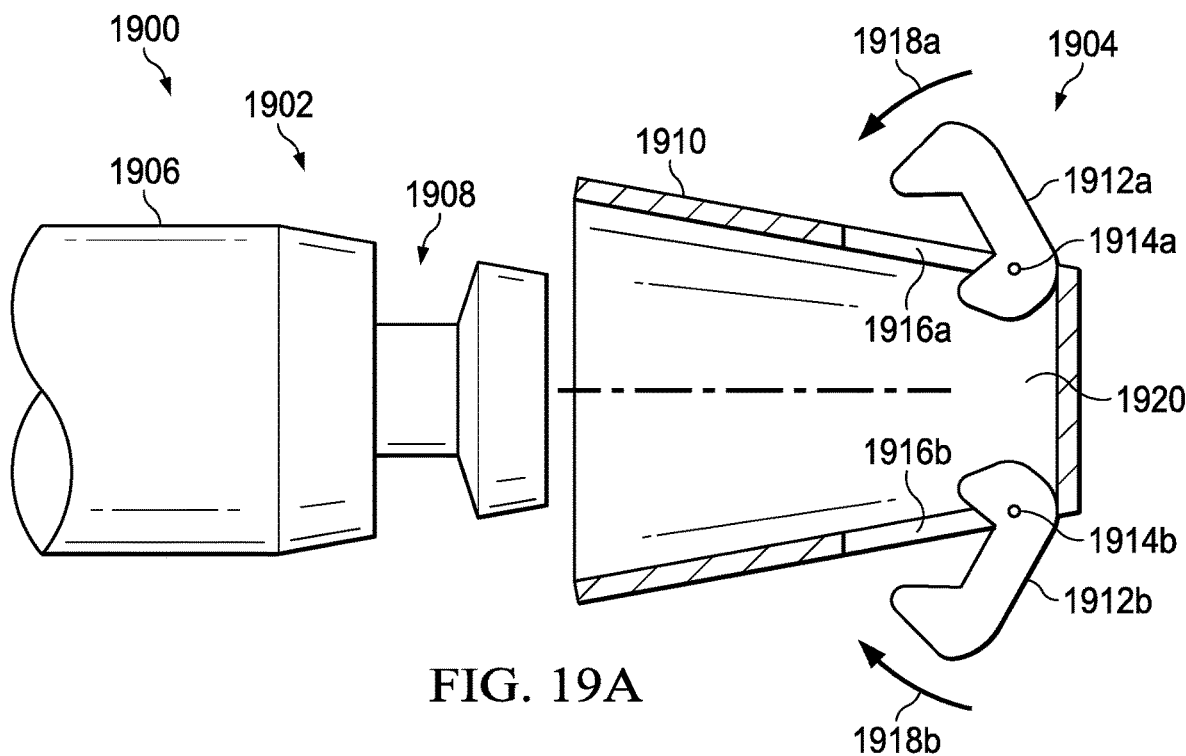
FIGS. 19A, 19B, 20, 21, 22A, 22B, 22C, 23A, 23B, 24A, 24B, 25, 26, 27A, and 27B illustrate details of a male part and a female part operable to couple with one another based on an attachment mechanism comprising a latch mechanism, in accordance with some embodiments of the present disclosure.
Figure 19B:
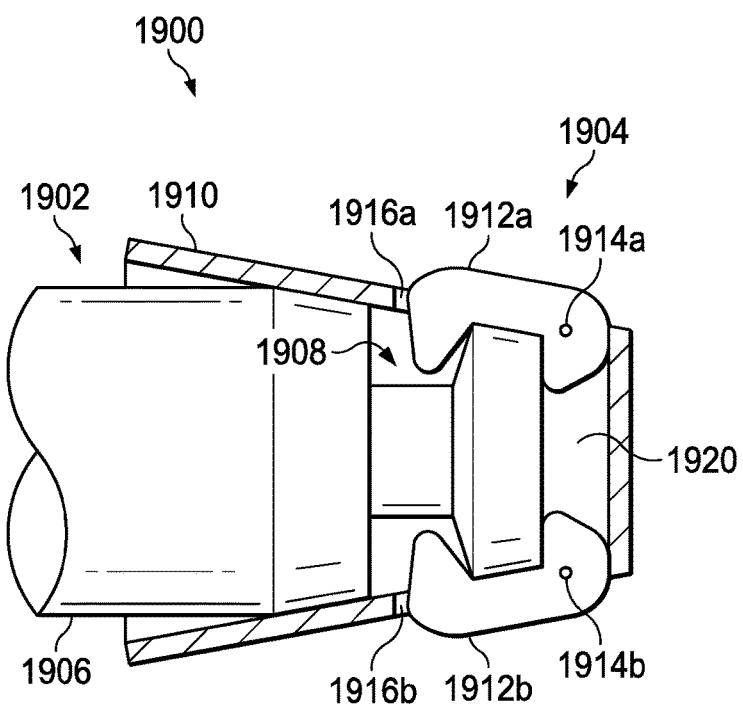

FIGS. 19A and 19B illustrate a system 1900 including a male part 1902 and a female part 1904. The male part 1902 includes a wall forming a shaft 1906. The shaft 1906 includes an indentation 1908 spanning the circumference of the shaft 1906. The female part 1904 includes a wall 1910 forming a cavity 1920, and latches 1912a and 1912b. The wall 1910 includes openings 1916a and 1916b through which the latches 1912a and 1912b, respectively are pivotally attached to the wall 1910 via pivot points 1914a and 1914b, respectively. In some examples, plates extend from the wall 1910 to which the latches 1912a and 1912b are pivotally attached. Each of the latches 1912a and 1912b and the indentation 1908 is an attachment mechanism for coupling the male part 1902 and the female part 1904.

FIG. 19A illustrates the latches 1912a and 1912b in a disengaged position. Each of the latches 1912a and 1912b is operable to pivot (as generally indicated by arrows 1918a and 1918b) about respective the pivot points 1914a and 1914b between at least the disengaged position and an engaged position. In the disengaged position, as illustrated in FIG. 19A, the latches 1912a and 1912b are recessed into the openings 1916a and 1916b, respectively, in the wall 1910. The male part 1902 and the female part 1904 may be engaged by advancing the male part 1902 into the cavity 1920 to contact the latches 1912a and 1912b. When the male part 1902 is advanced into the cavity 1920 beyond an initial contact with the latches 1912a and 1912b, the latches 1912a and 1912b rotate to the engaged position where they project into the cavity 1920 through the openings 1916a and 1916b, as illustrated in FIG. 19B.

FIG. 19B illustrates the latches 1912a and 1912b in the engaged position. In the engaged position, the male part 1902 is within the cavity 1920 of the female part 1904 and the latches 1912a and 1912b interlock with the indentation 1908 on the female part 1904. Advantageously, the mechanical engagement created by the latches 1912a and 1912b on the male part 1902 interlocking with the indentation 1908 on the female part 1904 can hold together a first aircraft to which the male part 1902 is attached and a second aircraft to which the female part 1904 is attached. The latches 1912a and 1912b are locked in place to prevent relative movement between the male part 1902 and the female part 1904. In some examples, latches 1912a and 1912b are locked in place, for example, by a lock bolt, a spring force, a magnetic force, or by any other means. The latches 1912a and 1912b may be released to enable the male part 1902 and the female part 1904 to disengage and enable withdrawal of the male part 1902 from the female part 1904. The latches 1912a and 1912b can rotate back to the disengaged position based on the withdrawal of the male part 1902.

Figure 20:
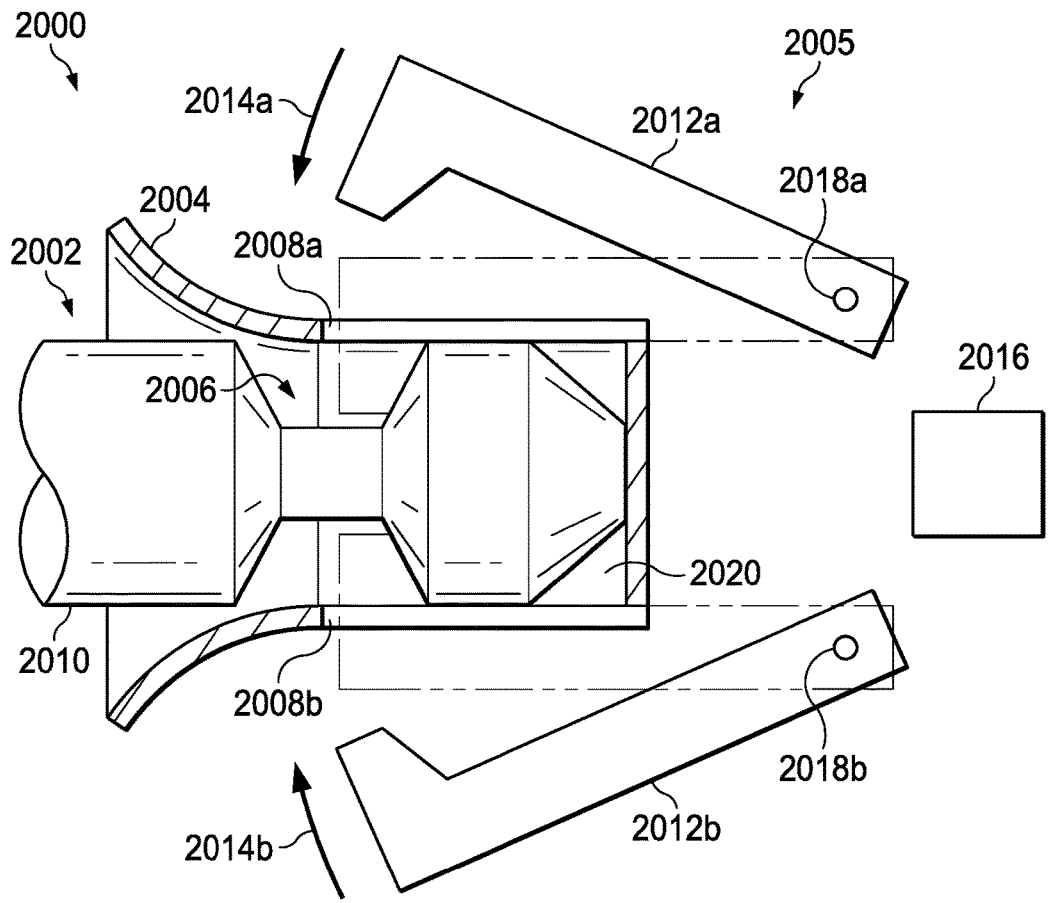

FIG. 20 illustrates a system 2000 including a male part 2002 and a female part 2005. The male part 2002 includes a wall forming a shaft 2010. The shaft 2010 includes an indentation 2006 spanning the circumference of the shaft 2010. The female part 2005 includes latches 2012a and 2012b, a motor 2016, and a wall 2004 forming a cavity 2020. The wall 2004 includes openings 2008a and 2008b through which the latches 2012a and 2012b can extend. The latches 2012a and 2012b are pivotally attached to an aircraft via pivot points 2018a and 2018b, respectively. The motor 2016 provides power to drive rotation of the latches 2012a and 2012b. Each of the latches 2012a and 2012b is operable to pivot (as generally indicated by arrows 2014a and 2014b) about the pivot points 2018a and 2018b between at least a disengaged position and an engaged position. In the disengaged position as illustrated in solid lines in FIG. 20, the latches 2012a and 2012b are recessed behind the openings 2008a and 2008b, respectively. The male part 2002 and the female part 2005 are not coupled when the latches 2012a and 2012b are in the disengaged position. Each of the latches 2012a and 2012b and the indentation 2006 is an attachment mechanism for coupling the male part 2002 and the female part 2005.

The male part 2002 and the female part 2005 may be coupled by rotating the latches 2012a and 2012b to the engaged position where they project into the cavity 2020 through the openings 2008a and 2008b, as illustrated in dashed lines in FIG. 20. The male part 2002 and the female part 2005 are rigidly attached when the male part 2002 is within the cavity 2020 of the female part 2005 and the latches 2012a and 2012b are in the engaged position and interlock with the indentation 2006 on the male part 2002. The latches 2012a and 2012b are locked in place to prevent relative movement between the male part 2002 and the female part 2005. In some examples, the latches 2012a and 2012b are locked in place, for example, by the motor 2016, a lock bolt, a spring force, a magnetic force, or by any other means. The latches 2012a and 2012b may be released and rotated back to the disengaged position to enable withdrawal of the male part 2002 from the female part 2005.

Figure 21:
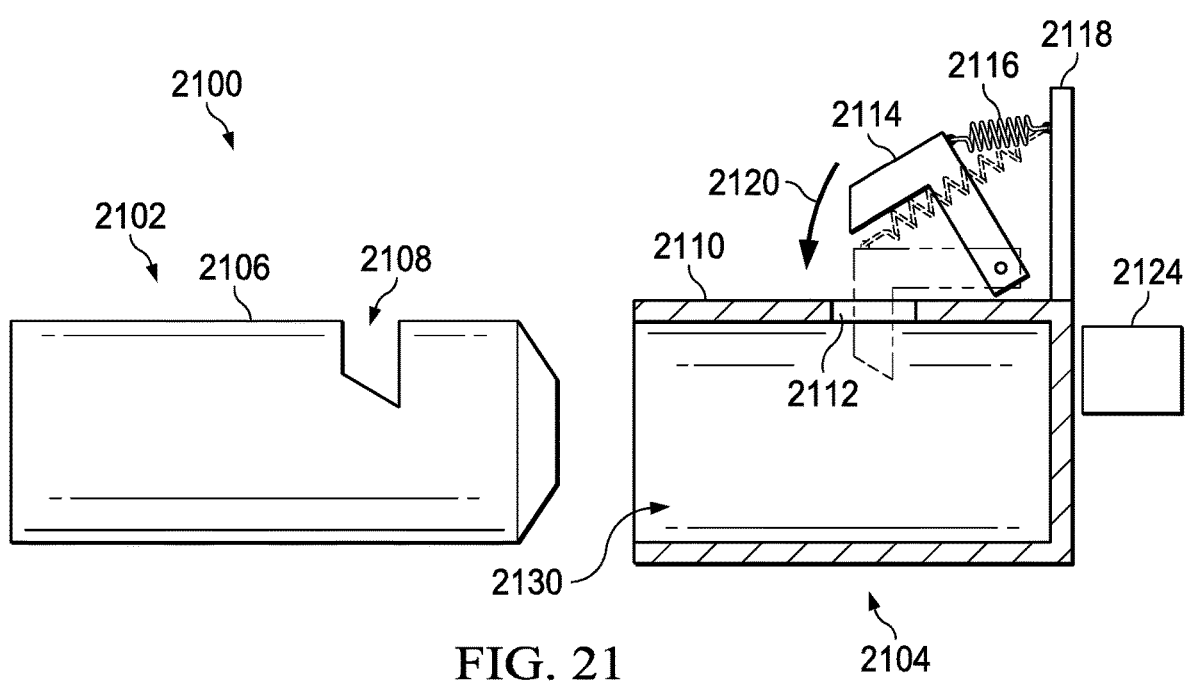

FIG. 21 illustrates a system 2100 including a male part 2102 and a female part 2104. The male part 2102 includes a wall forming a shaft 2106. A notch 2108 is recessed into the shaft 2106. The female part 2104 includes a latch 2114, a spring 2116, a support 2118, a motor 2124, and a wall 2110 forming a cavity 2130. The wall 2110 includes an opening 2112 through which the latch 2114 can extend. The latch 2114 is pivotally attached to the wall 2110 at one end. The latch 2114 is attached to the support 2118 by the spring 2116 at another point along its length. Each of the latch 2114 and the notch 2108 is an attachment mechanism for coupling the male part 2102 and the female part 2104. The latch 2114 is operable to pivot (as generally indicated by arrow 2120) between at least a disengaged position and an engaged position. In the disengaged position as illustrated in solid lines in FIG. 21, the latch 2114 is recessed behind the opening 2112 the wall 2110. Spring forces generated by the spring 2116 can hold the latch 2114 in the disengaged position. The male part 2102 and the female part 2104 are disconnected when the male part 2102 is not inserted into the female part 2104 and the latch 2114 is the disengaged position. The motor 2124 provides power to drive rotation of the latch 2114 to the engaged position where it projects into the cavity 2130 through the opening 2112 and interlocks with the notch 2108, as illustrated in dashed lines in FIG. 21. The male part 2102 and the female part 2104 are coupled when the male part 2102 is within the cavity 2139 of female part 2104 and the latch 2114 is the engaged position and interlocking with the notch 2108. The latch 2114 is locked in place to prevent relative movement between the male part 2102 and the female part 2104. In some examples, the latch 2114 is locked in place by the motor 2124, a lock bolt, a spring force, a magnetic force, or by any other means. The latch 2114 may be released from being locked in place. Because the spring 2116 changes length by elongating when the latch 2114 is moved from the disengaged position to the engaged position, the spring 2116 stores energy and can generate a force to pivot the latch 2114 between the disengaged position and the engaged position. Once the latch 2114 is released, the spring 2116 can withdraw the latch 2114 from the notch 2108 based on the force and rotate the latch 2114 to the disengaged position, which enables withdrawal of the male part 2102 from the female part 2104.

Figure 22A:
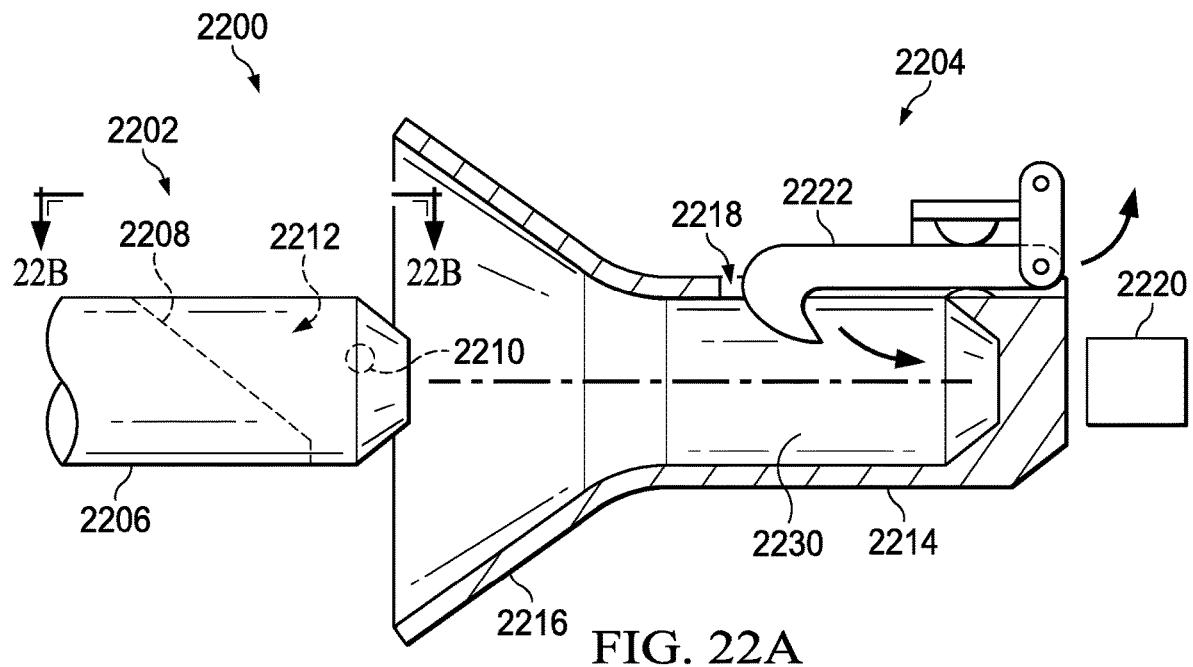
Figure 22B:
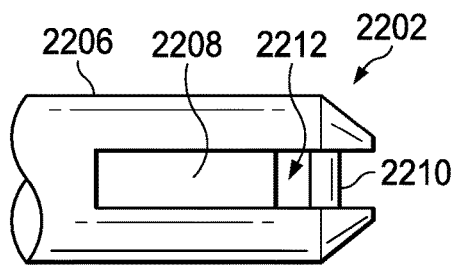
Figure 22C:
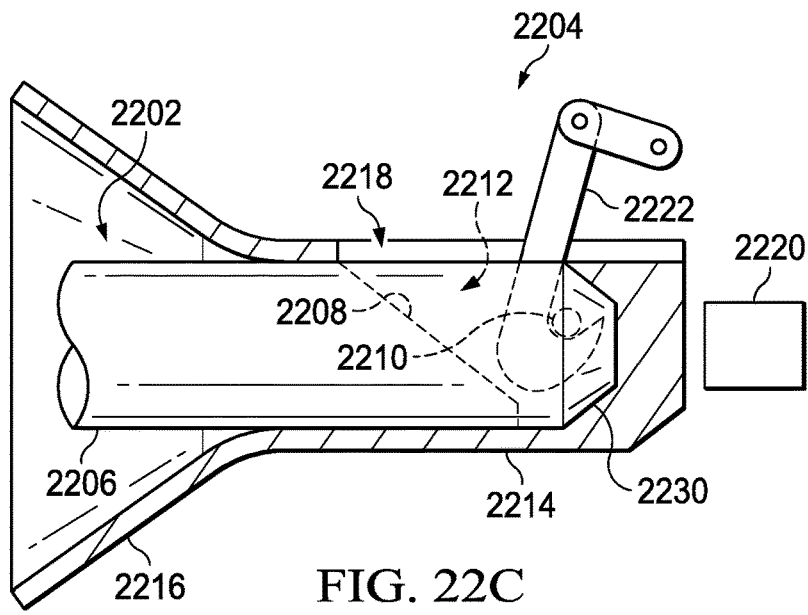

FIGS. 22A, 22B, and 22C illustrate a system 2200 including a male part 2202 and a female part 2204. The male part 2202 includes a wall forming a shaft 2206, and a pin 2210. The shaft 2206 includes a recess 2212 defined in part by a surface 2208. The pin 2210 spans the recess 2212 as shown in FIG. 22B. FIG. 22B illustrates a viewpoint of the male part 2202 as generally indicated by the arrows labeled "22B" in FIG. 22A. The female part 2204 includes a latch 2222, a motor 2220, and a wall 2214 forming a cone 2216 and a cavity 2230. The wall 2214 includes opening 2218 through which the latch 2222 can extend. Each of the pin 2210 and the latch 2222 is an attachment mechanism for coupling the male part 2202 and the female part 2204.

FIG. 22A illustrates the male part 2202 and the female part 2204 disconnected and the latch 2222 in a disengaged position. The latch 2222 is operable to pivot (as generally indicated by the arrow in FIG. 22A) between at least the disengaged position and an engaged position. In the disengaged position as illustrated in FIG. 22A, the latch 2222 is partially recessed into the opening 2218 in the wall 2214. The male part 2202 and the female part 2204 may be coupled by advancing the male part 2202 into the cavity 2230 and rotating the latch 2222 to the engaged position 2230 where it engages the pin 2210, as illustrated in FIG. 22C.

FIG. 22C illustrates the male part 2202 and the female part 2204 coupled and the latch 2222 in the engaged position. In the engaged position, the male part 2202 is within the cavity 2230 the female part 2204 the latch 2222 interlocks with the pin 2210 on the male part 2202. Advantageously, mechanical engagement created by the latch 2222 on the female part 2204 interlocking with the pin 2210 on the male part 2202 can hold together a first aircraft to which the male part 2202 is attached and a second aircraft to which the female part 2204 is attached. The latch 2222 is locked in place to prevent relative movement between the male part 2202 and the female part 2204. In some examples, latch 2222 is locked in place, for example, by a lock bolt, a spring force, a magnetic force, or by any other means. The latch 2222 may be released to free the pin 2210 and enable withdrawal of the male part 2202 from the female part 2204.

Figure 23A:
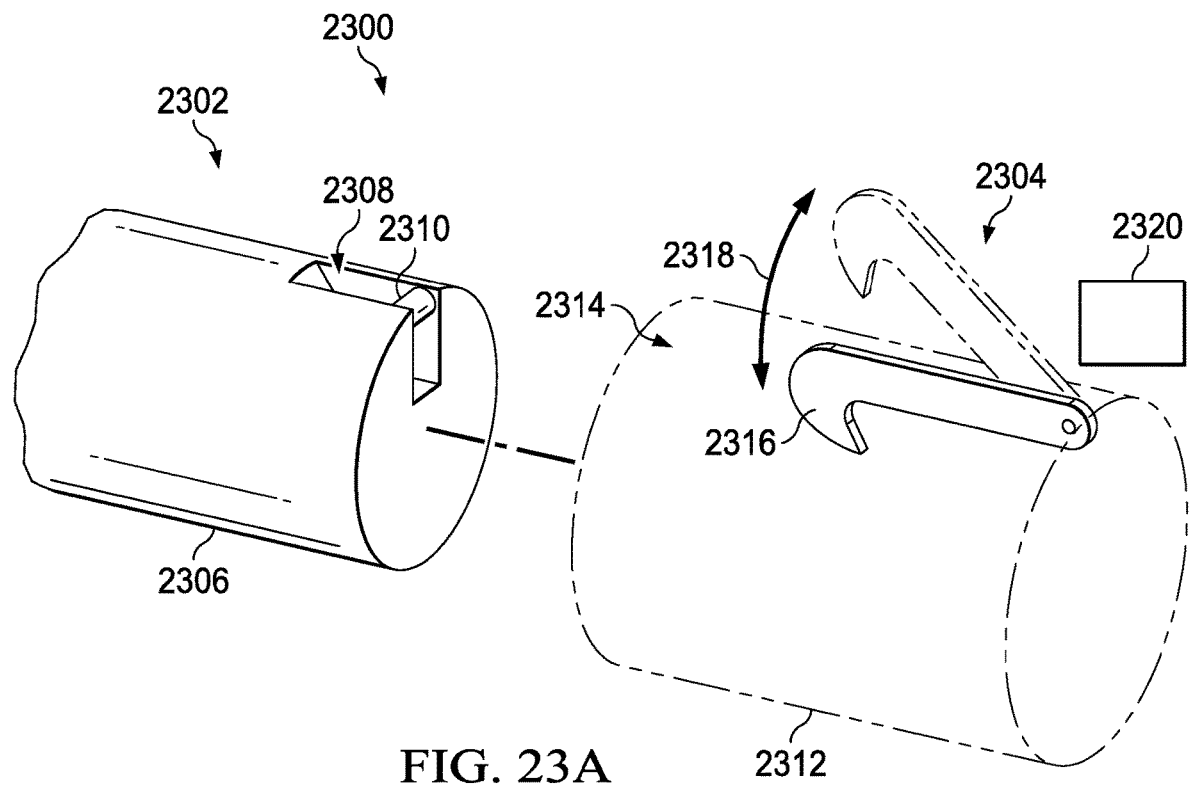
Figure 23B:
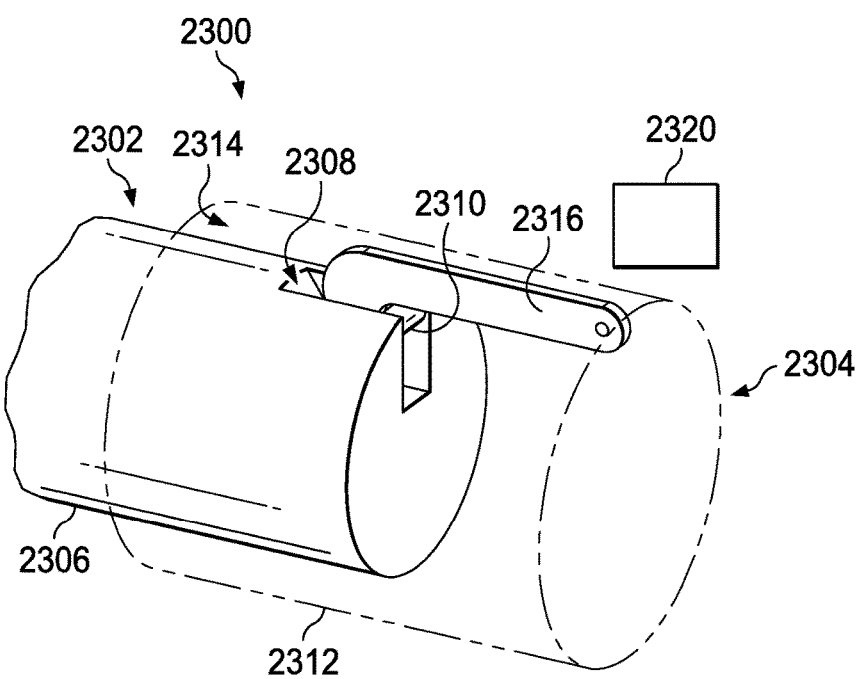

FIGS. 23A and 23B illustrate a system 2300 including a male part 2302 and a female part 2304. The male part 2302 includes a wall forming a shaft 2306, and a pin 2310. The shaft 2306 includes a recess 2308. The pin 2310 spans across the recess 2308. The female part 2304 includes a latch 2316, a motor 2320, and a wall 2312 forming a cavity 2314. The wall 2312 includes an opening (not shown) through which the latch 2316 can extend. Each of the pin 2310 and the latch 2316 is an attachment mechanism for coupling the male part 2302 and the female part 232504.

FIG. 23A illustrates the male part 2302 and the female part 2304 disconnected and the latch 2316 in a first position. The latch 2316 is operable to pivot (as generally indicated by arrow 2318 in FIG. 23A) between at least the first position and a second position. In the first position as illustrated in by a solid line in FIG. 23A, the latch 2316 projects into the cavity 2314 through the opening in the wall 2312. The pin 2310 rests in the first position and utilizes no active control or power to remain in this position. The male part 2302 and the female part 2304 may be engaged by advancing the male part 2302 into the cavity 2314. As the male part 2302 moves into the cavity, the pin 2310 forces the latch 2316 to rotate to the second position as illustrated in by a dashed line in FIG. 23A. As the pin 2310 moves beyond a hook on the end of the latch 2316, the latch 2316 rotates (or drops) back to the first position to engage the pin 2310, as illustrated in FIG. 23B.

FIG. 23B illustrates the male part 2302 and the female part 2304 coupled to one another and the latch 2361 engaged with the pin 2310. When engaged, the latch 2316 is in the first position and interlocking with the pin 2310 on the male part 2302. Advantageously, mechanical engagement created by the latch 2316 on the female part 2304 interlocking with the pin 2310 on the male part 2302 can hold together a first aircraft to which the male part 2302 is attached and a second aircraft to which the female part 2304 is attached. The motor 2320 can drive rotation of the latch 2316 between the first position and the second position. The motor 2320 can rotation the latch from the first position to the second position to free the pin 2310 and enable withdrawal of the male part 2302 from the female part 2304.

Figure 24A:
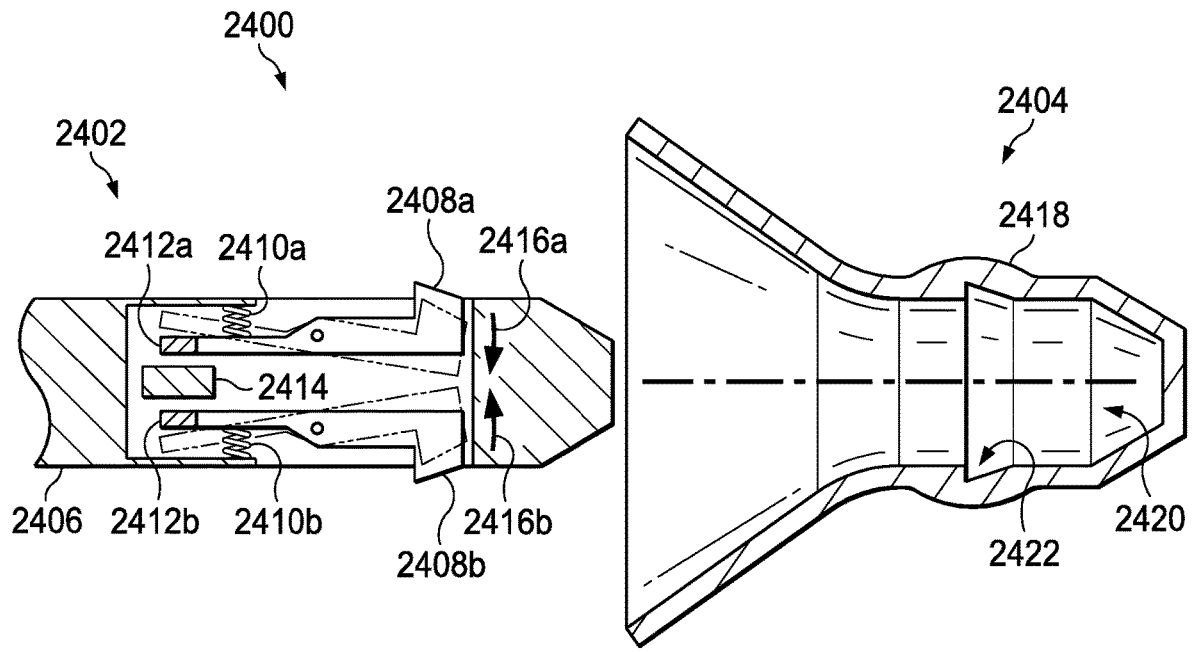
Figure 24B:
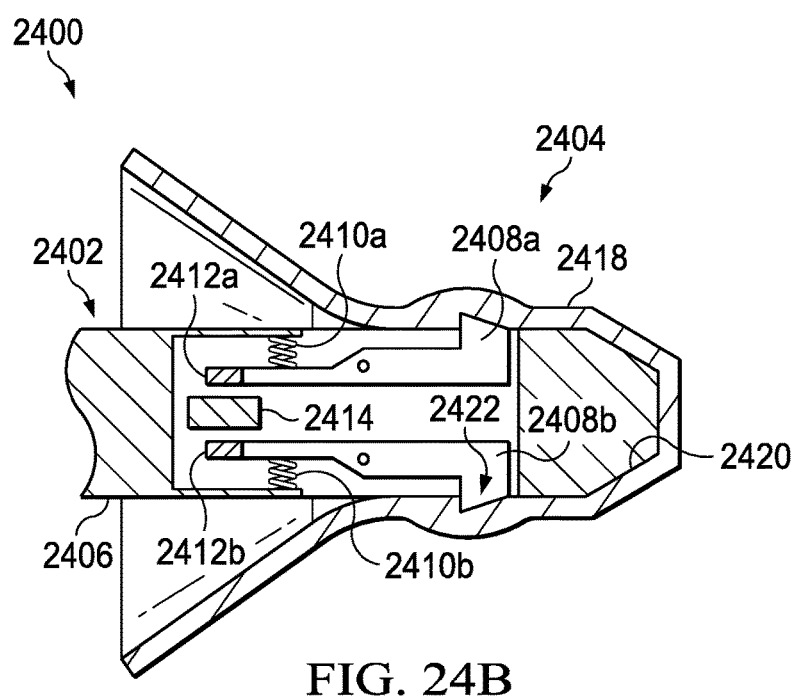

FIGS. 24A and 24B illustrate a system 2400 including a male part 2402 and a female part 2404. The male part 2402 includes latches 2408a and 2408b, springs 2410a and 2410b, an electromagnet 2414, and a wall forming a shaft 2406. Each of the latches 2408a and 2408b is pivotally attached to and located within the shaft 2406. The springs 2410a and 2410b moveably attach the latches 2408a and 2408b, respectively, to the shaft 2406. One end of each of the latches 2408a and 2408b lies within the shaft 2406 and includes magnetic materials 2412a and 2412b. An opposite end of each of the latches 2408a and 2408b projects out from the shaft 2406 through an opening. The latches 2408a and 2408b are operable to pivot (as generally indicated by arrows 2416a and 2416b in FIG. 24A) between at least a first position and a second position. The electromagnet 2414 can regulate a mechanical engagement between the male part 2402 and the female part 2404 by producing a magnetic field to rotate the latches 2408a and 2408b. In operation, the electromagnet 2414 generates a magnetic field which can attract or repel the magnetic materials 2412a and 2412b, causing the latches 2408a and 2408b to rotate between the first position and the second position. The female part 2404 includes a wall 2418 forming a cavity 2420. The wall 2418 includes a notch 2422 spanning the circumference of the cavity 2420. Each of the latches 2408a and 2408b and the notch 2422 is an attachment mechanism for coupling the male part 2402 and the female part 2404.

FIG. 24A illustrates the male part 2402 and the female part 2404 uncoupled from one another. When the latches 2408a and 2408b are in the first position, as illustrated in by the solid lines in FIG. 24A, the ends of the latches 2408a and 2408b project from the shaft 2406. The springs 2410a and 2410b produce forces to maintain the latches 2408a and 2408b in the first position; no active control or power is used to maintain the first position. The male part 2402 and the female part 2404 may be engaged by advancing the male part 2402 into the cavity 2420. As the male part 2402 moves into the cavity, the wall 2418 forces the latches 2408a and 2408b to rotate to the second position as illustrated in by the dashed lines in FIG. 24A. As the latches 2408a and 2408b move into alignment with the notch 2422, the springs 2410a and 2410b force the latches 2408a and 2408b to rotate back to the first position to engage the notch 2422, as illustrated in FIG. 24B.

FIG. 24B illustrates the male part 2402 and the female part 2404 coupled to one another and the latches 2408a and 2408b engaged with the notch 2422. When engaged, the latches 2408a and 2408b are in the first position and interlocking with the notch 2422 on the female part 2404. Advantageously, a mechanical engagement created by the latches 2408a and 2408b on the male part 2402 interlocking with the notch 2422 on the female part 2404 can couple (e.g., rigidly attach) a first aircraft to which the male part 2402 is attached and a second aircraft to which the female part 2404 is attached. The electromagnet 2414 can generate a magnetic force to repel the magnetic materials 2412a and 2412b on the latches 2408a and 2408b, which causes the springs 2410a and 2410b to compress and the latches 2408a and 2408b to rotate from the first position to the second position to release the notch 2422 and enable the male part 2402 and the female part 2404 to disengage based on the withdrawal of the male part 2402 from the female part 2404.

Figure 25:
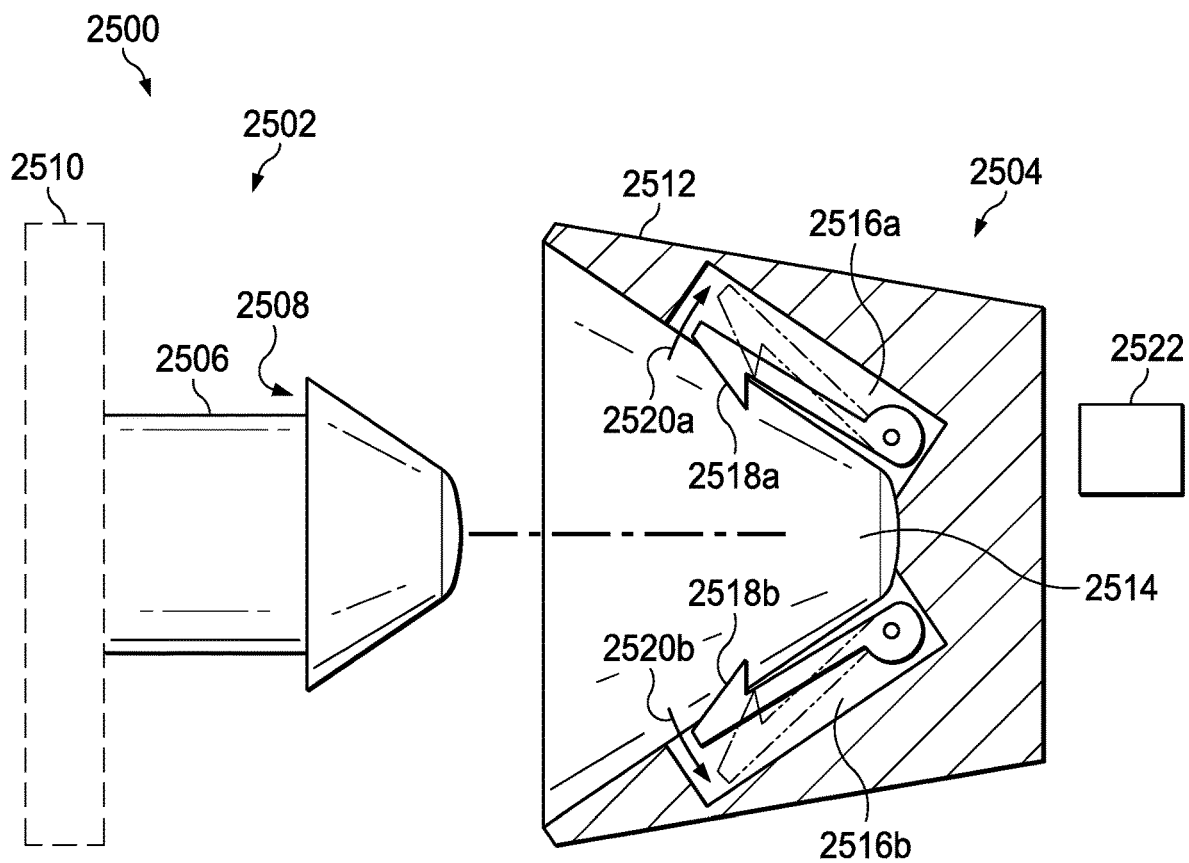

FIG. 25 illustrates a system 2500 including a male part 2502 and a female part 2504. The male part 2502 includes a wall forming a shaft 2506. The shaft 2506 includes a lip 2508, which wraps around the shaft 2506. Some embodiments include a backstop 2510, which can operate, e.g., as described with respect the backstop 1002 of the FIGS. 10A, 10B, and 10C. The female part 2504 includes latches 2518a and 2518b, a motor 2522, a wall 2512 forming a cavity 2514. The wall 2512 includes recessions 2516a and 2516b into which the latches 2518a and 2518b nest. Each of the latches 2518a and 2518b is pivotally attached within the recessions 2516a and 2516b. Each of the lip 2508 and the latches 2408a and 2408b is an attachment mechanism for coupling the male part 2502 and the female part 2504. The latches 2518a and 2518b are operable to pivot (as generally indicated by arrows 2520a and 2520b in FIG. 25) between at least a first position and a second position. The motor 2522 may drive rotation of the latches 2518a and 2518b. The male part 2502 and the female part 2504 are uncoupled when the male part 2502 is not inserted into the female part 2504. When the latches 2518a and 2518b are in the first position, as illustrated in by the solid lines in FIG. 25, the ends of the latches 2518a and 2518b project into the cavity 2514. The male part 2502 and the female part 2504 may be engaged by advancing the male part 2502 into the cavity 2514. As the male part 2502 moves into the cavity 2514, the lip 2508 forces the latches 2518a and 2518b to rotate to the second position as illustrated in by the dashed lines in FIG. 25. As hooks on an end of the latches 2518a and 2518b move beyond the lip 2508, the latches 2518a and 2518b can rotate back to the first position to engage the lip 2508. The male part 2502 and the female part 2504 are coupled to one another when the male part 2502 is within the cavity 2514 of female part 2504 and the latches 2518a and 2518b interlock with the lip 2508. The latches 2518a and 2518b are locked in place to prevent relative movement between the male part 2502 and the female part 2504. In some examples, the latches 2518a and 2518b are locked in place, for example, by the motor 2522, a lock bolt, a spring force, a magnetic force, or by any other means. The latches 2518a and 2518b may be released from being locked in place and rotated, by the motor 2522, from the first position to the second position, which enables withdrawal of the male part 2502 from the female part 2504.

Figure 26:
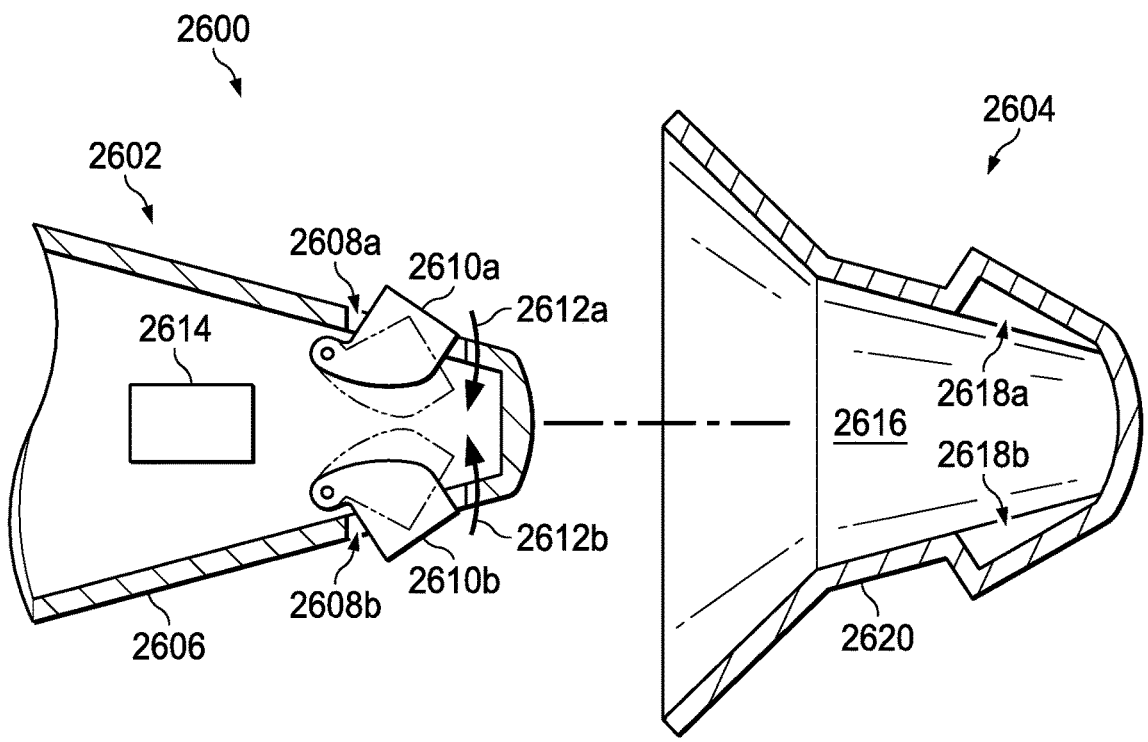

FIG. 26 illustrates a system 2600 including a male part 2602 and a female part 2604. The male part 2602 includes latches 2610a and 2610b, a motor 2614, and a wall forming a shaft 2606. The wall includes openings 2608a and 2608b through which the latches 2610a and 2610b can extend. Each of the latches 2610a and 2610b is pivotally attached to and located within the shaft 2606. The female part 2604 includes a wall 2620 forming a cavity 2616. The wall 2620 includes a notch 2618 (i.e., labeled 2618a and 2618b) spanning the circumference of the cavity 2616. Each of the latches 2610a and 2610b and the notch 2618 is an attachment mechanism for coupling the male part 2602 and the female part 2604. The latches 2610a and 2610b on the male part 2602 are operable to pivot (as generally indicated by arrows 2612a and 2612b in FIG. 26) between at least a first position and a second position. The motor 2614 may drive the rotation of the latches 2610a and 2610b. The male part 2602 and the female part 2604 are uncoupled when the male part 2102 is not inserted into the female part 2604. When the latches 2610a and 2610b are in the first position, as illustrated in by the solid lines in FIG. 26, the ends of the latches 2610a and 2610b project from the shaft 2606. The male part 2602 and the female part 2604 may be coupled by advancing the male part 2602 into the cavity 2616. As the male part 2602 moves into the cavity 2616, the wall 2620 forces the latches 2610a and 2610b to rotate to the second position as illustrated in by the dashed lines in FIG. 26. As the latches 2610a and 2610b move into alignment with the notch 2618, the latches 2610a and 2610b rotate back to the first position to engage the notch 2618. The male part 2602 and the female part 2604 are coupled when the male part 2602 is within the cavity 2616 of female part 2604 and the latches 2610a and 2610b interlock with the notch 2618. The latches 2610a and 2610b are locked in place to prevent relative movement between the male part 2602 and the female part 21604. In some examples, the latches 2610a and 2610b are locked in place, for example, by the motor 2614, a lock bolt, a spring force, a magnetic force, or by any other means. The latches 2610a and 2610b may be released from being locked in place and rotated, by the motor 2614, from the first position to the second position, which enables withdrawal of the male part 2602 from the female part 2604. The system 2600 is similar in operation to the system 2400 of FIGS. 24A and 24B.

Figure 27A:
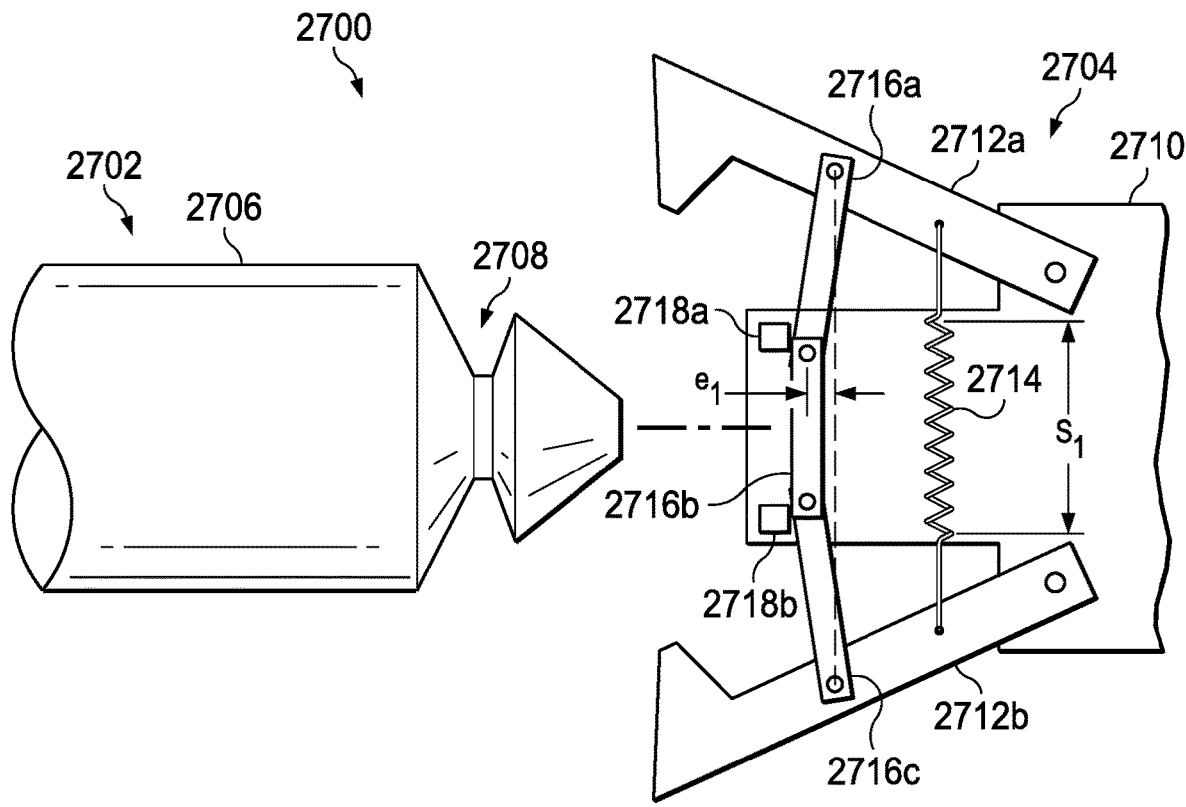
Figure 27B:
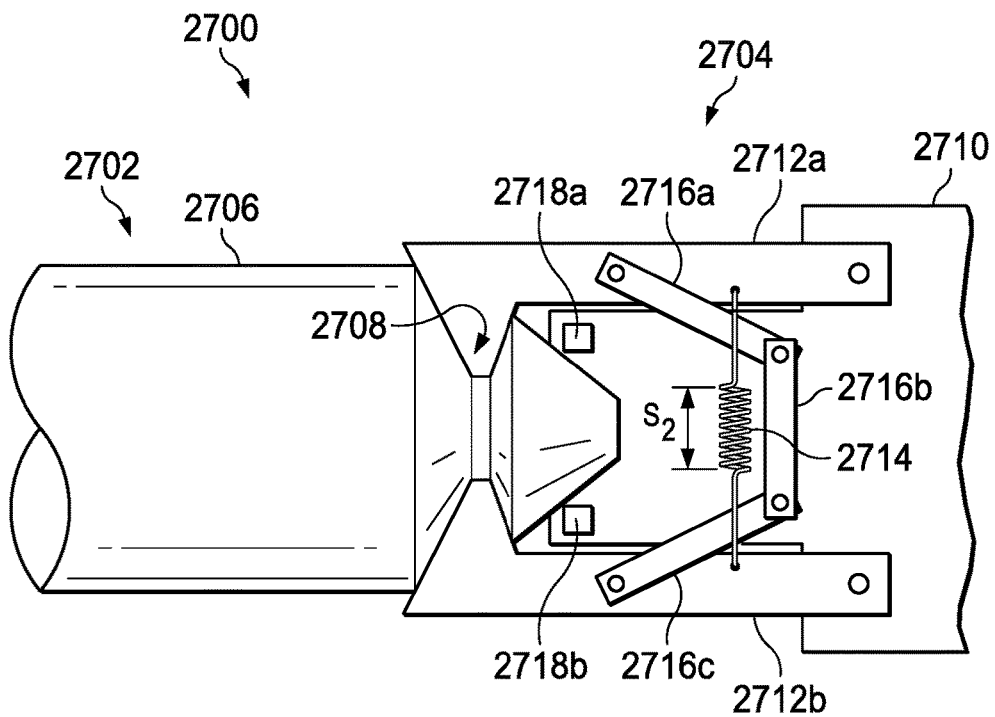

FIGS. 27A and 27B illustrates a system 2700 including details of a male part 2702 and a female part (not shown) including an attachment mechanism 2704. Though the female part is not shown, the female part of FIGS. 27A and 27B is similar to the female part 614 as described with respect to FIG. 6. The male part 2702 includes a wall forming a shaft 2706. The shaft 2706 includes an indentation 2708 spanning the circumference of the shaft 2706. The female part includes a wall forming a cavity in the attachment mechanism 2704 is located. The attachment mechanism 2704 includes a plate 2710, backstops 2718a and 2718b, latches 2712a and 2712b, braces 2716a, 2716b, and 2716c, and a spring 2714. The plate 2710 is secured to the female part, e.g., by fasteners. The latches 2712a and 2712b are pivotally attached to the plate 2710. The latches 2712a and 2712b are coupled to one another by the spring 2714 and the braces 2716a, 2716b, and 2716c. The spring 2714 is attached to the latches 2712a and 2712b at one point along their respective lengths. The braces 2716a, 2716b, and 2716c are coupled to the latches 2712a and 2712b at another point along their respective lengths. The brace 2716a is pivotally attached to the latch 2712a. The brace 2716c is pivotally attached to the latch 2712b. The brace 2716c is pivotally attached to each of the brace 2716c and the brace 2716c. Together the braces 2716a, 2716b, and 2716c form a brace mechanism for controlling the rotation of the latches 2712a and 2712b based on resisting forces generated by the spring 2714. The backstops 2718a and 2718b serves as a stop for the braces 2716a, 2716b, and 2716c. The spring 2714 has a resting length $S_2$ (shown in FIG. 27B). The spring 2714, when elongated beyond it resting length, generates a force to pull the latches 2712a and 2712b together, as will be described in further detail below. Each of the latches 2712a and 2712b is operable to pivot between at least a first position and a second position.

FIG. 27A illustrates a disengaged position where the attachment mechanism 2704 is unengaged with the male part 2702 and the attachment mechanism 2704 is in the first position. In the first position, the brace mechanism formed by the braces 2716a, 2716b, and 2716c is forward of a vertical axis (as indicated by the dashed line) by a distance $e_1$ and resting against the backstops 2718a and 2718b. Also, in the first position, the spring 2714 is elongated to a length $S_1$, which is greater than the resting length $S_2$. The spring 2714 stores energy and can generate a force to pivot the latches 2712a and 2712b closed. The spring 2714 simultaneously forces the latches 2712a and 2712b closed and forces the brace mechanism against the backstops 2718a and 2718b, which stabilizes the latches 2712a and 2712b and the brace mechanism in the first position. The male part 2702 and the attachment mechanism 2704 may be engaged by advancing the male part 2702 into a space between latches 2712a and 2712b, while in the first position. When the male part 2702 is advanced into the space between latches 2712a and 2712b, the male part 2702 pushes the brace 2716b back beyond the vertical axis at which point the spring 2714 contracts, releasing its stored energy, and pulls the latches 2712a and 2712b toward each other. This causes the latches 2712a and 2712b to rotate to the second position where they project into the indentation 2708 and engage the attachment mechanism 2704 and the male part 2702, as illustrated in FIG. 27B. After the spring 2714 releases the stored energy, it returns to its resting length $S_2$. FIG. 27B illustrates an engaged position where the attachment mechanism 2704 is in the second position and the latches 2712a and 2712b are interlocking with the indentation 2708.

FIGS. 28A, 28B, 29A, 29B, 30A, 30B, 31A, and 31B illustrate details of a male part and a female part operable to couple with one another based on an attachment mechanism comprising a lock bolt mechanism, in accordance with some embodiments of the present disclosure.

Figure 28A:
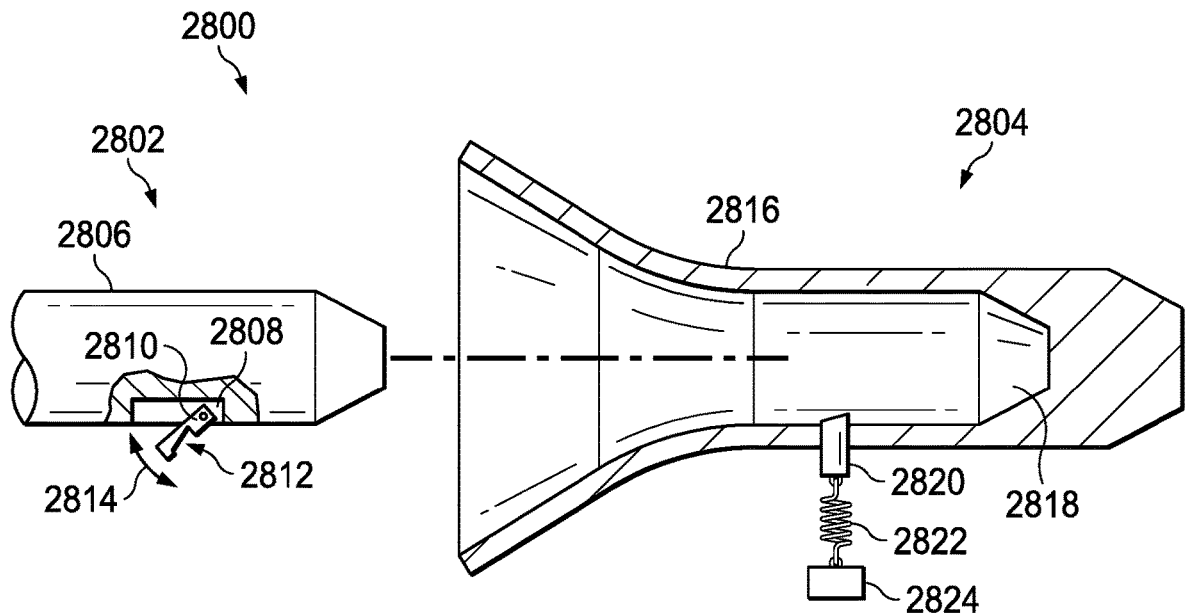
FIGS. 28A, 28B, 29A, 29B, 30A, 30B, 31A, and 31B illustrate details of a male part and a female part operable to couple with one another based on an attachment mechanism comprising a lock bolt mechanism, in accordance with some embodiments of the present disclosure.
Figure 28B:
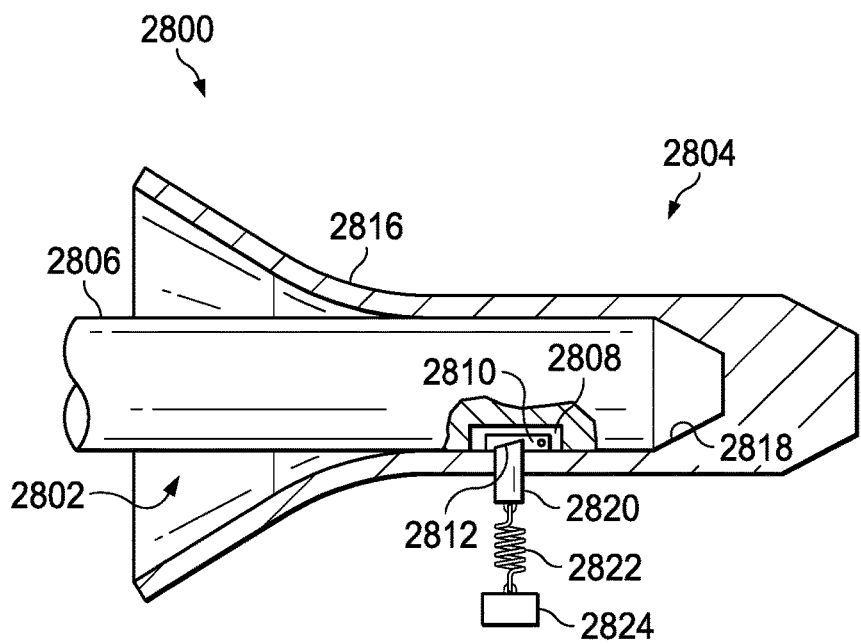

FIGS. 28A and 28B illustrate a system 2800 including a male part 2802 and a female part 2804. The male part 2802 includes a wall forming a shaft 2806. The shaft 2806 includes a recession 2808. A latch 2810 is pivotally attached to the shaft 2806 in the recession 2808. The latch 2810 includes a notch 2812 and is rotatable as generally indicated by the arrows 2814. The latch 2810 is operable to move between at least a first position and a second position. In the first position (shown in FIG. 28A), the latch 2810 extends from the recession 2808. In the second position, the latch 2810 is nested in the recession 2808 does not extend outside of the recession 2808. The female part 2804 includes a lock bolt 2820, a spring 2822, an electromagnet 2824, and a wall 2816 forming a cavity 2818. The lock bolt 2820 is slidably attached to the female part 2804. The wall 2816 includes an opening through which the lock bolt 2820 extends. The lock bolt 2820 is operable to move between at least a first position and a second position. In the first position, the lock bolt 2820 is recessed into the opening and is retracted from out of the cavity 2818. In the second position (shown in FIG. 28A), the lock bolt 2820 extends into the cavity 2818. The spring 2822 pushes and holds the lock bolt 2820 in the second position. The electromagnet 2824 can be activated to generate a magnetic field to attract the lock bolt 2820. This attraction can pull the lock bolt 2820 down into the first position. When the electromagnet 2824 is deactivated, the spring 2822 pushes the lock bolt 2820 back into the first position.

FIG. 28A illustrates the male part 2802 and the female part 2804 uncoupled from one another. The latch 2810 is in the first position. The lock bolt 2820 is in the second position. The male part 2802 and the female part 2804 may be engaged by advancing the male part 2802 into the cavity 2818. As the male part 2802 approaches and contacts the female part 2804, the latch 2810 contacts the wall 2816, which causes the latch 2810 to rotate to the second position. At a point, the male part 2802 forces the lock bolt 2820 to lower into the first position, which compresses the spring 2822, causing it to store energy. When the lock bolt 2820 aligns with the notch 2812 in the latch 2810, the spring 2822 extends, releases the stored energy, and engages with the notch 2812. The male part 2802 and the female part 2804 are then rigidly coupled to one another.

FIG. 28B illustrates the male part 2802 and the female part 2804 coupled to one another. When engaged, the male part 2802 is within the cavity 2818 of the female part 2804, the latch 2810 and the lock bolt 2820 are the second position and interlocking with one another. Advantageously, mechanical engagement created by the lock bolt 2820 interlocking with the notch 2812 on the latch 2810 on the male part 2802 can couple a first aircraft to which the male part 2802 is attached and a second aircraft to which the female part 2804 is attached. The electromagnet 2824 may be activated to pull the lock bolt 2820 into the first position to enable withdrawal of the male part 2802 from the female part 2804.

Figure 29A:
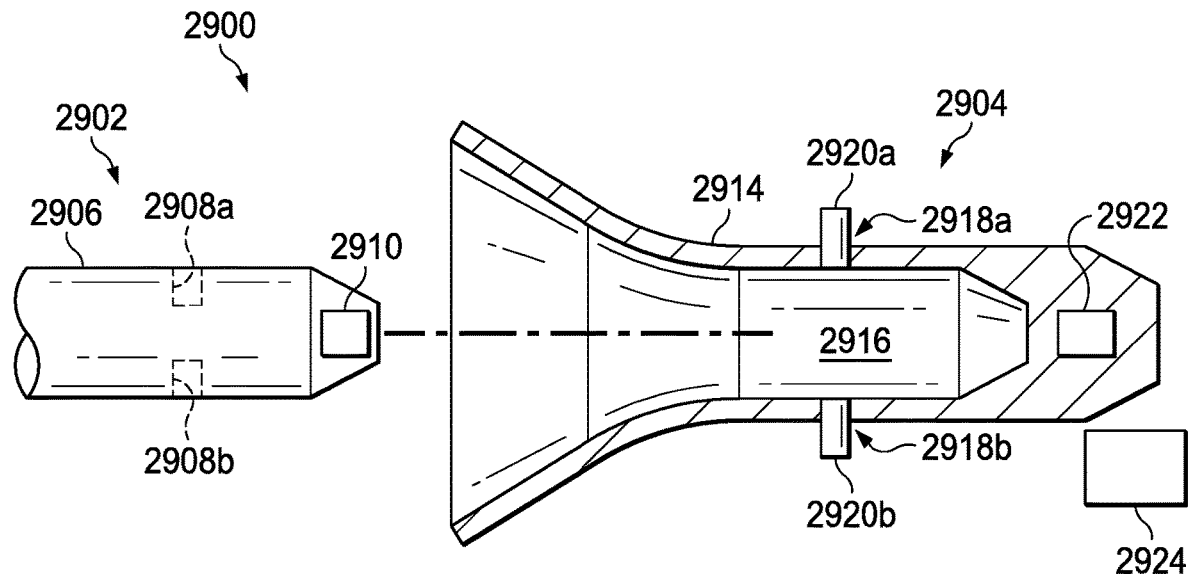
Figure 29B:
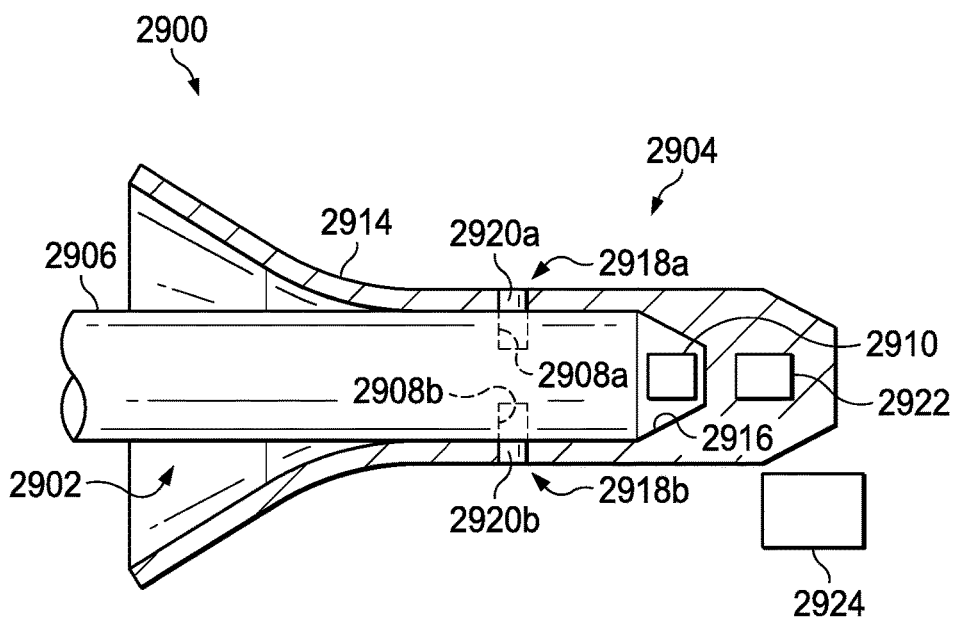

FIGS. 29A and 29B illustrate a system 2900 including a male part 2902 and a female part 2904. The male part 2902 includes a magnetic material 2910 and a wall forming a shaft 2906. The shaft 2906 includes recessions 2908a and 2908b. The female part 2904 includes a wall 2914 forming a cavity 2916, lock bolts 2920a and 2920b, an electromagnet 2922, and a motor 2924. The lock bolts 2920a and 2920b are pivotally attached to the female part 2904. The wall 2914 includes openings 2918a and 2918b through which the lock bolts 2920a and 2920b extend. The motor 2924 provides power to move the lock bolts 2920a and 2920b and to enable the electromagnet 2922 to generate a magnetic field. Each of the lock bolts 2920a and 2920b and the recessions 2908a and 2908b is an attachment mechanism for coupling the male part 2902 and the female part 2904.

FIG. 29A illustrates the male part 2902 and the female part 2904 uncoupled from one another. Each of the lock bolts 2920a and 2920b is operable to move between at least a first position and a second position. In the first position as illustrated in FIG. 29A, the lock bolts 2920a and 2920b are recessed into the openings 2918a and 2918b, respectively, in the wall 2914. The male part 2902 and the female part 2904 may be engaged by advancing the male part 2902 into the cavity 2916. The electromagnet 2922 may generate a magnetic field to attract the magnetic material 2910 and the electromagnet 2922 toward one another and, thereby, further pull the male part 2902 into the cavity 2916. When the male part 2902 is fully inserted into the cavity 2916, the motor 2924 can provide power to move the lock bolts 2920a and 2920b to the second position where they project through the openings 2918a and 2918b and into the recessions 2908a and 2908b, as illustrated in FIG. 29B.

FIG. 29B illustrates the male part 2902 and the female part 2904 coupled to one another. When engaged, the male part 2902 is within the cavity 2916 of the female part 2904 and the lock bolts 2920a and 2920b are in the second position and interlock with the recessions 2908a and 2908b on the male part 2902. Advantageously, mechanical engagement created by the lock bolts 2920a and 2920b on the female part 2904 interlocking with the recessions 2908a and 2908b on the male part 2902 can couple a first aircraft to which the male part 2902 is attached and a second aircraft to which the female part 2904 is attached. The lock bolts 2920a and 2920b are locked in place to prevent relative movement between the male part 2902 and the female part 2904. In some examples, lock bolts 2920a and 2920b are locked in place, for example, by the motor 2924 or by any other means. The lock bolts 2920a and 2920b may be moved back to the first position to enable withdrawal of the male part 2902 from the female part 2904.

Figure 30A:
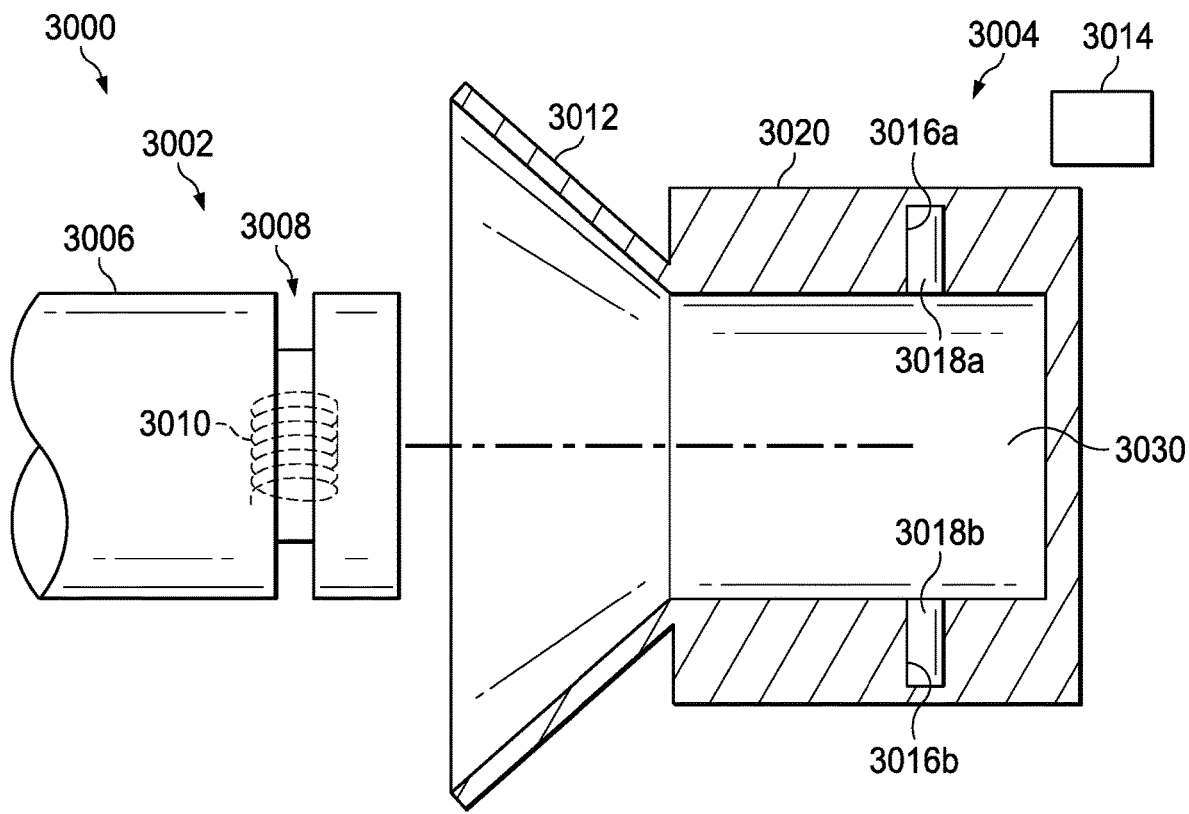
Figure 30B:
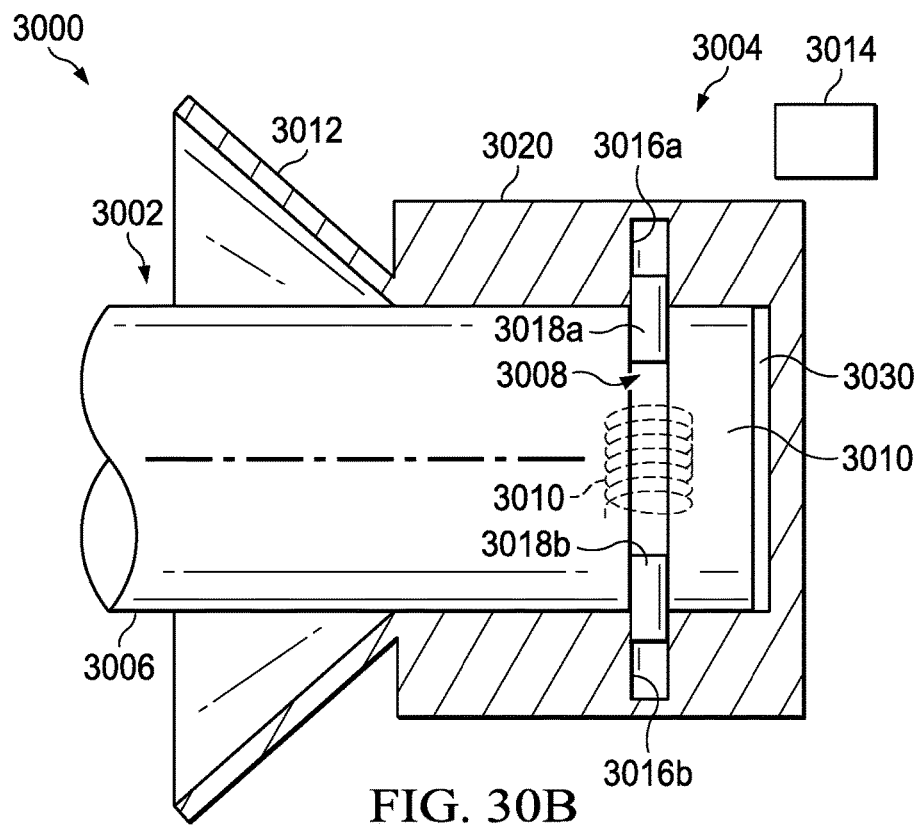

FIGS. 30A and 30B illustrate a system 3000 including a male part 3002 and a female part 3004. The male part 3002 includes an electromagnet 3010 and a wall forming a shaft 3006. The electromagnet 3010 is located within the shaft 3006 and is operable to generate a magnetic field. The shaft 3006 includes a recession 3008 spanning the circumference of the shaft 3006. The female part 3004 includes, lock bolts 3018a and 3018b, a motor 3014, and a wall 3020 forming a cavity 3030 and a cone 3012. The lock bolts 3018a and 3018b are slidably attached to the female part 3004. The wall 3020 includes openings 3016a and 3016b through which the lock bolts 3018a and 3018b extend. The electromagnet 3010 can selectively move the lock bolts 3018a and 3018b based on the magnetic field. Each of the lock bolts 3018a and 3018b and the recession 3008 is an attachment mechanism for coupling the male part 3002 and the female part 3004.

FIG. 30A illustrates the male part 3002 and the female part 3004 uncoupled from one another. Each of the lock bolts 3018a and 3018b is operable to move between at least a first position and a second position. In the first position, as illustrated in FIG. 30A, the lock bolts 3018a and 3018b recessed into the openings 3016a and 3016b, respectively, in the wall 3020. The male part 3002 and the female part 3004 may be engaged by advancing the male part 3002 into the cavity 3030. The electromagnet 3010 may generate the magnetic field to move the lock bolts 3018a and 3018b to the second position where they project through the openings 3016a and 3016b and into the recession 3008, as illustrated in FIG. 30B. In addition, the electromagnet 3010 the magnetic field may attract the wall 3020 (which in this case comprises a magnetic material) and the electromagnet 3010 toward one another and, thereby, further pull the male part 3002 into the cavity 3030.

FIG. 30B illustrates the male part 3002 and the female part 3004 coupled to one another. When engaged, the male part 3002 is within the cavity 3030 of the female part 3004 and the lock bolts 3018a and 3018b are in the second position and interlock with the recessions 3008 on the male part 3002. Advantageously, mechanical engagement created by the lock bolts 3018a and 3018b on the female part 3004 interlocking with the recession 3008 on the male part 3002 can couple a first aircraft to which the male part 3002 is attached and a second aircraft to which the female part 3004 is attached. The lock bolts 3018a and 3018b are locked in place to prevent relative movement between the male part 3002 and the female part 3004. In some examples, lock bolts 3018a and 3018b are locked in place, for example, by the magnetic field (generated by the electromagnet 3010), the motor 3014, and/or by any other means. The lock bolts 3018a and 3018b may be moved back to the first position to enable withdrawal of the male part 3002 from the female part 3004. For example, a polarity of the magnetic field (generated by the electromagnet 3010) may be reversed to repel the lock bolts 3018a and 3018b and, thereby, move them from the second position to the first position.

Figure 31A:
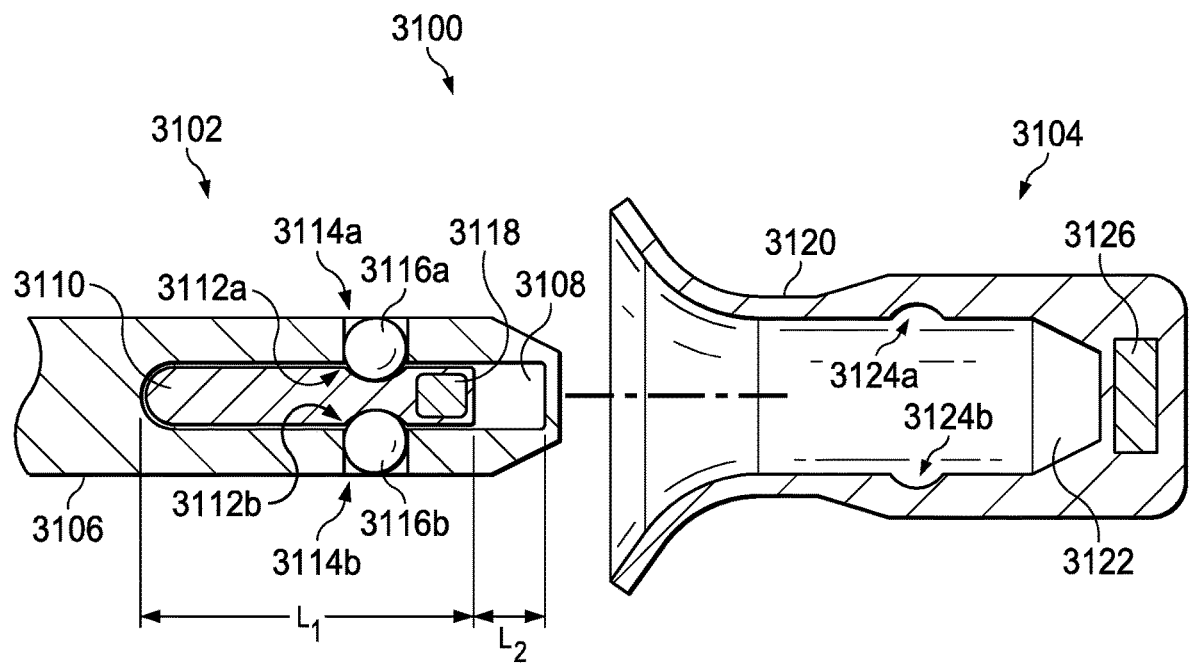
Figure 31B:
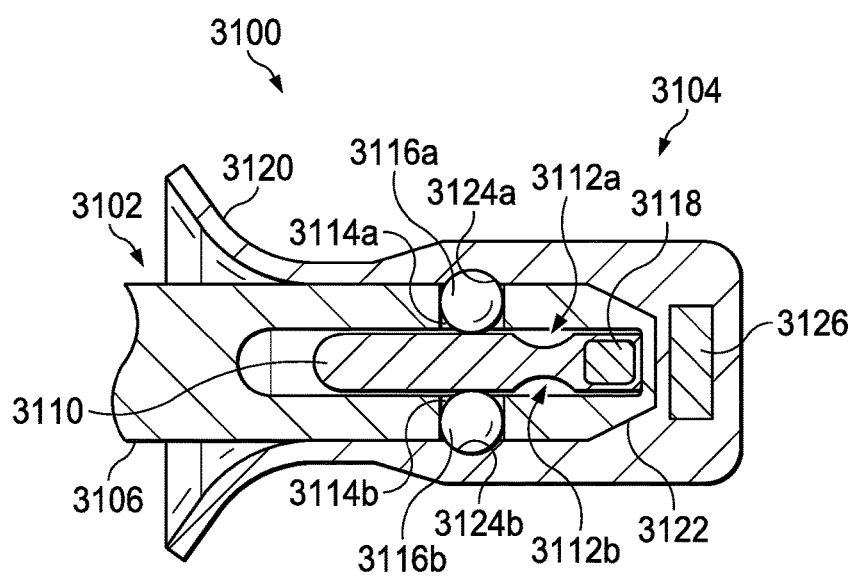

Though the FIGS. 29A, 29B, 30A, and 30B each illustrate a male part including a recession and a female part including a lock bolt, embodiments of the present disclosure are not limited to such a configuration. In other embodiments of the present disclosure, the recession and lockbolt are swapped on the male and female parts such that the male part includes the lockbolt and the female part includes the recession. FIGS. 31A and 31B illustrate an example of such embodiments.

FIGS. 31A and 31B illustrate a system 3100 including a male part 3102 and a female part 3104. The male part 3102 includes a wall forming a shaft 3106, a tubular bolt 3110, and lock bolts 3116a and 3116b. The shaft 3106 includes openings 3114a and 3114b and a channel 3108. The openings 3114a and 3114b and the channel 3108 intersect and, together, form a T-shaped hollow area within the shaft 3106. The lock bolts 3116a and 3116b are spherical in shape and are operable to create a mechanical engagement with the female part 3104. The tubular bolt 3110 is to guide movement of the lock bolts 3116a and 3116b to regulate the mechanical engagement. The tubular bolt 3110 is enclosed within and moveable along a length of the channel 3108. The tubular bolt 3110 has an overall length of $L_1$ and the channel 3108 has an overall length of $L_1+L_2$. Thus, the tubular bolt 3110 has length $L_2$ of headroom within the channel 3108. The tubular bolt 3110 includes a magnetic material 3118 and indentations 3112a and 3112b that correspond to the lock bolts 3116a and 3116b. The magnetic material 3118 facilitates movement of the tubular bolt 3110 within the channel 3108 to move the lock bolts 3116a and 3116b between at least a first position and a second position. The female part 3104 includes an electromagnet 3126 and a wall 3120 forming a cavity 3122. The wall 3120 includes a notch 3124 (i.e., labeled 3124a and 3124b) spanning the circumference of the cavity 3122. Each of the lock bolts 3116a and 3116b, the tubular bolt 3110, and the notch 3124 is an attachment mechanism for coupling the male part 3102 and the female part 3104.

FIG. 31A illustrates the male part 3102 and the female part 3104 uncoupled from one another and the lock bolts 3116a and 3116b are in the first position. In the first position, the lock bolts 3116a and 3116b are recessed into the openings 3114a and 3114b, resting in the indentations 3112a and 3112b, and do not project from the shaft 3106. The male part 3102 and the female part 3104 may be engaged by advancing the male part 3102 into the cavity 3122. As the male part 3102 moves into the cavity 3122, the wall 3120 can force the lock bolts 3116a and 3116b into the indentations 3112a and 3112b e.g., if the lock bolts 3116a and 3116b move outward due to gravity or other forces. In addition, the electromagnet 3126 can be activated to generate a magnetic field to attract the magnetic material 3118 in the tubular bolt 3110. The magnetic field pulls the magnetic material 3118 and the tubular bolt 3110 forward within the channel 3108 (e.g., by a distance $L_2$) and further pulls the male part 3102 into the cavity 3122. As the tubular bolt 3110 moves forward within the channel 3108, the indentations 3112a and 3112b move out of alignment with the lock bolts 3116a and 3116b, which forces the lock bolts 3116a and 3116b to move outwardly through the openings 3114a and 3114b. As the lock bolts 3116a and 3116b move into alignment with the notch 3124, the lock bolts 3116a and 3116b can move outwardly through the openings 3114a and 3114b and engage the notch 3124, as illustrated in FIG. 31B.

FIG. 31B illustrates the male part 3102 and the female part 3104 coupled to one another. When engaged, the lock bolts 3116a and 3116b are in the second position and interlocking with the notch 3124 on the female part 3104. Advantageously, mechanical engagement created by the lock bolts 3116a and 3116b on the male part 3102 interlocking with the notch 3124 on the female part 3104 can couple a first aircraft to which the male part 3102 is attached and a second aircraft to which the female part 3104 is attached. The electromagnet 3126 can generate a magnetic force to repel the magnetic material 3118 on the tubular bolt 3110. The repulsive magnetic force causes the tubular bolt 3110 to move backward within the channel (e.g., to a position shown in FIG. 31A). This backward movement causes the lock bolts 3116a and 3116b to move from the second position to first position to release the notch 3124 and enables withdrawal of the male part 3102 from the female part 3104.

Figure 32A:
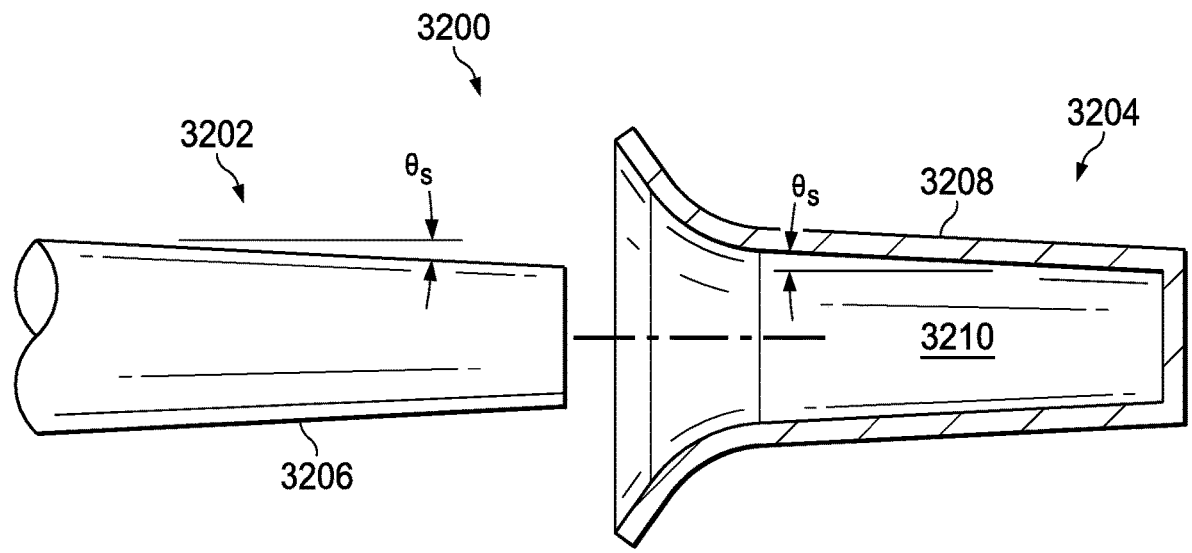
FIGS. 32A, 32B, 35A, and 35B illustrate details of a male part and a female part operable to couple with one another based on an attachment mechanism comprising a friction mechanism, in accordance with some embodiments of the present disclosure.
Figure 32B:
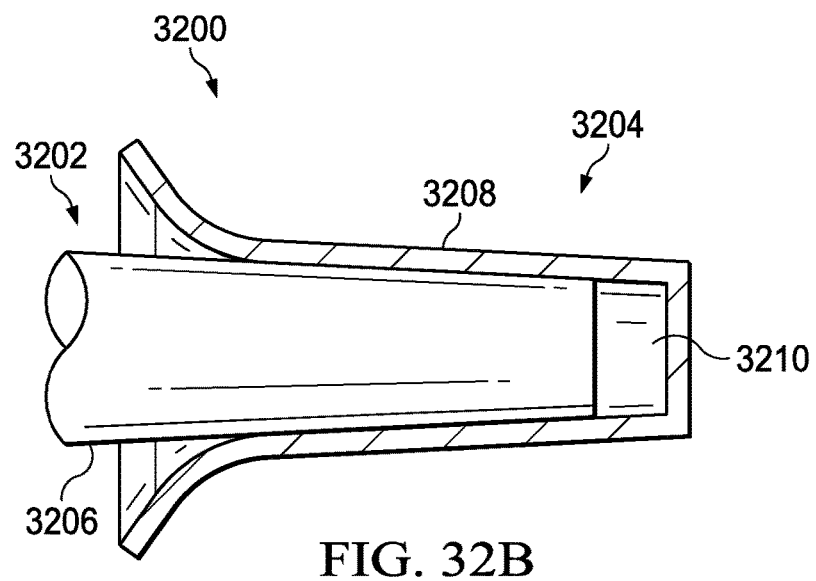

FIGS. 32A and 32B illustrate a system 3200 including a male part 3202 and a female part 3204. The male part 3202 includes a wall forming a shaft 3206. The female part 3204 includes a wall 3208 forming a cavity 3210. The shaft 3206 and the cavity 3210 correspond in size and shape. Both the shaft 3206 and the cavity 3210 slope at an angle $\theta_s$. FIG. 32A illustrates the male part 3202 and the female part 3204 uncoupled form one another. The male part 3202 and the female part 3204 may be coupled by advancing the male part 3202 into the cavity 3210. FIG. 32B illustrates the male part 3202 and the female part 3204 coupled to one another. When engaged, the male part 3202 nests in the female part 3204 creating friction between surfaces of the male part 3202 and the female part 3204. The matching slopes help to facilitate the friction to maintain engagement between the male part 3202 and the female part 3204. Advantageously, a mechanical engagement such as the friction created by the between surfaces of the male part 3202 and the female part 3204 can couple a first aircraft to which the male part 3202 is attached and a second aircraft to which the female part 3204 is attached. The male part 3202 and the female part 3204 can be disengaged based on the withdrawal of the male part 3202 from the female part 3204. Outer surfaces of the male part 3202 and of the female part 3204 are attachment mechanism for coupling the male part 3202 and the female part 3204.

Figure 33:
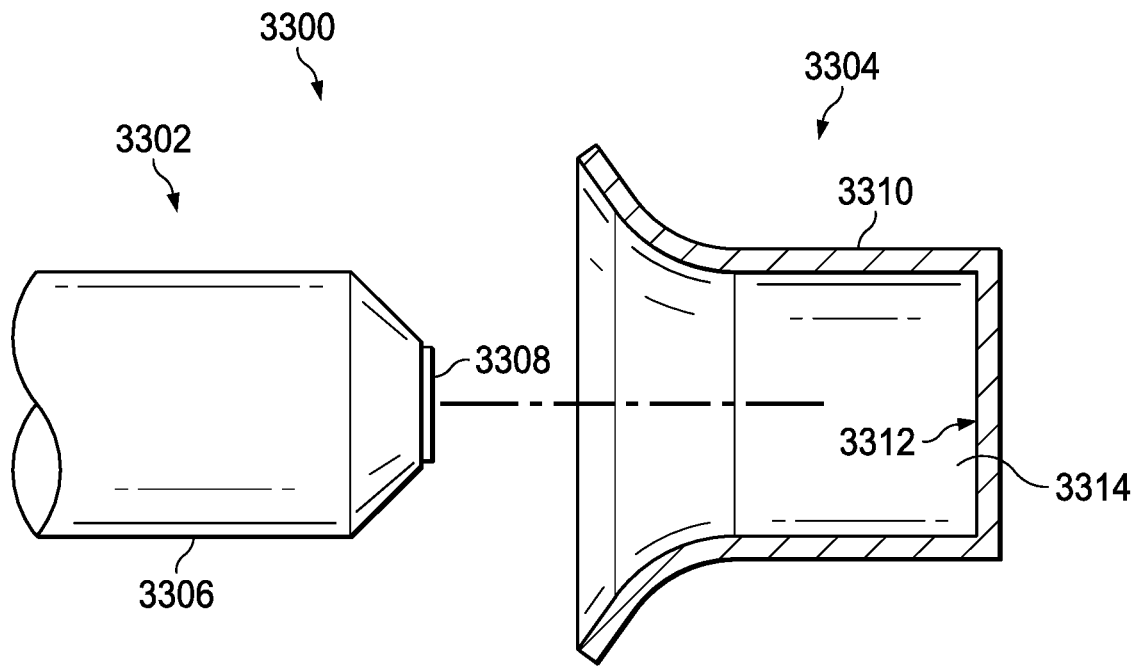
FIG. 33 illustrates details of a male part and a female part operable to couple with one another based on an attachment mechanism comprising an adhesive material, in accordance with some embodiments of the present disclosure.

FIG. 33 illustrates a system 3300 including a male part 3302 and a female part 3304 operable to couple with one another based on an attachment mechanism comprising an adhesive material, in accordance with some embodiments of the present disclosure. The male part 3302 includes an adhesive material 3308 and a wall forming a shaft 3306. The adhesive material 3308 is attached to an end of the shaft 3306. The adhesive material 3308 is an attachment mechanism that can create adhesion with another surface, e.g., based on intermolecular forces. The female part 3304 includes a wall 3310 forming a cavity 3314. The cavity 3314 includes a surface 3312. The male part 3302 and the female part 3304 are uncoupled when the adhesive material 3308 is unadhered to the surface 3312 of the female part 3304. The male part 3302 and the female part 3304 may be coupled by advancing the male part 3302 into the cavity 3314 to cause the adhesive material 3308 to adhere to the surface 3312 of the female part 3304. Advantageously, mechanical engagement such as the adhesion created by the between adhesive material 3308 and the surface 3312 of the female part 3304 can couple a first aircraft to which the male part 3302 is attached and a second aircraft to which the female part 3304 is attached. The male part 3302 and the female part 3304 can be disengaged based on the withdrawal of the male part 3302 from the female part 3304.

Though the FIG. 33 illustrates the male part including the adhesive material, embodiments of the present disclosure are not limited to such a configuration. In other embodiments of the present disclosure, the adhesive material is swapped to the female part such that the female part includes the adhesive material. In further embodiments of the present disclosure, an adhesive material is added to the female part such that both the male and the female part include adhesive material.

Figure 34:
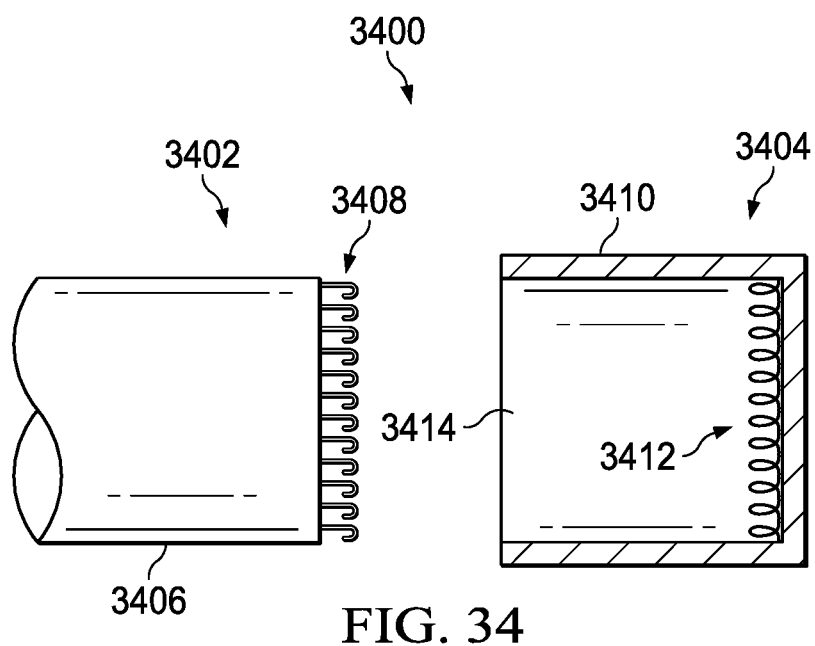
FIG. 34 illustrates details of a male part and a female part operable to couple with one another based on an attachment mechanism comprising hook-and-loop fasteners, in accordance with some embodiments of the present disclosure.

FIG. 34 illustrates a system 3400 including a male part 3402 and a female part 3404 operable to couple with one another based on an attachment mechanism comprising a hook-and-loop fastener system, in accordance with some embodiments of the present disclosure. The hook-and-loop fastener system includes a hook fastener 3408 and a loop fastener 3412. The male part 3402 includes the hook fastener 3408 and a wall forming a shaft 3406. The hook fastener 3408 is attached to an end of the shaft 3406. The hook fastener 3408 can create a mechanical engagement with the loop fastener 3412. The female part 3404 includes the loop fastener 3412 and a wall 3410 forming a cavity 3414. The loop fastener 3412 is attached to a surface of the cavity 3414. The male part 3402 and the female part 3404 are uncoupled from one another when the hook fastener 3408 and the loop fastener 3412 are disconnected from one another. The male part 3402 and the female part 3404 may be engaged by advancing the male part 3402 into the cavity 3414 to place the hook fastener 3408 in contact with the loop fastener 3412. When engaged, a mechanical engagement is created by hooks in the hook fastener 3408 hooking around loops in the loop fastener 3412. Advantageously, the mechanical engagement can couple a first aircraft to which the male part 3402 is attached and a second aircraft to which the female part 3404 is attached. The male part 3402 and the female part 3404 can be disengaged based on the withdrawal of the male part 3402 from the female part 3404 to separate the hook fastener 3408 and the loop fastener 3412 from one another.

Though the FIG. 34 illustrates the male part including a hook fastener and a female part including a loop fastener, embodiments of the present disclosure are not limited to such a configuration. In other embodiments of the present disclosure, the hook fastener and loop fastener are swapped on the male and female parts such that the male part includes the loop fastener and the female part includes the hook fastener. In further embodiments of the present disclosure, a loop fastener is added to the male part and a hook fastener is added to the male part such that each of the male and the female part include both a hook fastener and a loop fastener.

Figure 35A:
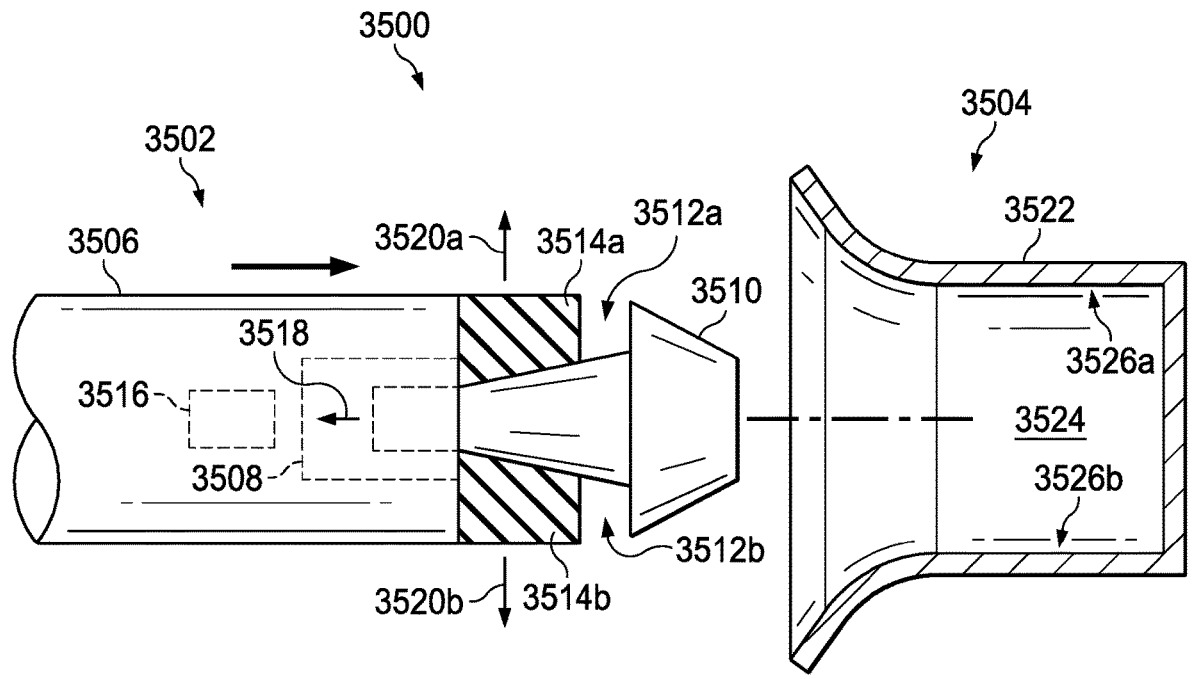
Figure 35B:
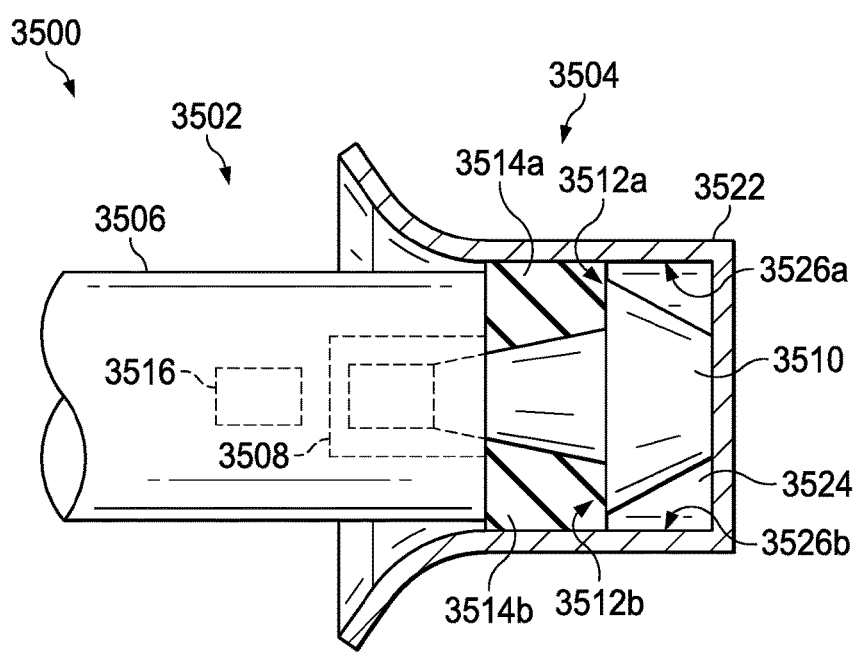

FIGS. 35A and 35B illustrate a system 3500 including a male part 3502 and a female part 3504. The male part 3502 includes a motor 3516, a tapered screw 3510, grippers 3514a and 3514b, and a wall forming a shaft 3506. The shaft 3506 includes an opening 3508. The tapered screw 3510 includes threads (not shown). The tapered screw 3510 extends into the opening 3508 and projects outward from the shaft 3506. The grippers 3514a and 3514b are attached around a shaft of the tapered screw 3510. The tapered screw 3510 is to guide movement of the grippers 3514a and 3514b between at least a first position and a second position to regulate the mechanical engagement between the grippers 3514a and 3514b and the female part 3504. The motor 3516 can drive rotation of the tapered screw 3510 into a threaded interface in the opening 3508 which can cause it to retract into or advance out of the opening 3508. The female part 3504 includes a wall 3522 forming a cavity 3524. The wall 3520 includes surfaces 3526a and 3526b. Each of the tapered screw 3510 and the grippers 3514a and 3514b is an attachment mechanism for coupling the male part 3502 and the female part 3504.

FIG. 35A illustrates the male part 3502 and the female part 3504 uncoupled form one another and the grippers 3514a and 3514b in the first position. In the first position, the grippers 3514a and 3514b are flush with an outer surface of the shaft 3506. The male part 3502 and the female part 3504 may be engaged by advancing the male part 3502 into the cavity 3524. As the male part 3502 moves into the cavity 3524, the motor 3516 may retract the tapered screw 3510 into the opening 3508 as generally indicated by arrow 3518. Because the shaft of the tapered screw 3510 is tapered, the retraction of the tapered screw 3510 causes the grippers 3514a and 3514b to move outward and project beyond the outer faces of the shaft 3506, as generally indicated by arrows 3520a and 3520b. The male part 3502 continues moving forward within the cavity 3524 and the grippers 3514a and 3514b continue moving outward to contact the surfaces 3526a and 3526b, as illustrated in FIG. 35B.

FIG. 35B illustrates the male part 3502 and the female part 3504 coupled to one another and the grippers 3514a and 3514b in the second position. When coupled, the grippers 3514a and 3514b are in the second position and contact the surfaces 3526a and 3526b on the female part 3504. In some examples, the grippers 3514a and 3514b comprise a gripping material such as a rubber or any other material having a high coefficient of friction for gripping. Advantageously, friction created by the grippers 3514a and 3514b on the male part 3502 contacting the surfaces 3526a and 3526b on the female part 3504 can couple a first aircraft to which the male part 3502 is attached and a second aircraft to which the female part 3504 is attached. The motor 3516 may advance the tapered screw 3510 out of the opening 3508, which causes the grippers 3514a and 3514b to move from the second position to first second position to release the grippers 3514a and 3514b from the surfaces 3526a and 3526b of the cavity 3524 and enable withdrawal of the male part 3502 from the female part 3504.

Figure 36A:
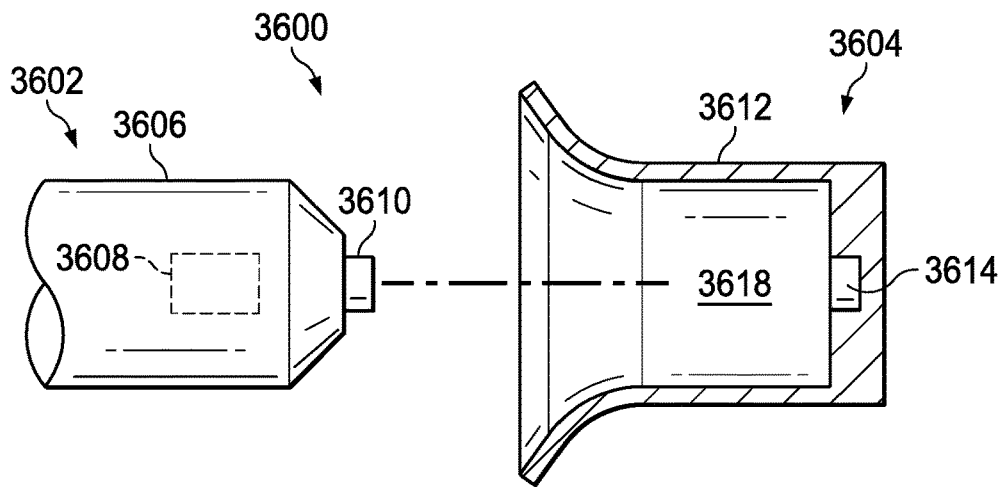
FIGS. 36A, 36B, and 36C illustrate details of a male part and a female part operable to couple with one another based on an attachment mechanism comprising a grapple, in accordance with some embodiments of the present disclosure.
Figure 36B:
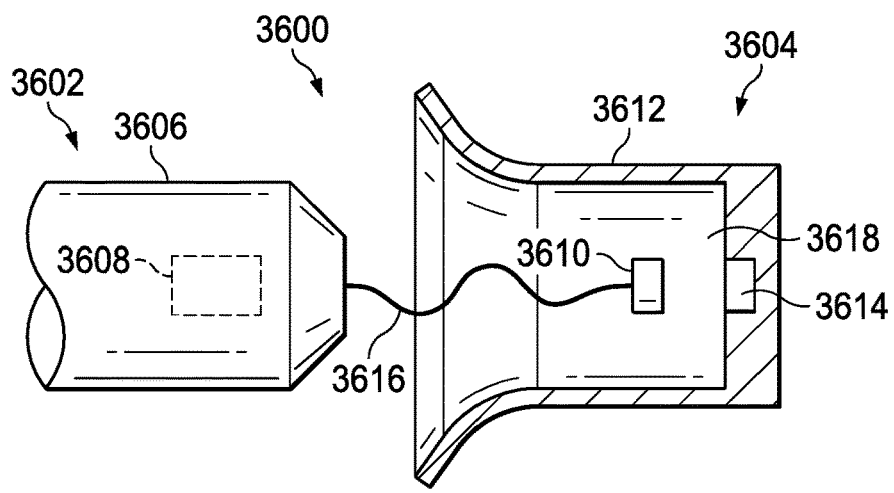
Figure 36C:
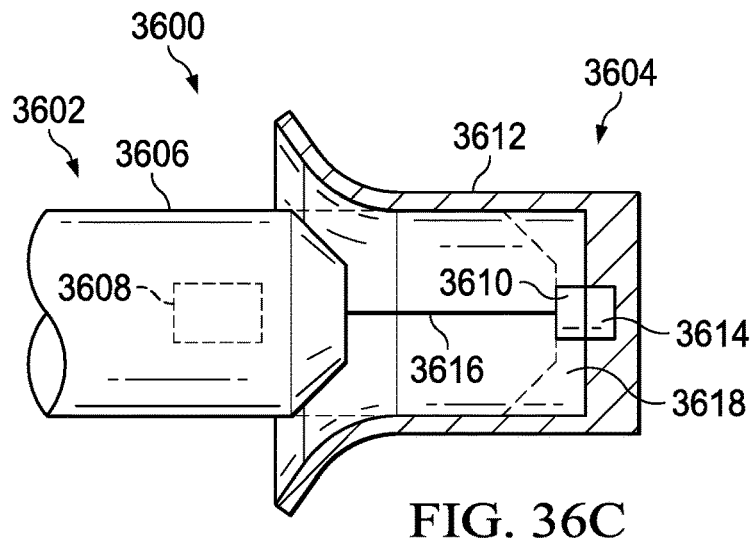

FIGS. 36A, 36B, and 36C illustrate details of a system 3600 including a male part 3602 and a female part 3604 operable to couple with one another based on an attachment mechanism comprising a grapple, in accordance with some embodiments of the present disclosure. The male part 3602 includes motor 3608, a rope 3616, a grapple 3610, and a wall forming a shaft 3606. A first end of the rope 3616 is attached to the shaft 3606 and a second end of the rope 3616 (opposite the first) is attached to the grapple 3610. The motor 3608 is to guide movement of the grapple 3610 between at least a first position and a second position to regulate the mechanical engagement between the grapple 3610 and the female part 3504. The motor 3608 casts the grapple 3610 and the rope 3616 toward the female part 3604. The female part 3604 includes a grapple attachment 3614 and a wall 3612 forming a cavity 3618. The grapple attachment 3614 is affixed to the wall 3612. Each of the grapple 3610 and the grapple attachment 3614 is an attachment mechanism for coupling the male part 3602 and the female part 3604.

FIG. 36A illustrates the male part 3602 and the female part 3604 uncoupled from one another and the grapple 3610 in the first position. In the first position, the grapple 3610 is disconnected from the grapple attachment 3614. The motor 3608 projects the grapple 3610 and the rope 3616 toward the grapple attachment 3614 on the female part 3604, as illustrate in FIG. 36B. The grapple 3610 contacts the grapple attachment 3614 and makes the mechanical engagement between the male part 3602 and the female part 3504. In some examples, the mechanical engagement includes a grappling hook attaching to a pin and/or a magnetic component coupling to one another. FIG. 36C illustrates the male part 3602 and the female part 3604 coupled to one another and the and the grapple 3610 in the second position. In the second position, the grapple 3610 engages the grapple attachment 3614 on the female part 3604. After the grapple 3610 and the grapple attachment 3614 are coupled to one another, the motor may reel the rope 3616 to pull the male part 3602 and the female part 3604 toward one another, as illustrated by the dashed line in the FIG. 36C. Though the FIGS. 36A, 36B, and 36C illustrate the male part including a grapple and the female part including a grapple attachment, embodiments of the present disclosure are not limited to such a configuration. In other embodiments of the present disclosure, the grapple and grapple attachment are swapped on the male and female parts such that the male part includes the grapple attachment and the female part includes the grapple.

Figure 37A:
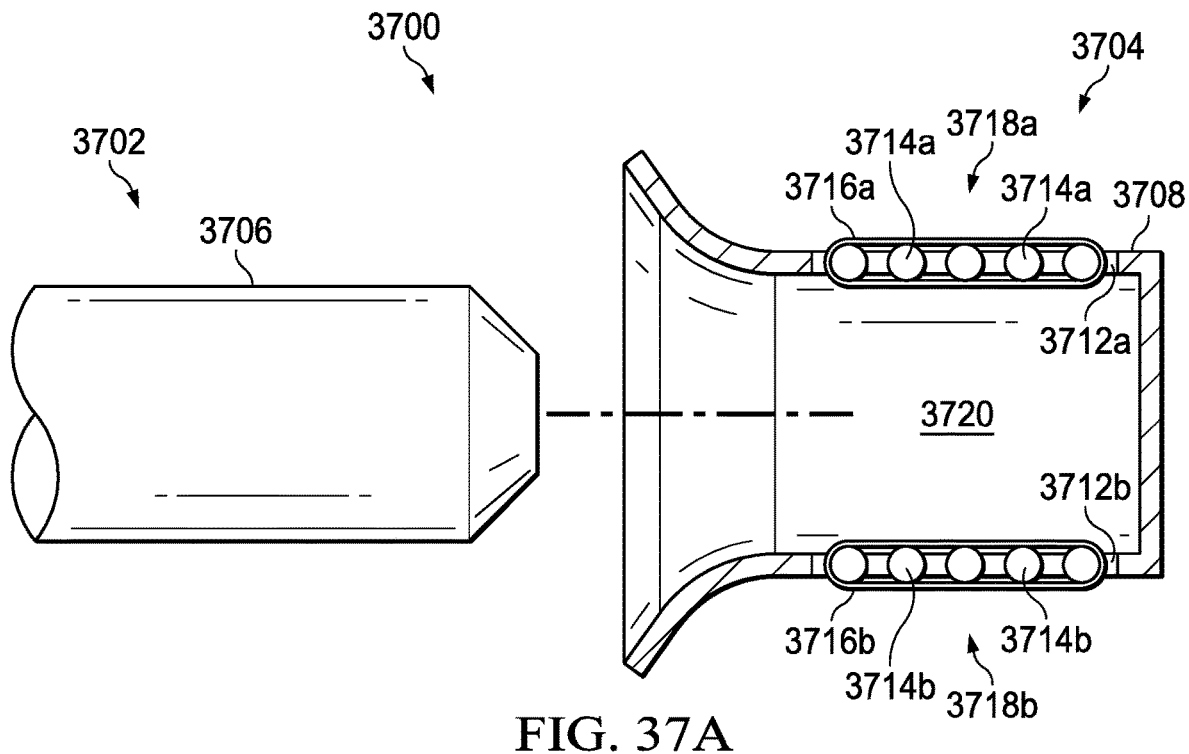
FIGS. 37A and 37B illustrate details of a male part and a female part operable to couple with one another based on an attachment mechanism comprising a conveyor, in accordance with some embodiments of the present disclosure.
Figure 37B:
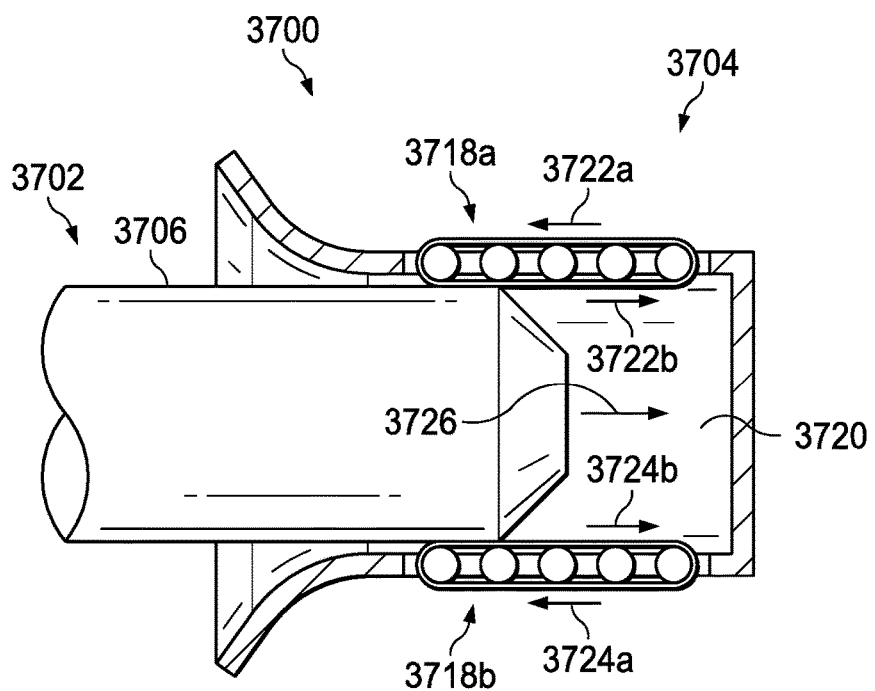

FIGS. 37A and 37B illustrate details of a system 3700 including a male part 3702 and a female part 3704 operable to couple with one another based on an attachment mechanism comprising a conveyor, in accordance with some embodiments of the present disclosure. The male part 3702 includes a wall forming a shaft 3706. The female part 3704 includes conveyors 3718a and 3718b and a wall 3708 forming a cavity 3720. Each of the conveyors 3718a and 3718b is an attachment mechanism for coupling the male part 3702 and the female part 3704. The wall 3708 includes openings 3712a and 3712b in which the conveyors 3718a and 3718b are respectively located. Each of the conveyors 3718a and 3718b is operable to advance the male part 3702 into the female part 3704 (e.g., based on operating in first rotational direction) and to withdraw the male part 3702 from the female part 3704 (e.g., based on operating in second rotational direction, opposite the first rotational direction). Each of the conveyors 3718a and 3718b includes belts 3716a and 3716b, which wrap around a plurality of wheels 3714a and 3714b, respectively. The wheels 3714a and 3714b drive rotation of the belts 3716a and 3716b. FIG. 37A illustrates the male part 3702 and the female part 3704 uncoupled from one another. The male part 3702 and the female part 3704 may be coupled by advancing the male part 3702 into the cavity 3720. FIG. 37B illustrates the male part 3702 and the female part 3704 coupled to one another. The conveyors 3718a and 3718b may be activated to operate in the first rotational direction as generally indicated by arrows 3722a and 3722a relative to the conveyor 3718a and arrows 3724a and 3724a relative to the conveyor 3718b. While the conveyors 3718a and 3718b are rotating, the belts 3716a and 3716b can grip the outer surface of the shaft 3706 to pull it further into the cavity 3720 as generally indicated by arrow 3726.

Though the FIGS. 37A and 37B illustrate the female part including two conveyors, embodiments of the present disclosure are not limited to such a configuration. In other embodiments of the present disclosure, the female part may have more or fewer conveyors. In further embodiments of the present disclosure, one or more of the conveyors is swapped to the male part such that the male part includes at least one conveyor. In further embodiments of the present disclosure, a conveyor is added to the female part such that both the male and the female part include a conveyor.

FIGS. 38A, 38B, 39A, and 39B illustrate details of a male part and a female part operable to couple with one another based on an attachment mechanism comprising a fluid pump, in accordance with some embodiments of the present disclosure.

Figure 38A:
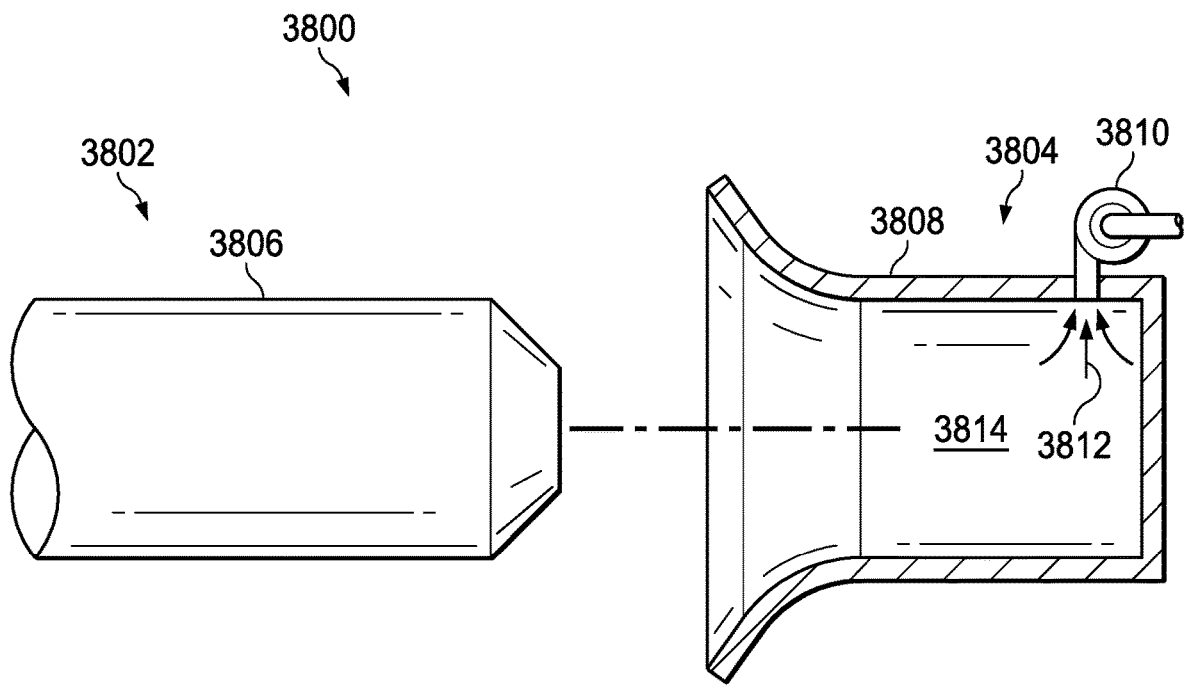
FIGS. 38A, 38B, 39A, and 39B illustrate details of a male part and a female part operable to couple with one another based on an attachment mechanism comprising a fluid pump, in accordance with some embodiments of the present disclosure.
Figure 38B:
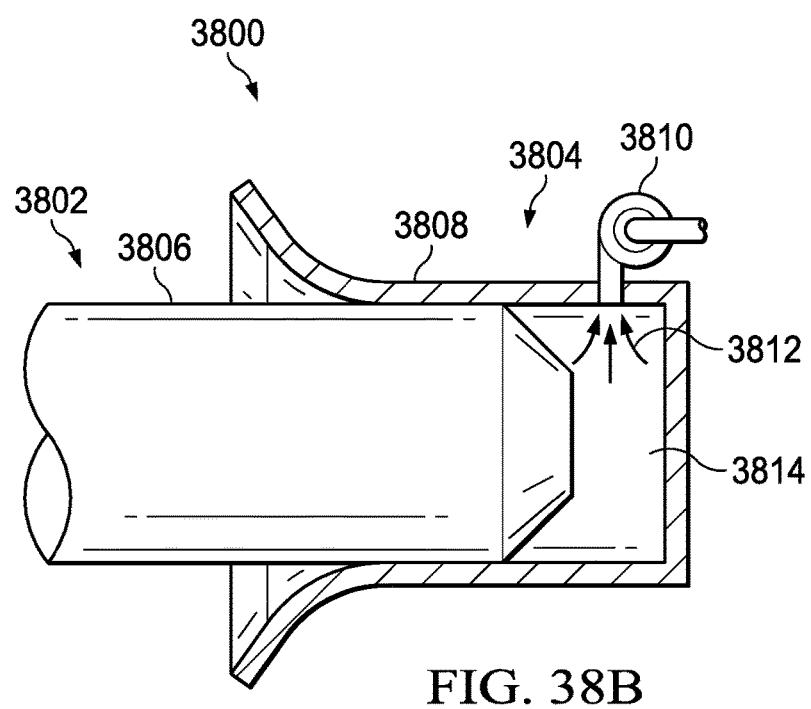

FIGS. 38A and 38B illustrate details of a system 3800 including a male part 3802 and a female part 3804. The male part 3802 includes a wall forming a shaft 3806. The female part 3804 includes a pump 3810 and a wall 3808 forming a cavity 3814. The wall 3808 includes an opening through which the pump 3810 may suck air (e.g., creating negative pressure) or pump air (e.g., creating positive pressure) into or out of the cavity 3814. The pump 3810 can adjust a pressure in the cavity 3814. For example, the pump 3810 is operable to advance the male part 3802 into the female part 3804 (e.g., based on sucking air from the cavity 3814) and to withdraw the male part 3802 from the female part 3804 (e.g., based on blowing air into the cavity 3814). FIG. 38A illustrates the male part 3802 and the female part 3804 uncoupled from one another. The male part 3802 and the female part 3804 may be coupled by advancing the male part 3802 into the cavity 3814. As the shaft 3806 is advanced into the cavity 3814, the shaft 3806 and the wall 3808 form a seal that, at least in part, seals air within the cavity 3814. The pump 3810 is activated to suck air from the cavity 3814 as generally indicated by arrows 3812. FIG. 38B illustrates the male part 3802 and the female part 3804 coupled to one another. Because the pump 3810 is creating negative pressure in the cavity 3814 while the shaft 3806 and the wall 3808 seal the air within the cavity 3814 the shaft 3806 advances further into the cavity 3814. Advantageously, pressure created by the pump 3810 in the cavity 3814 can couple a first aircraft to which the male part 3802 is attached and a second aircraft to which the female part 3804 is attached. The pump 3810 may be reversed to create positive pressure in the cavity 3814 to help withdraw the shaft 3806 from the cavity 3814.

Though FIGS. 38A and 38B illustrate the female part including the pump, embodiments of the present disclosure are not limited to such a configuration. In other embodiments of the present disclosure, the pump is swapped to the male part such that the male part includes the pump. In further embodiments of the present disclosure, a pump is added to the male part such that each of the male and the female part includes a pump.

Figure 39A:
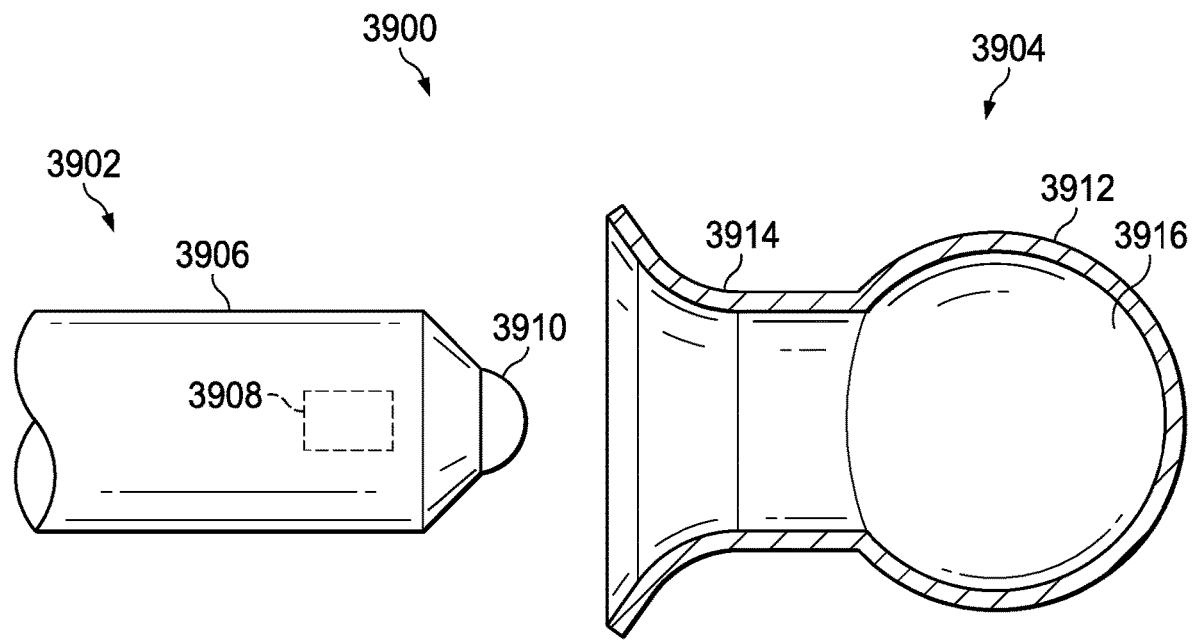
Figure 39B:
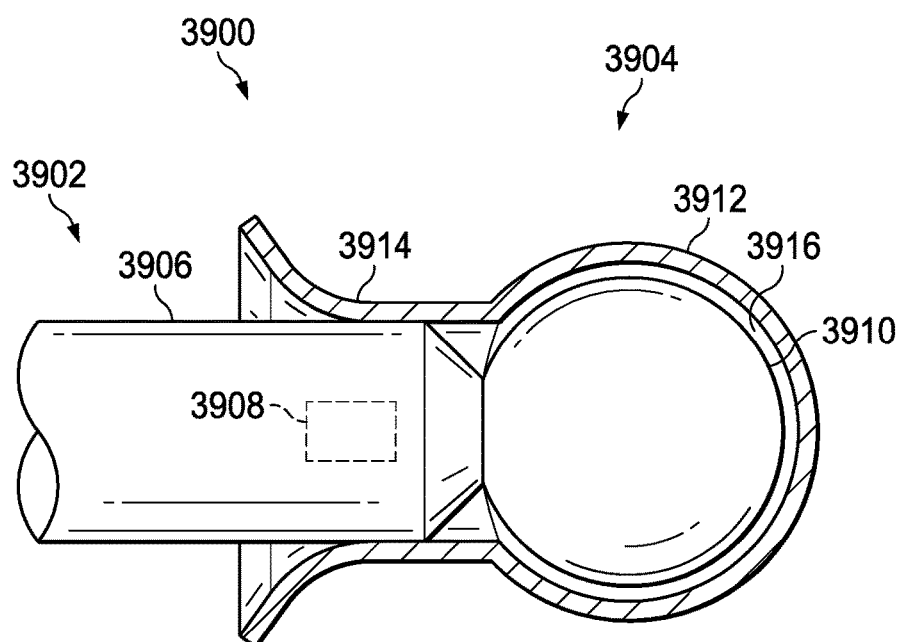

FIGS. 39A and 39B illustrate details of a system 3900 including a male part 3902 and a female part 3904. The male part 3902 includes a pump 3908, a fluid bladder 3910, a wall forming a shaft 3906. The pump 3908 is located within the shaft 3906 and operable to pump a fluid such as water or air into the fluid bladder 3910. The female part 3904 includes a wall 3912 forming a cavity 3916. The cavity 3916 is spherical in shape. The fluid bladder 3910 and the pump 3908 cooperate as an attachment mechanism to regulate a mechanical engagement between the male part 3902 and the cavity 3916 in the female part 3904. The pump 3908 is operable to switch the fluid bladder 3910 between an engaged position and a disengaged position. FIG. 39A illustrates the fluid bladder 3910 in the disengaged position. In the disengaged position, the fluid bladder 3910 lacks any mechanical engagement with the wall 3912. The male part 3902 may be into the cavity 3916. While the shaft 3906 is inserted into the cavity 3916, the pump 3908 may be activated fill the fluid bladder 3910 with the fluid to reach the disengaged position. FIG. 39B illustrates the fluid bladder 3910 in the engaged position. In the engaged position, the fluid bladder 3910 is expanded in size (relative to the disengaged position) and substantially fills the cavity 3916, which creates a mechanical engagement between the fluid bladder 3910 and the cavity 3916. Advantageously, this mechanical engagement can attach a first aircraft to which the male part 3002 is attached and a second aircraft to which the female part 3904 is attached.

Figure 40:
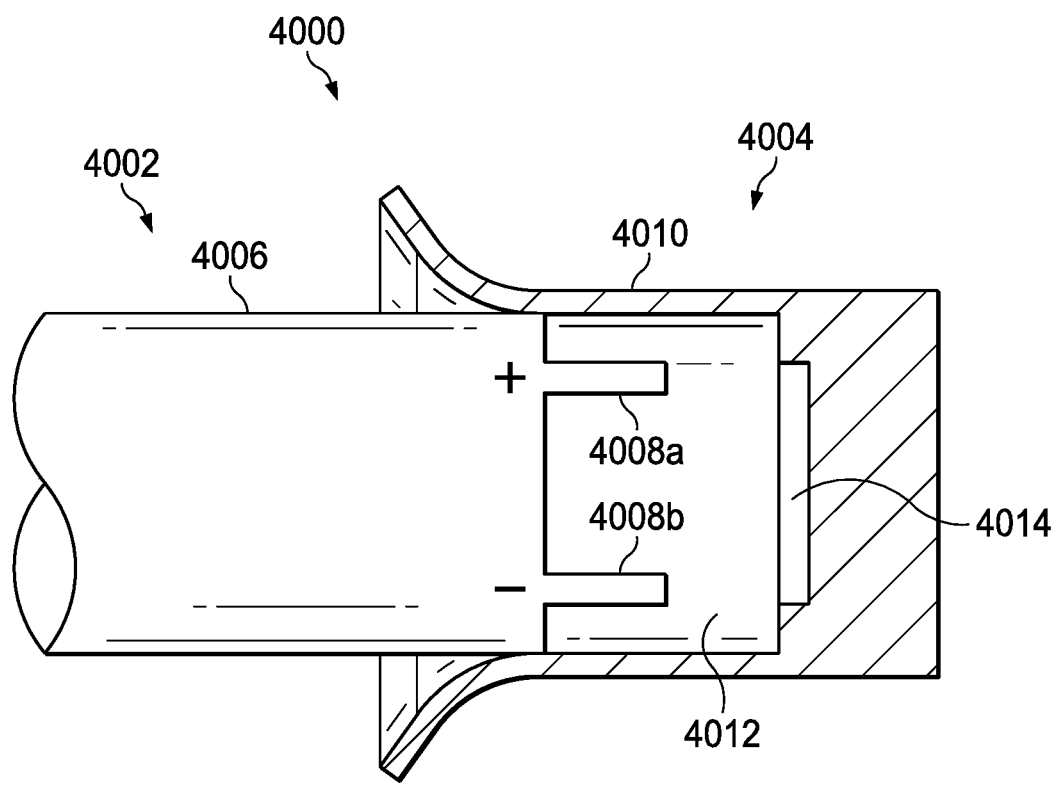
FIG. 40 illustrates details of a male part and a female part operable to couple with one another based on an attachment mechanism comprising a welding element, in accordance with some embodiments of the present disclosure.

FIG. 40 illustrates details of a system 4000 including a male part 4002 and a female part 4004 operable to couple with one another based on an attachment mechanism comprising a welding element, in accordance with some embodiments of the present disclosure. The male part 4002 includes a wall forming a shaft 4006 and the welding element, which includes electrodes 4008a and 4008b. The electrodes 4008a and 4008b can create an electrical arc between them to heat a metallic material. The female part 4004 includes a filler material 4014 and a wall 4010 forming a cavity 4012. The filler material 4014 is a metallic material to form a joint between the shaft 4006 and wall 4010, each of which is also a base metallic material for the weld. The electrodes 4008a and 4008b are operable to switch between an engaged position and a disengaged position. In the disengaged position, the electrodes 4008a and 4008b lack any mechanical engagement between the male part 4002 and the female part 4004. In the engaged position, the electrodes 4008a and 4008b create a weld between the shaft 4006 and the wall 4010 based on melting the filler material 4014 and a portion of the shaft 4006 and/or the wall 4010. This mechanical engagement can rigidly attach a first aircraft to which the male part 4002 is attached and a second aircraft to which the female part 4004 is attached. The welded joint between the male part 4002 and a female part 4004 inhibits relative movement between the first aircraft and the second aircraft to one another by transferring moment forces between the first aircraft and the second aircraft via the weld. Though the FIG. 40 illustrates the male part including a welding element and the female part including a filler material, embodiments of the present disclosure are not limited to such a configuration. In other embodiments of the present disclosure, the welding element and filler material are swapped on the male and female parts such that the male part includes the filler material and the female part includes the welding element.

Figure 41:
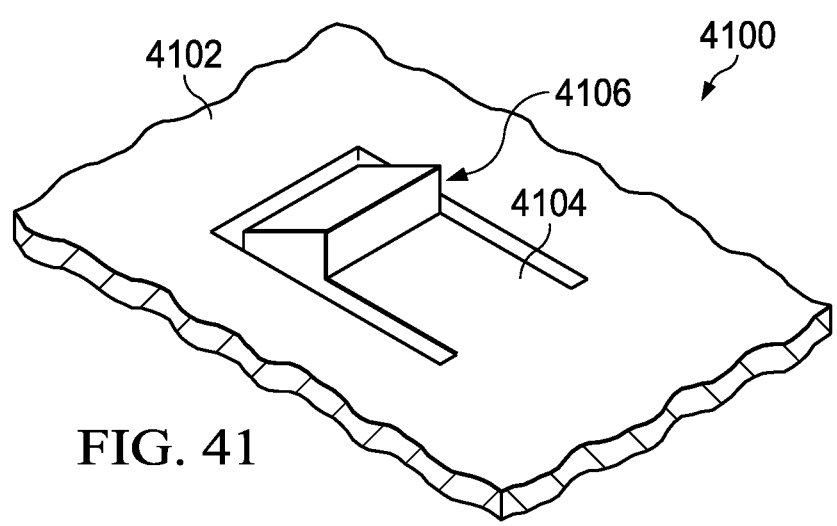
FIG. 41 illustrates details of a latch mechanism for coupling a male part and a female part, in accordance with some embodiments of the present disclosure.

FIG. 41 illustrates details of a latch mechanism 4100 for coupling a male part and a female part, in accordance with some embodiments of the present disclosure. The latch mechanism 4100 includes a surface 4102 from which a latch arm 4104 cantilevers. A lip 4106 extends from the latch arm 4104. The latch arm 4104 is flush with the surface 4102. The lip 4106 projects outward relative to the surface 4102 and, therefore, is not flush with the surface 4102. The latch arm 4104 can flex to engage the lip 4106 a notch in another surface. For example, as the other surface contacts the lip 4106, it can cause the latch arm 4104 to flex back to facilitate the lip 4106 recessing and becoming flush with the surface 4102. When the lip 4106 aligns with the notch, the latch arm 4104 flexes forward to facilitate the lip 4106 again projecting from the surface 4102 and engaging with the notch.

In some examples, the latch mechanism 4100 is a portion of a male part and the notch is in a corresponding female part. In other examples, the latch mechanism 4100 is a portion of a female part and the notch is in a corresponding male part. The latch mechanism 4100 may be utilized on any male part or female part of the present disclosure. In addition, the latch mechanism 4100 may be combined with any attachment mechanism of the present disclosure.

Figure 42A:
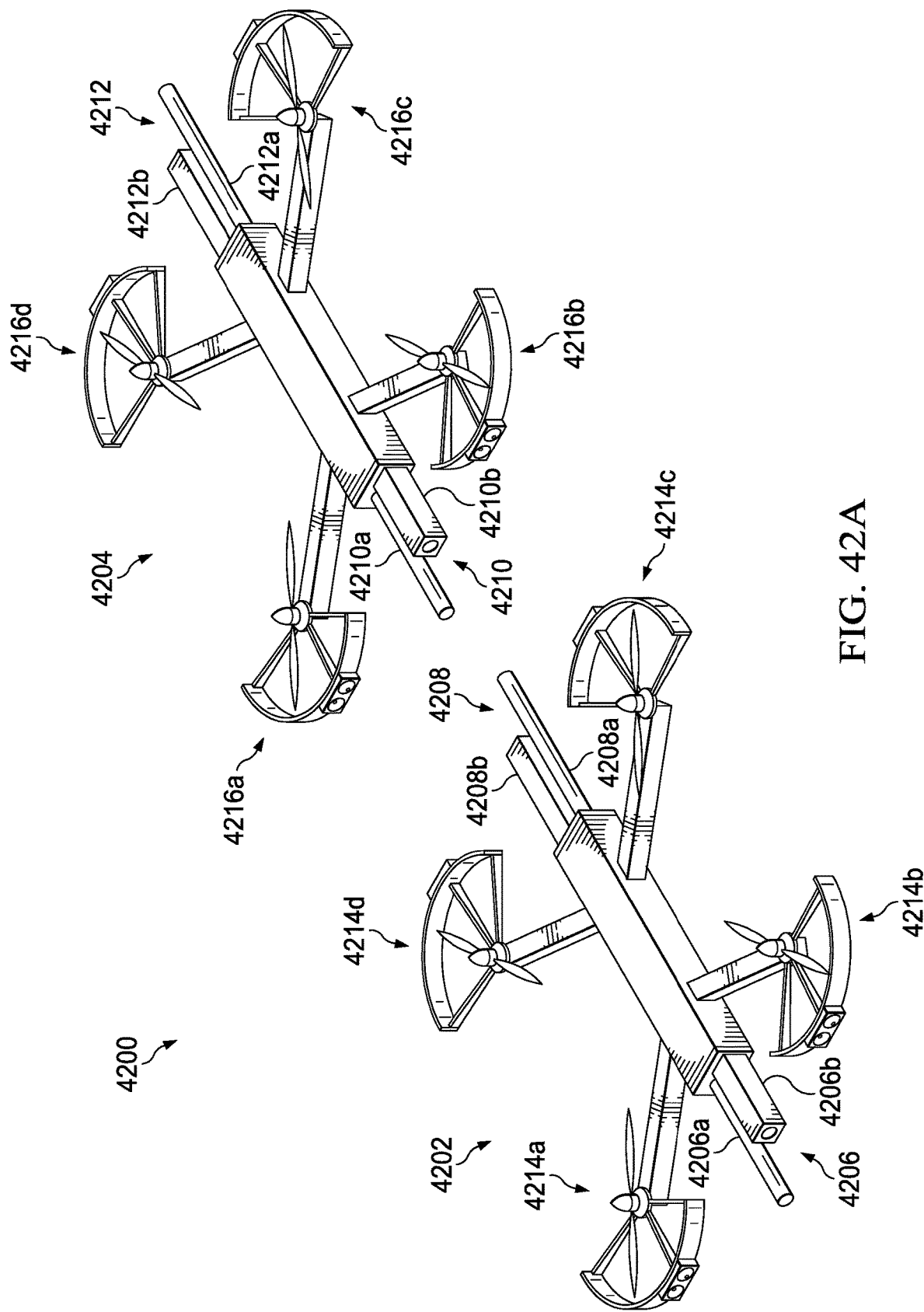
FIGS. 42A, 42B, and 42C illustrate a system in which multiple aircraft dock to one another while airborne based on coupling at least one male part and least one female part, in accordance with some embodiments of the present disclosure.
Figure 42B:
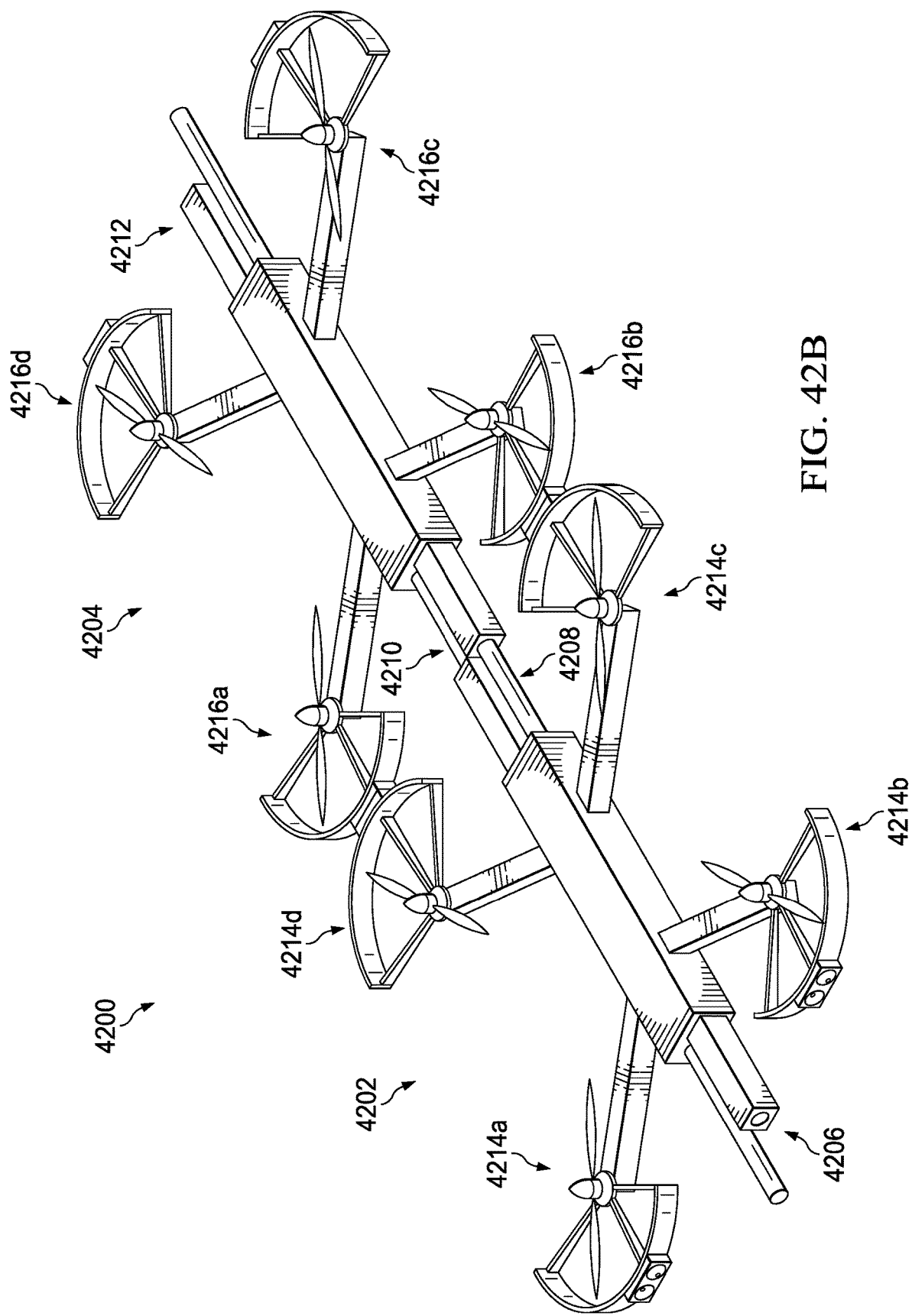
Figure 42C:
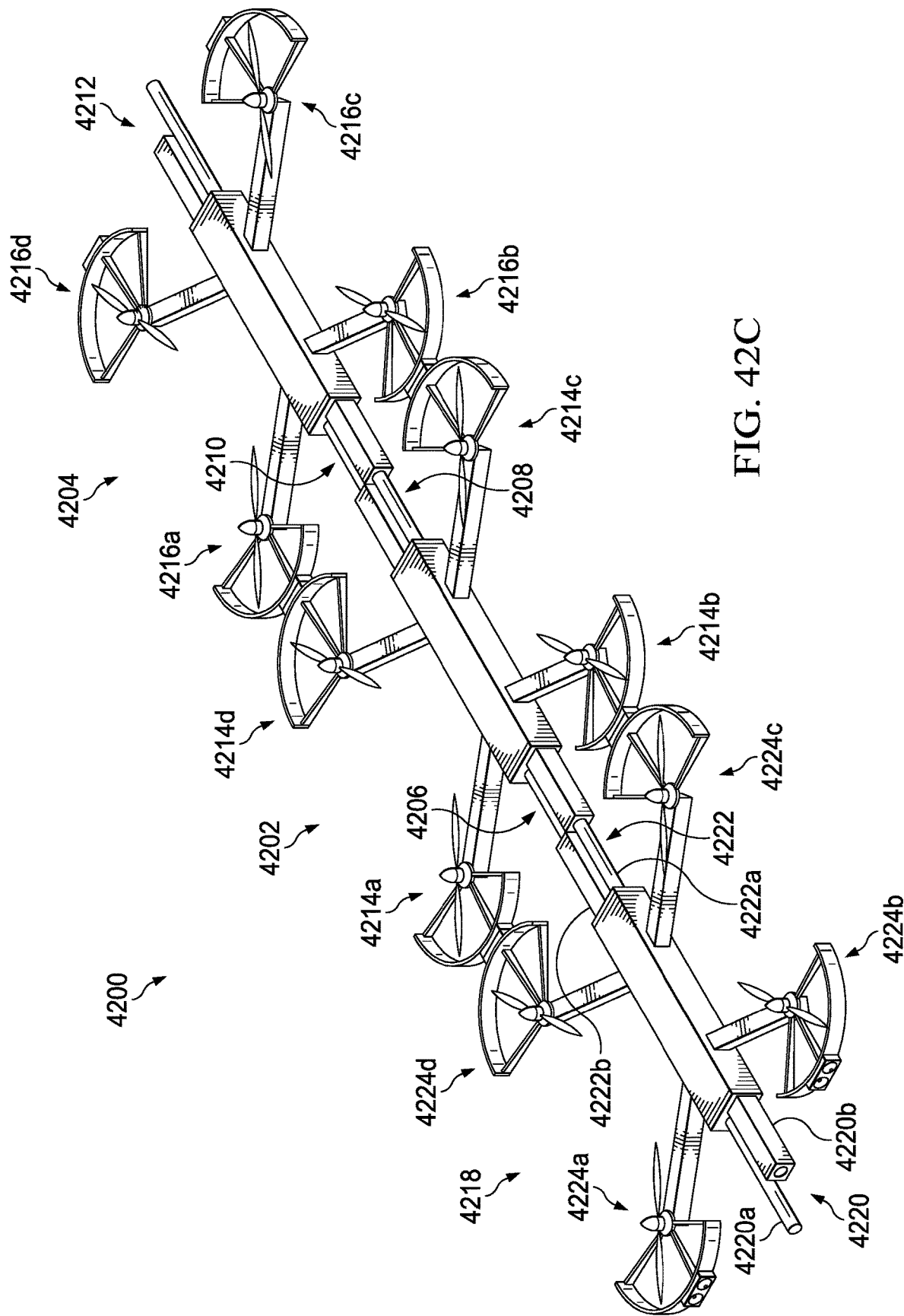

FIGS. 42A, 42B, and 42C illustrate a system 4200 in which multiple aircraft dock to one another while airborne based on coupling at least one male part and least one female part, in accordance with some embodiments of the present disclosure. The system 4200 includes aircraft 4202, 4204, and 4218 (FIG. 42C). The aircraft 4202 includes propeller shrouds 4214a, 4214b, 4214c, and 4214d and coupling systems 4206 and 4208. The coupling system 4206 includes a male part 4206a and a female part 4206b. The coupling system 4208 includes a male part 4208a and a female part 4208b. The aircraft 4204 includes propeller shrouds 4216a, 4216b, 4216c, and 4216d and coupling systems 4210 and 4212. The coupling system 4210 includes a male part 4210a and a female part 4210b. The coupling system 4212 includes a male part 4212a and a female part 4212b. The aircraft 4218 includes propeller shrouds 4224a, 4224b, 4224c, and 4224d and coupling systems 4220 and 4222. The coupling system 4220 includes a male part 4220a and a female part 4220b. The coupling system 4222 includes a male part 4222a and a female part 4222b. The male parts and the female parts of the aircraft 4204, 4204, and 4218 may include any of the male parts and female parts disclosed herein.

Each of the aircraft includes coupling systems at each end of the aircraft and propeller shrouds each of which includes a shroud coupling. Each coupling system includes both a male part and a female part. Such coupling systems create a more secure and rigid coupling between the aircraft and can enable transfer of greater forces (such as bending moments, torsional forces, shear forces, tensile forces, and compressive forces) between aircraft relative to a single male or female part. In addition, the inclusion of coupling systems at each end of the aircraft enables the aircraft to couple with another aircraft regardless of a direction in which the aircraft is facing. For example, this can increase efficiency and reduce the time required for airborne couplings at least because it can eliminate a need for the aircraft to turn a particular end to face another aircraft (e.g., as is required when only one end of the aircraft includes a coupling system).

FIG. 42A illustrates the aircraft 4202 and the aircraft 4204 airborne and uncoupled based on the coupling systems 4208 and 4210 being disengaged from one another. As the aircraft 4202 and 4204 advance toward one another, coupling systems 4208 and 4210 engage with one another. Such engagement includes the male part 4208a of the coupling system 4208 being inserted into the female part 4210b of the coupling system 4210 and the male part 4210a of the coupling system 4210 being inserted in the female part 4208b of the coupling system 4208, as illustrated in FIG. 42B. In addition, the shroud couplings on the propeller shrouds 4214d and 4216a couple with one another and the shroud couplings on the propeller shrouds 4214c and 4216b couple with one another. FIG. 42B illustrates the aircraft 4202 and the aircraft 4204 airborne and coupled based on the coupling systems 4208 and 4210 being engaged with one another. Collectively, the now coupled aircraft 4202 and 4204 can couple with other aircraft to create an unbroken train of coupled aircraft. As an example, the aircraft 4218 can couple with the aircraft 4202. As the aircraft 4202 and 4204, while coupled, and the aircraft 4218 advance toward one another, the coupling system 4206 on the aircraft 4202 engages the coupling system 4222 on the aircraft 4218. Such engagement includes the male part 4206a of the coupling system 4206 being inserted into the female part 4222b of the coupling system 4222 and the male part 4222a of the coupling system 4222 being inserted in the female part 4206b of the coupling system 4206, as illustrated in FIG. 42C. In addition, the shroud couplings on the propeller shrouds 4124a and 4224d couple with one another and the shroud couplings on the propeller shrouds 4214b and 4224c couple with one another. FIG. 42C illustrates the aircraft 4202, 4204, and 4218 airborne and coupled based on the coupling systems 4208 and 4210 being engaged with one another and the coupling systems 4206 and 4222 being engaged with one another.

Each the aircraft 4202, 4204, and 4218 is able to individually carry a maximum payload. Advantageously, because the aircraft 4202, 4204, and 4218 are coupled to one another by the coupling systems 4210, 4208, 4206, and 4222, they can collectively carry an increased payload is greater than the individual maximum payload of any of the aircraft 4202, 4204, and 4218. In some embodiments, a weight of the increased payload is 2 times, or more, greater than a weight of the maximum payload (i.e., weight of increased payload≥2*weight of the maximum payload).

A difference in thrust generated by any one of the aircraft 4202, 4204, and 4218 can cause one or more forces such as a bending moment, a torsional force, a shear force, a tensile force, and/or a compressive force to be transferred between the aircraft 4202, 4204, and 4218. For example, if one of the aircraft 4202, 4204, and 4218 is attempting to move at a different vertical speed than the others, a shear force is produced and is resisting by the shear capacity of the coupling systems. The coupling systems can resist such forces while continuing to couple the 4202, 4204, and 4218 to one another during flight.

FIG. 43 illustrates a system 4300 including a male part 4302 and a female part 4304. The male part 4302 includes a wall forming a shaft 4306, a male thread 4308, and a backstop 4310. The male thread 4308 includes a helical rib projecting from the shaft 4306 and wrapping around the shaft 4306. The shaft 4306 of the male part 4302 is rotatable relative to the female part 4304, e.g., as generally indicated by arrow 4330. In some examples, a motor dives the rotation of the shaft 4306. The backstop 4310 is to nest within a cone 4320 on the female part 4304. The backstop 4310 is conical in shape an includes openings 4312. The openings 4312 can reduce a weight of the backstop 4310 and reduce an amount of aerodynamic drag produced by the backstop 4310 during flight of an aircraft to which the male part 4302 is attached. Braces 4314 and 4316 are to attach the male part 4302 to an aircraft. Each of the braces 4314 and 4316 includes upper portions 4314a and 4316a, respectively, and lower portions 4314b and 4316b, respectively. The upper portions are attached to the corresponding lower portions around the shaft 4306. Further details of a brace are described below with respect to FIG. 44. The female part 4304 includes a wall 4318 forming the cone 4320 and a cavity 4324, and a female thread (not shown). The cone 4320 is to guide the male part 4302 into the cavity 4324. The cone 4320 includes openings 4322. The openings 4322 can reduce a weight of the cone 4320 and reduce an amount of aerodynamic drag produced by the cone 4320 during flight of an aircraft to which the female part 4304 is attached. The cavity 4324 is to receive insertion of the shaft 4306. The female thread includes a helical channel recessed into the wall 4318 within the cavity 4324. The female thread wraps around the wall 4318 proximate the cavity 4324. The female thread corresponds to the dimensions of the male thread 4308.

In FIG. 43, the male thread 4308 and the female thread are in a disengaged position. A relative rotation (e.g., in a first direction) between the male part 4302 and female part 4304 can engage the male thread 4308 with the female thread. As the male thread 4308 and the female thread rotate relative to one another, the male part 4302 and the female part 4304 are drawn closer to one another and the male thread 4308 and the female thread reach an engaged position. Similarly, a relative rotation (e.g., in a second direction) between the male part 4302 and the female part 4304 may disengage the male thread 4308 from the female thread. Various components of the male part 4302 and the female part 4304 operate and interoperate in a matter as described above, e.g., with respect to FIGS. 11A and 11B. Details of such components are not repeated here only of the sake of brevity.

FIG. 44 illustrates details of a brace 4400, in accordance with some embodiments of the present disclosure. The brace 4400 is operable to attach a male or a female part to an aircraft. The brace 4400 includes an upper portion 4402 and a lower portion 4404, each of which is arced to accommodate a wall of the male or female part. The upper portion 4402 includes openings 4406a and 4406b. The lower portion 4404 includes openings (not visible) which correspond to the openings 4406a and 4460b in the upper portion 4402. Fasteners may extend through the openings 4406a and 4460b and the corresponding openings in the lower power portion to attach the upper portion 4402 and the lower portion 4404 to one another. When attached to one another, the upper portion 4402 and the lower portion 4404 wrap around and clasp the male or female part. In addition, the lower portion 4404 includes openings 4408a, 4408b, 4410a, and 4410b, which are used to attach the lower portion 4404 to the aircraft. Because the upper portion 4402 and the lower portion 4404 may be attached to one another by fasteners, the lower portion 4404 being attached to the aircraft couples the upper portion 4402 to the aircraft.

Figure 45A:
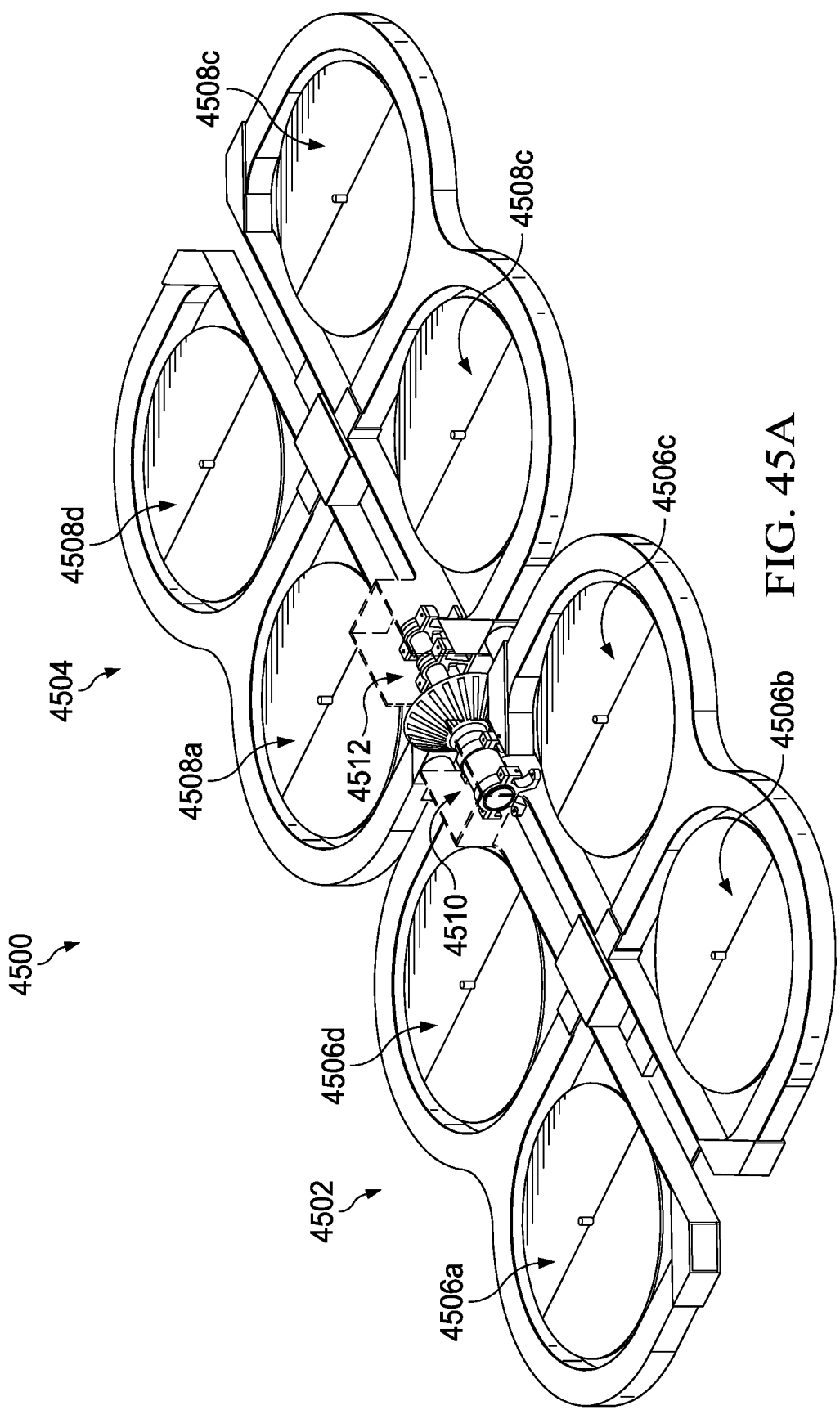
FIGS. 45A and 45B illustrate a system in which multiple aircraft dock to one another while airborne based on coupling a male part and a female part, in accordance with some embodiments of the present disclosure.
Figure 45B:
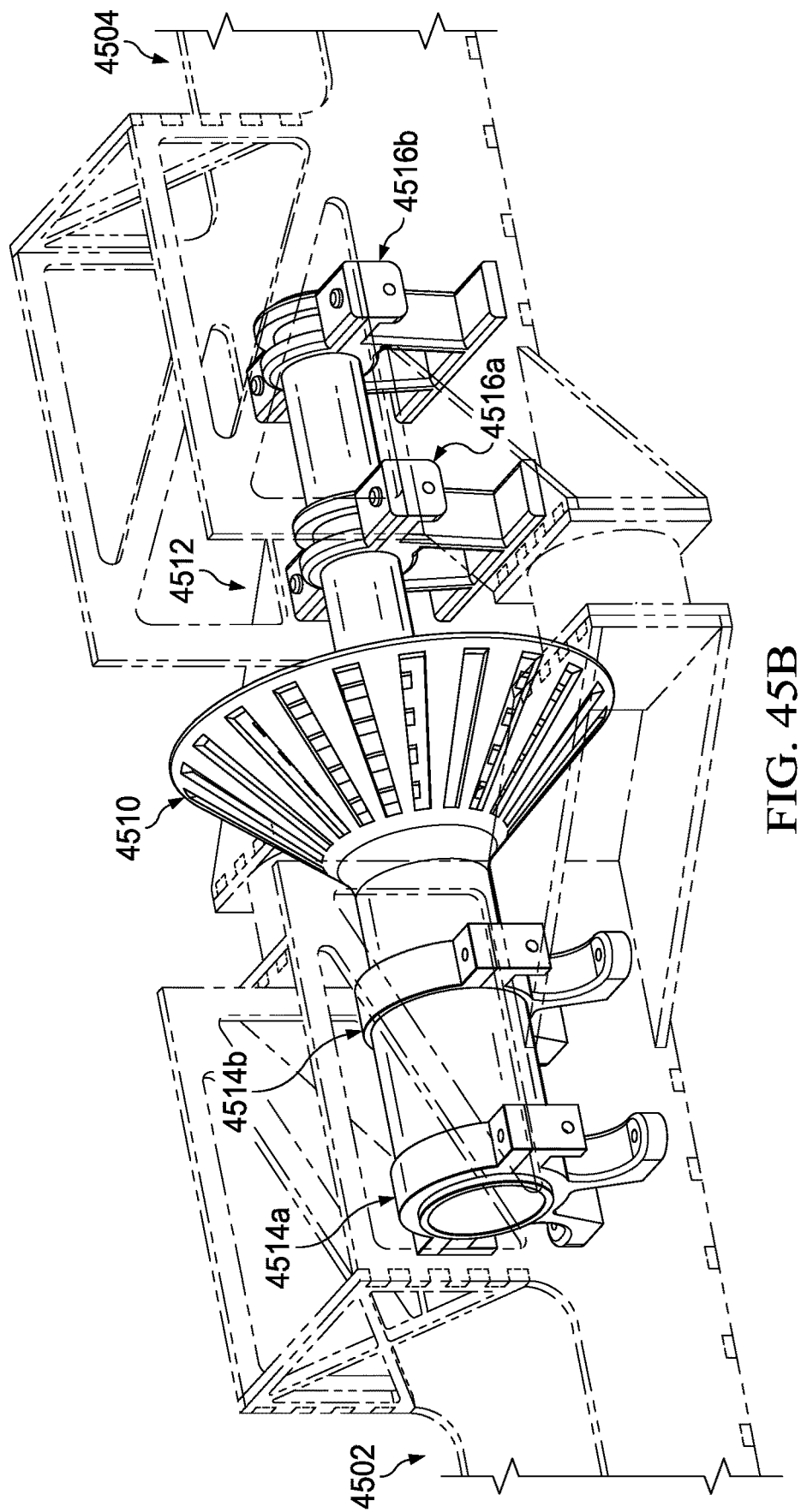

FIGS. 45A and 45B illustrate a system 4500 in which an aircraft 4502 and an aircraft 4504 can selectively dock to one another while airborne based on coupling a male part 4512 and a female part 4510, in accordance with some embodiments of the present disclosure. FIG. 45A illustrates the aircraft 4502 and the aircraft 4504 airborne and coupled to one another based on the male part 4512 and the female part 4510 being engaged with one another. FIG. 45B illustrates a detailed view of the male part 4512 and the female part 4510 engaged to couple the aircraft 4502 and the aircraft 4504. The aircraft 4502 includes an airframe, a fuselage, drive systems 4506a, 4506b, 4506c, 4506d, and the female part 4510. Braces 4514a and 4514b (FIG. 45B) couple the female part 4510 to the airframe of the aircraft 4502. The female part 4510 is an example of the female part 4304 of the system 4300 (FIG. 43). The aircraft 4504 includes an airframe, a fuselage, drive systems 4508a, 4508b, 4508c, 4508d, and the male part 4512. Braces 4516a and 4516b (FIG. 45B) couple the male part 4512 to the airframe of the aircraft 4504. The male part 4512 is an example of the male part 4302 of the system 4300 (FIG. 43). When the male part 4512 and the female part 4510 are coupled, a wall forming a shaft of the male part 4512 is nested within a wall forming a cavity of the female part 4510. The male part 4512 nesting within the female part 4510 creates a mechanical engagement (e.g., based on interlocking male and female threads) to hold together the male part 4512 and the female part 4510. In addition, when the male part 4512 and the female part 4510 are coupled, a backstop on the male part 4512 contacts a cone on the female part 4510 and prevents the male part 4512 from being further inserted into the female part 4510.

Figure 46:
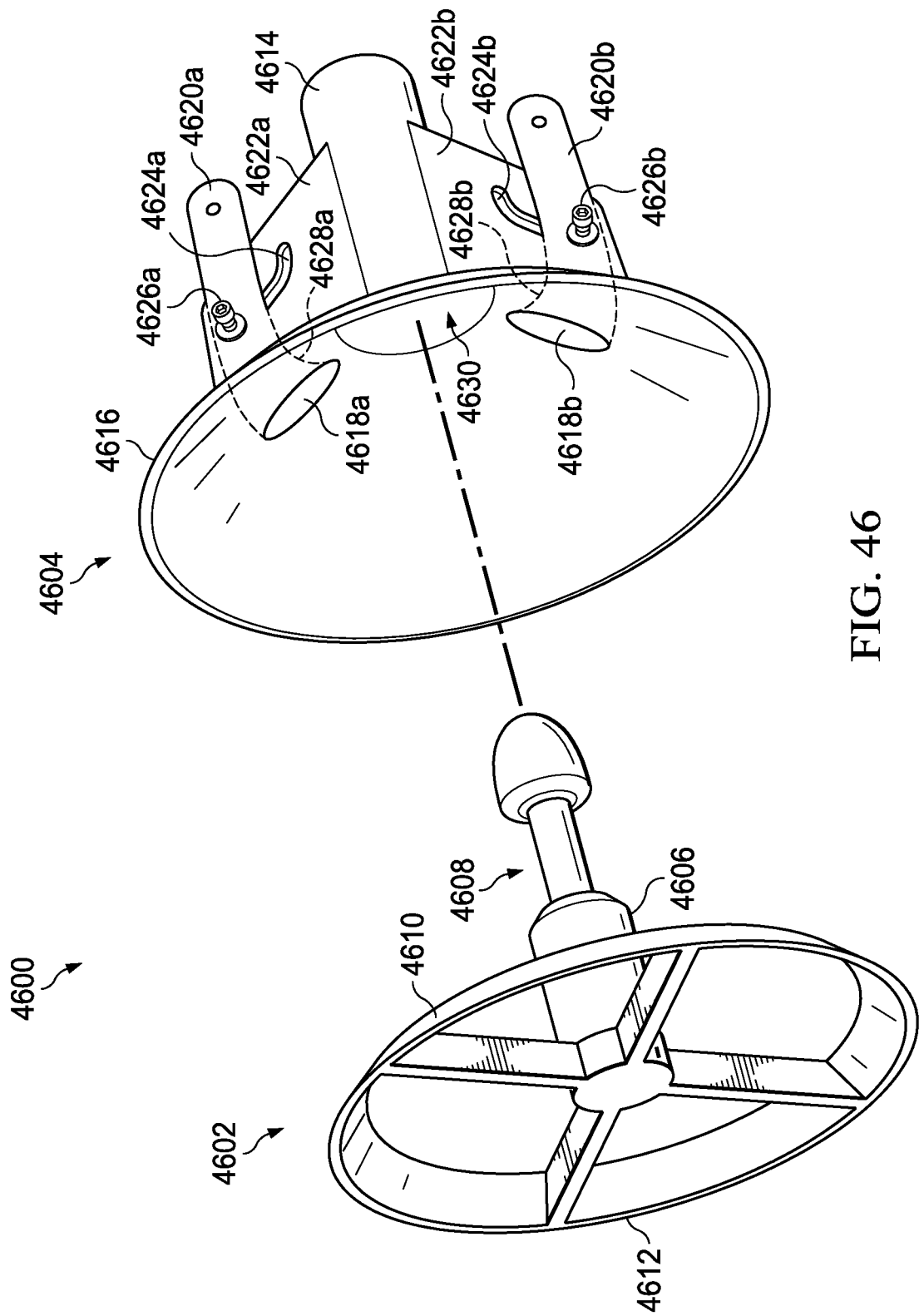
FIG. 46 illustrates details of a male part and a female part operable to couple with one another based on an attachment mechanism comprising a latch mechanism, in accordance with some embodiments of the present disclosure.

FIG. 46 illustrates details of a system 4600 including a male part 4602 and a female part 4604 operable to couple with one another based on an attachment mechanism comprising a latch mechanism, in accordance with some embodiments of the present disclosure. The male part 4602 includes a backstop 4610, a wall forming a shaft 4606. The backstop 4610 includes openings 4612, which can reduce a weight of the backstop 4610 and reduce an amount of aerodynamic drag produced by the backstop 4610 during flight of an aircraft to which the male part 4602 is attached. The shaft 4606 includes a lip 4608, which wraps around the shaft 4606. The female part 4604 includes latches 4620a and 4620b, a motor (not shown), a wall 4614 forming a cavity 4630. The wall 4614 includes openings 4618a and 4618b through which the latches 4620a and 4620b extend. The latches 4620a and 4620b include hooks 4628a and 4628b, respectively. In addition, the latches 4620a and 4620b are pivotally attached to walls 4622a and 4622b, respectively, which align the latches 4620a and 4620b with the openings 4618a and 4618b. Each of the walls 4622a and 4622b includes curved openings 4624a and 4624b, respectively. Bolts 4626a and 4626b are attach to the latches 4620a and 4620b, respectively, and extend through the curved openings 4624a and 4624b, respectively. The bolts 4626a and 4626b move within the curved openings 4624a and 4624b to guide a pivotal movement of the latches 4620a and 4620b.

Each of the lip 4608 and the latches 4620a and 4620b is an attachment mechanism for coupling the male part 4602 and the female part 4604. The latches 4620a and 4620b are operable to pivot between at least a first position and a second position. The motor may drive the pivotal movement of the latches 4620a and 4620b. The male part 4602 and the female part 4604 are uncoupled when the male part 4602 is not inserted into the female part 4604. When the latches 4620a and 4620b are in the first position (as depicted in FIG. 46), the hooks 4628a and 4628b of the latches 4620a and 4620b are flush with and do not project into the cavity 4630. The male part 4602 and the female part 4604 may be engaged by advancing the male part 4602 into the cavity 4630. As the male part 4602 moves into the cavity 4630, the motor may rotate the latches 4620a and 4620b to the second position, which causes the hooks 4628a and 4628b to engage the lip 4608. When the latches 4620a and 4620b are in the second position, the hooks 4628a and 4628b of the latches 4620a and 4620b project into the cavity 4630 and the lip 4608. The male part 4602 and the female part 4604 are coupled to one another when the male part 4602 is within the cavity 4630 of female part 4604 and the hooks 4628a and 4628b of the latches 4620a and 4620b interlock with the lip 4608. The hooks 4628a and 4628b are locked in place to prevent relative movement between the male part 4602 and the female part 4604. In some examples, the hooks 4628a and 4628b and/or the latches 4620a and 4620b are locked in place, for example, by the motor, a lock bolt, a spring force, a magnetic force, or by any other means. The latches 4620a and 4620b may be released from being locked in place and rotated, by the motor, from the first position to the second position, which enables withdrawal of the male part 4602 from the female part 4604.

FIGS. 47A and 47B illustrate details of a male part 4700, in accordance with some embodiments of the present disclosure. FIG. 47A is an exploded diagram of the male part 4700. FIG. 47B illustrates the male part 4700 assembled. The male part 4700 includes a housing assembly 4702, a wall forming a shaft 4708, a motor 4704, and a mount 4706. The housing assembly 4702 includes a cone 4714 and a structure 4716, which defines a cavity 4712. The cone 4714 includes openings, which reduce a weight of the cone 4714 and reduce an amount of aerodynamic drag produced by the cone 4714 during flight of an aircraft to which the male part 4700 is attached. Male thread 4710 includes a helical rib projecting from the shaft 4708 and wrapping around the shaft 4708. The shaft 4708 extends through the cavity 4712 and attaches to the mount 4706. The mount 4706 attaches the shaft 4708 and the motor 4704 to one another. The motor 4704 provides power to generate a mechanical engagement between the male part 4700 and a corresponding female part. The motor 4704 rotates the shaft 4708 relative to the housing assembly 4702 via the mount 4706. The mount 4706 generates a torque. The mount 4706 transmits the torque from the motor 4704 to the shaft 4708 to facilitate the rotation of the shaft 4708. The shaft 4708 rotates within cavity 4712. As the shaft 4708 rotates, the male thread 4710 rotates, e.g., to engage and/or disengage with female threads on a corresponding female part. The motor 4704 may be attached to the housing assembly 4702 and/or a fuselage of an aircraft. In some examples, the motor 4704 is a servomotor or other motor.

Several embodiments of the present disclosure utilize a certain number of members, such as attachment mechanisms, male part, female parts, shafts, cavities, and the like. However, embodiments of the present disclosure are not limited to the specific number of member in the illustrated embodiments. The number of members can vary between different embodiments. For example, some embodiments may be implemented using more, less, and/or other member than those illustrated in the Figure. Moreover, some embodiments may consolidate two or more of the members into a single member. In addition, several embodiments of the present disclosure refer to and/or show fasteners. Such fasteners are inclusive of screws, nuts, bolts, welds or any other mechanical fasteners for attaching two or more components to one another.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A male part for coupling aircraft to one another, the male part comprising:
   a wall forming a shaft, wherein the wall is directly connected to one of a forward end and an aft end of a fuselage of a first aircraft;
   an attachment mechanism to regulate a mechanical engagement between the shaft on the male part and a female part directly connected one of a forward end and an aft end of a fuselage of a second aircraft while the first aircraft and the second aircraft are airborne, the female part is connected to the second aircraft such that the female part is neither extensible nor retractable relative to the second aircraft, the female part comprising a wall forming a cone around a cavity for guiding the shaft into the cavity, wherein the attachment mechanism is operable to switch between an engaged position and a disengaged position, and wherein in the engaged position, the attachment mechanism initiates the mechanical engagement to rigidly attach the first aircraft and the second aircraft to one another such that the first and second aircraft are arranged end-to-end, and in the disengaged position, the attachment mechanism discontinues the mechanical engagement to detach the first aircraft and the second aircraft from one another;

a first propeller shroud surrounding less than all of a first propeller of the first aircraft, the first propeller shroud including at least one first shroud coupling element;

a second propeller shroud separate and independent from the first propeller shroud surrounding less than all of a second propelier of the first aircraft, the second propelier shroud including at least one first shroud coupling element;

a third propeller shroud surrounding less than all of a first propeller of the second aircraft, the third propeller shroud including at least one second shroud coupling element;

a fourth propeller shroud separate and independent from the third propeller shroud surrounding less than all of a second propeller of the second aircraft, the fourth propeller shroud including at least one second shroud coupling element;

wherein in the engaged position, the first shroud coupling elements mate with the second shroud coupling elements.

2. The male part of claim 1, wherein:

in the engaged position, the attachment mechanism is configured to inhibit relative movement between the first aircraft and the second aircraft to one another based on a moment transferred between the first aircraft and the second aircraft via the attachment mechanism; and in the disengaged position, the first aircraft and the second aircraft are configured to move with relative to one another.

3. The male part of claim 1, wherein the attachment mechanism comprises a fastener selected from the group consisting of: a male thread, a female thread, a latch, an indentation, a hook-and-loop fastener, a pin, a lock bolt, a magnet, a bladder, an adhesive material, a grapple, a welding element, and a screw.

4. The male part of claim 1, wherein each of the first aircraft and the second aircraft are operable to independently transport, during flight, a maximum payload, and wherein the first aircraft and the second aircraft are rigidly attached to one another by the male part and the female part and are operable to collectively transport an increased payload during flight, wherein the increased payload is greater than the maximum payload.

5. The male part of claim 1, wherein the attachment mechanism is operable to generate a relative rotation between the male part and the female part.

6. The male part of claim 1, wherein the attachment mechanism comprises:

a male thread extending from the wall; and wherein the mechanical engagement comprises the male thread interlocking with a female thread on the female part on the second aircraft.

7. The male part of claim 1, wherein the attachment mechanism comprises:

a female thread recessed into the wall; and wherein the mechanical engagement comprises the female thread interlocking with a male thread on the female part on the second aircraft.

8. A female part for coupling aircraft to one another, the female part comprising:

a wall forming a cone around a cavity, wherein the wall is directly connected to one of a forward end and an aft end of a fuselage of a first aircraft;

an attachment mechanism to regulate a mechanical engagement between the cavity on the female part and a male part directly connected one of a forward end and an aft end of a fuselage of a second aircraft while the first aircraft and the second aircraft are airborne, wherein the cone guides the shaft into the cavity and wherein the attachment mechanism is operable to switch between an engaged position and a disengaged position, and wherein in the engaged position, the attachment mechanism initiates the mechanical engagement to rigidly attach the first aircraft and the second aircraft to one another such that the first and second aircraft are arranged end-to-end, and in the disengaged position, the attachment mechanism discontinues the mechanical engagement to detach the first aircraft and the second aircraft from one another;

a first propeller shroud surrounding less than all of a first propeller of the first aircraft, the first propeller shroud including at least one first shroud coupling element;

a second propelier shroud separate and independent from the first propelier shroud surrounding less than all of a second propelier of the first aircraft, the second propelier shroud including at least one first shroud coupling element;

a third propeller shroud surrounding less than all of a first propeller of the second aircraft, the third propeller shroud including at least one second shroud coupling element;

a fourth propeller shroud separate and independent from the third propeller shroud surrounding less than all of a second propeller of the second aircraft, the fourth propeller shroud including at least one second shroud coupling element;

wherein in the engaged position, the first shroud coupling elements mate with the second shroud coupling elements.

9. The female part of claim 8, wherein:

in the engaged position, the attachment mechanism is configured to inhibit relative movement between the first aircraft and the second aircraft to one another based on a moment transferred between the first aircraft and the second aircraft via the attachment mechanism; and in the disengaged position, the first aircraft and the second aircraft are configured to move with relative to one another.

10. The female part of claim 8, wherein the attachment mechanism comprises a fastener selected from the group consisting of: a male thread, a female thread, a latch, a recession, a hook-and-loop fastener, a pin, a lock bolt, a bladder, an adhesive material, a grapple, a welding element, and a screw.

11. The female part of claim 8, wherein the cavity comprises:
   a male thread attached to the wall; and
   wherein the mechanical engagement comprises the male thread interlocking with a female thread on the male part on the second aircraft.

12. The female part of claim 8, wherein the cavity comprises:
   a female thread recessed into the wall; and
   wherein the mechanical engagement comprises the female thread interlocking with a male thread on the male part on the second aircraft.

13. A coupling system for coupling two or more aircraft to one another, the coupling system comprising:
   a male part comprising a shaft and a first fastener to attach the male part directly to one of a forward end and an aft end of fuselage of a first aircraft;
   a female part comprising a cone around a cavity, the cone for guiding the shaft into the cavity, and a second fastener to attach the female part directly to one of a forward end and an aft end of a fuselage of a second aircraft such that the cone is neither extensible from nor retractable to the second aircraft;
   an attachment mechanism to regulate a mechanical engagement between the shaft on the male part and the cavity on female part while the first aircraft and the second aircraft are airborne, wherein the attachment mechanism is operable to switch between an engaged position and a disengaged position, and wherein
      in the engaged position, the attachment mechanism initiates the mechanical engagement to rigidly attach the first aircraft and the second aircraft to one another such that the first and second aircrafts are arranged end-to-end, and
      in the disengaged position, the attachment mechanism discontinues the mechanical engagement to detach the first aircraft and the second aircraft from one another;
   a first propeller shroud surrounding less than all of a first propeller of the first aircraft, the first propeller shroud including at least one first shroud coupling element;
   a second propelier shroud separate and independent from the first propeller shroud surrounding less than all of a second propelier of the first aircraft, the second propelier shroud including at least one first shroud coupling element;
   a third propeller shroud surrounding less than all of a first propeller of the second aircraft, the third propeller shroud including at least one second shroud coupling element;
   a fourth propeller shroud separate and independent from the third propeller shroud surrounding less than all of a second propeller of the second aircraft, the fourth propeller shroud including at least one second shroud coupling element;
      wherein in the engaged position, the first shroud coupling elements mate with the second shroud coupling elements.

14. The coupling system of claim 13, wherein:
   in the engaged position, the attachment mechanism is configured to inhibit relative movement between the first aircraft and the second aircraft to one another based on a moment transferred between the first aircraft and the second aircraft via the attachment mechanism; and
   in the disengaged position, the first aircraft and the second aircraft are configured to move with relative to one another.

15. The coupling system of claim 13, wherein the attachment mechanism comprises:
   a male thread extending from the shaft; and
   wherein the mechanical engagement comprises the male thread interlocking with a female thread on the female part on the second aircraft.

16. The coupling system of claim 13, wherein the attachment mechanism comprises:
   a female thread recessed into a wall of the cavity; and
   wherein the mechanical engagement comprises the female thread interlocking with a male thread on the female part on the second aircraft.

* * * * *

UNITED STATES PATENT AND TRADEMARK OFFICE
CERTIFICATE OF CORRECTION

PATENT NO. : 11,724,804 B2
APPLICATION NO. : 16/381759
DATED : August 15, 2023
INVENTOR(S) : Nathan Alexander Mills et al.

Page 1 of 1

It is certified that error appears in the above-identified patent and that said Letters Patent is hereby corrected as shown below:

In the Claims

In Column 39, Claim 2, Line 46, change "move with relative to one another" to -- move relative to one another --.

In Column 40, Claim 9, Line 63, change "move with relative to one another" to -- move relative to one another --.

In Column 42, Claim 14, Line 28, change "move with relative to one another" to -- move relative to one another --.

Signed and Sealed this
Fourteenth Day of November, 2023

Katherine Kelly Vidal
*Director of the United States Patent and Trademark Office*